US012601905B2

(12) United States Patent
Saito et al.

(10) Patent No.: US 12,601,905 B2
(45) Date of Patent: Apr. 14, 2026

(54) OBSERVATION OPTICAL SYSTEM AND OPTICAL APPARATUS

(71) Applicant: FUJIFILM Corporation, Tokyo (JP)

(72) Inventors: Hiroki Saito, Saitama (JP); Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 713 days.

(21) Appl. No.: 17/932,228

(22) Filed: Sep. 14, 2022

(65) Prior Publication Data

US 2023/0115405 A1      Apr. 13, 2023

(30) Foreign Application Priority Data

Sep. 21, 2021    (JP) ................................. 2021-153578
Mar. 11, 2022    (JP) ................................. 2022-038623

(51) Int. Cl.
*G02B 25/00*        (2006.01)
*G02B 7/02*         (2021.01)
*G02B 9/60*         (2006.01)

(52) U.S. Cl.
CPC ........... *G02B 25/001* (2013.01); *G02B 7/023* (2013.01); *G02B 9/60* (2013.01)

(58) Field of Classification Search
CPC ...... G02B 7/023; G02B 25/001; G02B 25/04; G02B 13/0045; G02B 27/026; G02B 9/60
See application file for complete search history.

(56) References Cited

U.S. PATENT DOCUMENTS

2009/0290226 A1    11/2009  Asakura et al.
2014/0218806 A1     8/2014  Ishizuka

2015/0212289 A1     7/2015  Matsuo
2015/0362720 A1    12/2015  Saito
2016/0062104 A1*    3/2016  Kimura ................ G02B 25/001
                                                            359/643
2021/0033866 A1     2/2021  Cao et al.
2021/0080693 A1*    3/2021  Asami .................... G02B 13/04
2021/0208481 A1     7/2021  Miyagishima
2021/0338661 A1    11/2021  Nirogi et al.
(Continued)

FOREIGN PATENT DOCUMENTS

CN        104685402  A      6/2015
CN        107024766  A      8/2017
(Continued)

OTHER PUBLICATIONS

An Office Action, "Notice of Reasons for Refusal," mailed by the Japanese Patent Office on Nov. 4, 2025, which corresponds to Japanese Patent Application No. 2022-038623 and is related to U.S. Appl. No. 17/932,228; with English language translation.
(Continued)

*Primary Examiner* — Jonathan Y Jung
(74) *Attorney, Agent, or Firm* — Studebaker Brackett PLLC

(57)        ABSTRACT

An observation optical system includes a display element and an eyepiece lens arranged on an eyepoint side of the display element. The eyepiece lens includes at least one negative lens. In a case where a half value of a longest diameter of a display region in the display element is denoted by H, and a focal length of the eyepiece lens is denoted by f, the observation optical system satisfies a conditional expression represented by 0.35<H/f<0.6.

21 Claims, 62 Drawing Sheets

EXAMPLE 20

(56)                 References Cited

U.S. PATENT DOCUMENTS

| | | | | |
|---|---|---|---|---|
| 2022/0404607 A1* | 12/2022 | Miyagishima | ........... | G02B 9/34 |
| 2023/0065152 A1* | 3/2023 | Lai | ....................... | G02B 13/006 |

FOREIGN PATENT DOCUMENTS

| | | | |
|---|---|---|---|
| CN | 107918205 | A | 4/2018 |
| JP | H06-175045 | A | 6/1994 |
| JP | H07-063997 | A | 3/1995 |
| JP | H09-005649 | A | 1/1997 |
| JP | H09-054259 | A | 2/1997 |
| JP | 2009-282180 | A | 12/2009 |
| JP | 2016-001209 | A | 1/2016 |
| JP | 2016-051065 | A | 4/2016 |
| JP | 2019-215411 | A | 12/2019 |
| JP | 2021-103238 | A | 7/2021 |
| JP | 2021-117457 | A | 8/2021 |
| WO | 2017/022670 | A1 | 2/2017 |
| WO | 2019/054358 | A1 | 3/2019 |
| WO | 2019/054359 | A1 | 3/2019 |

OTHER PUBLICATIONS

An Office Action, "Notice of Reasons for Refusal," mailed by the Japanese Patent Office on Jan. 27, 2026, which corresponds to Japanese Patent Application No. 2022-038623 and is related to U.S. Appl. No. 17/932,228; with English language translation.

* cited by examiner

EXAMPLE 1

EXAMPLE 1

EXAMPLE 1

EXAMPLE 2

EXAMPLE 2

EXAMPLE 2

EXAMPLE 3

EXAMPLE 3

EXAMPLE 3

EXAMPLE 4

EXAMPLE 4

EXAMPLE 4

EXAMPLE 5

EXAMPLE 5

EXAMPLE 5

EXAMPLE 6

EXAMPLE 6

EXAMPLE 7

EXAMPLE 7

EXAMPLE 8

EXAMPLE 8

EXAMPLE 9

EXAMPLE 9

<u>EXAMPLE 9</u>

EXAMPLE 10

EXAMPLE 10

EXAMPLE 11

EXAMPLE 11

EXAMPLE 12

EXAMPLE 12

EXAMPLE 12

EXAMPLE 13

EXAMPLE 13

EXAMPLE 14

EXAMPLE 14

EXAMPLE 15

EXAMPLE 15

EXAMPLE 16

EXAMPLE 16

EXAMPLE 16

EXAMPLE 17

<u>EXAMPLE 17</u>

EXAMPLE 18

EXAMPLE 18

EXAMPLE 18

EXAMPLE 19

EXAMPLE 19

EXAMPLE 20

EXAMPLE 20

OBSERVATION OPTICAL SYSTEM AND OPTICAL APPARATUS

CROSS-REFERENCE TO RELATED APPLICATIONS

The present application claims priority under 35 U.S.C. § 119 to Japanese Patent Application No. 2021-153578, filed on Sep. 21, 2021 and Japanese Patent Application No. 2022-038623, filed on Mar. 11, 2022. Each application above is hereby expressly incorporated by reference, in its entirety, into the present application.

BACKGROUND

Technical Field

The present disclosure relates to an observation optical system and an optical apparatus.

Related Art

In the related art, a lens system disclosed in JP2016-001209A has been known as an eyepiece lens applicable to an observation optical system.

In recent years, there has been a demand for an observation optical system that enables observation with a wider apparent field of view while having favorable performance.

SUMMARY

The present disclosure is conceived in view of the above matter, and an object thereof is to provide an observation optical system that enables observation with a wider apparent field of view while having favorable performance, and an optical apparatus comprising the observation optical system.

An observation optical system according to an aspect of the present disclosure comprises a display element, and an eyepiece lens arranged on an eyepoint side of the display element, in which the eyepiece lens includes at least one negative lens, and in a case where a half value of a longest diameter of a display region in the display element is denoted by H, and a focal length of the eyepiece lens in a state where diopter is −1 diopter is denoted by f, Conditional Expression (1) is satisfied, which is represented by $$0.35 < H/f < 0.6 \tag{1}$$

It is preferable that the eyepiece lens includes at least one positive lens on a display element side of the at least one negative lens. In addition, it is preferable that the eyepiece lens includes at least one positive lens on the eyepoint side of the at least one negative lens.

It is preferable that the eyepiece lens includes at least three lenses, and in diopter adjustment, the at least three lenses in the eyepiece lens move along an optical axis.

The number of lenses included in the eyepiece lens may be configured to be five.

It is preferable that the eyepiece lens includes at least two lenses on a display element side of the at least one negative lens. It is more preferable that the eyepiece lens includes at least two positive lenses on a display element side of the at least one negative lens.

In the following section, a negative lens having strongest optical power among negative lenses included in the eyepiece lens will be referred to as a "first negative lens". A positive lens closest to the display element side among positive lenses included in the eyepiece lens will be referred to as a "display side positive lens". A positive lens closest to the eyepoint side among the positive lenses included in the eyepiece lens will be referred to as an "EP side positive lens".

It is preferable that in a case where a paraxial curvature radius of a surface of the first negative lens on a display element side is denoted by Rnf, and a paraxial curvature radius of a surface of the first negative lens on the eyepoint side is denoted by Rnr, the observation optical system of the above aspect satisfies Conditional Expression (2) represented by $$0 < (Rnr + Rne)/(Rnr - Rnf) < 0.5 \tag{2}$$

It is preferable that the eyepiece lens includes at least one positive lens on a display element side of the at least one negative lens, and in a case where a paraxial curvature radius of a surface of the first negative lens on the display element side is denoted by Rnf, and a paraxial curvature radius of a surface of the display side positive lens on the eyepoint side is denoted by Ropr, the observation optical system of the above aspect satisfies Conditional Expression (3) represented by $$-3 < (Rnf - Ropr)/(Rnf + Ropr) < 0.2 \tag{3}$$

It is preferable that the eyepiece lens includes at least one positive lens on a display element side of the at least one negative lens, and in a case where a paraxial curvature radius of a surface of the display side positive lens on the display element side is denoted by Ropf, and a paraxial curvature radius of a surface of the display side positive lens on the eyepoint side is denoted by Ropr, the observation optical system of the above aspect satisfies Conditional Expression (4) represented by $$-4.5 < (Ropr + Ropf)/(Ropr - Rope < 2.7 \tag{4}$$

It is preferable that the eyepiece lens includes at least one positive lens on the eyepoint side of the at least one negative lens, and in a case where a paraxial curvature radius of a surface of the EP side positive lens on a display element side is denoted by Repf, and a paraxial curvature radius of a surface of the EP side positive lens on the eyepoint side is denoted by Repr, the observation optical system of the above aspect satisfies Conditional Expression (5) represented by $$-2.2 < (Repr + Repf)/(Repr - Repf) < 1.1 \tag{5}$$

It is preferable that in a case where a maximum value of d line refractive indexes of all lenses included in the eyepiece lens is denoted by Nmax, the observation optical system of the above aspect satisfies Conditional Expression (6) represented by $$1.7 < N\max < 2.1 \tag{6}$$

It is preferable that in a case where a focal length of the first negative lens is denoted by fn, the observation optical system of the above aspect satisfies Conditional Expression (7) represented by $$-2.8 < f/fn < -0.8 \tag{7}$$

It is preferable that the eyepiece lens includes at least one positive lens on a display element side of the first negative lens, and in a case where a combined focal length from a surface of the display side positive lens on the display element side to a surface of the first negative lens on the eyepoint side in a state where the diopter is −1 diopter is denoted by fopn, the observation optical system of the above aspect satisfies Conditional Expression (8) represented by $$0.1 < f/fopn < 1 \tag{8}$$

It is preferable that in a case where a combined focal length of all lenses arranged on the eyepoint side of the first negative lens in the eyepiece lens in a state where the diopter is −1 diopter is denoted by fr, the observation optical system of the above aspect satisfies Conditional Expression (9) represented by $$0.6 < f/fr < 2.2 \tag{9}$$

It is preferable that the eyepiece lens includes at least one positive lens on a display element side of the at least one negative lens, and in a case where a focal length of the display side positive lens is denoted by fop, and a focal length of the first negative lens is denoted by fn, the observation optical system of the above aspect satisfies Conditional Expression (10) represented by $$-4.5 < fop/fn < -0.5 \tag{10}$$

It is preferable that the eyepiece lens includes at least one positive lens on a display element side of the at least one negative lens, and in a case where a focal length of the display side positive lens is denoted by fop, and a combined focal length of all lenses arranged on the eyepoint side of the first negative lens in the eyepiece lens in a state where the diopter is −1 diopter is denoted by fr, the observation optical system of the above aspect satisfies Conditional Expression (11) represented by $$0.1 < fop/fr < 5.5 \tag{11}$$

It is preferable that in a case where a focal length of the first negative lens is denoted by fn, and a combined focal length of all lenses arranged on the eyepoint side of the first negative lens in the eyepiece lens in a state where the diopter is −1 diopter is denoted by fr, the observation optical system of the above aspect satisfies Conditional Expression (12) represented by $$-1 < fn/fr < -0.26 \tag{12}$$

It is preferable that the eyepiece lens includes at least one positive lens on the eyepoint side of the at least one negative lens, and in a case where a paraxial curvature radius of a surface of the EP side positive lens on a display element side is denoted by Repf, and a paraxial curvature radius of a surface of the first negative lens on the eyepoint side is denoted by Rnr, the observation optical system of the above aspect satisfies Conditional Expression (13) represented by $$0.01 < (Repf - Rnr)/(Repf + Rnr) < 3.4 \tag{13}$$

It is preferable that the eyepiece lens includes at least one positive lens on a display element side of the at least one negative lens, and in a case where a distance on an optical axis from a surface of the display side positive lens on the display element side to a lens surface of the eyepiece lens closest to the eyepoint side in a state where the diopter is −1 diopter is denoted by DL, the observation optical system of the above aspect satisfies Conditional Expression (14) represented by $$0.75 < DL/f < 2.2 \tag{14}$$

It is preferable that the eyepiece lens includes at least one positive lens on a display element side of the at least one negative lens, and in a case where a distance on an optical axis from a surface of the display side positive lens on the display element side to a surface of the first negative lens on the eyepoint side in a state where the diopter is −1 diopter is denoted by DLopn, a distance on the optical axis from a display surface of the display element to the surface of the first negative lens on the eyepoint side in a state where the diopter is −1 diopter is denoted by Tn, and in a case where an optical member not having optical power is arranged between the display surface of the display element and the surface of the first negative lens on the eyepoint side, Tn is calculated using an air-equivalent length for the optical member, the observation optical system of the above aspect satisfies Conditional Expression (15) represented by $$0.4 < DLopn/Tn < 0.9 \tag{15}$$

It is preferable that in a case where an air interval on an optical axis between the first negative lens and a lens adjacent to a display element side of the first negative lens is denoted by Dgnf, and a focal length of the first negative lens is denoted by fn, the observation optical system of the above aspect satisfies Conditional Expression (16) represented by $$-0.9 < Dgnf/fn < -0.01 \tag{16}$$

It is preferable that in a case where an air interval on an optical axis between the first negative lens and a lens adjacent to the eyepoint side of the first negative lens is denoted by Dgnr, and a focal length of the first negative lens is denoted by fn, the observation optical system of the above aspect satisfies Conditional Expression (17) represented by $$-0.7 < Dgnr/fn < -0.01 \tag{17}$$

An optical apparatus according to another aspect of the present disclosure comprises the observation optical system of the above aspect.

In the present specification, "consist of" or "consisting of" is intended to mean that a lens that substantially does not have optical power, optical elements such as a stop, a filter, and a cover glass other than a lens, and a lens flange, a lens barrel, and the like may be included in addition to illustrated constituents.

In the present specification, a "lens having positive optical power" and a "positive lens" have the same meaning. A "lens having negative optical power" and a "negative lens" have the same meaning. A "single lens" means one non-cemented lens. A compound aspherical lens (a lens that is composed of a spherical lens and of a film of an aspherical shape formed on the spherical lens as a single body and that functions as one aspherical lens as a whole) is not regarded as a cemented lens and is treated as one lens. A sign of optical power, a curvature radius, and a surface shape related to a lens including an aspherical surface in a paraxial region are used unless otherwise specified. For a sign of the curvature radius, the sign of the curvature radius of a surface having a shape of a convex surface facing toward the display element side is positive, and the sign of the curvature radius of a surface having a shape of a convex surface facing toward the eyepoint side is negative.

The "focal length" used in the conditional expressions is a paraxial focal length. The values used in the conditional expressions are values in a case based on a d line. The "distance on the optical axis" used in the conditional expressions is a geometrical distance on the optical axis unless otherwise specified. In the present specification, "d line", "C line", and "F line" are bright lines. A wavelength of the d line is 587.56 nanometers (nm). A wavelength of the C line is 656.27 nanometers (nm). A wavelength of the F line is 486.13 nanometers (nm).

According to the present disclosure, an observation optical system that enables observation with a wider apparent field of view while having favorable performance, and an optical apparatus including the observation optical system can be provided.

DESCRIPTION OF EMBODIMENTS

Hereinafter, an embodiment of the present disclosure will be described with reference to the drawings.

Figure 1:
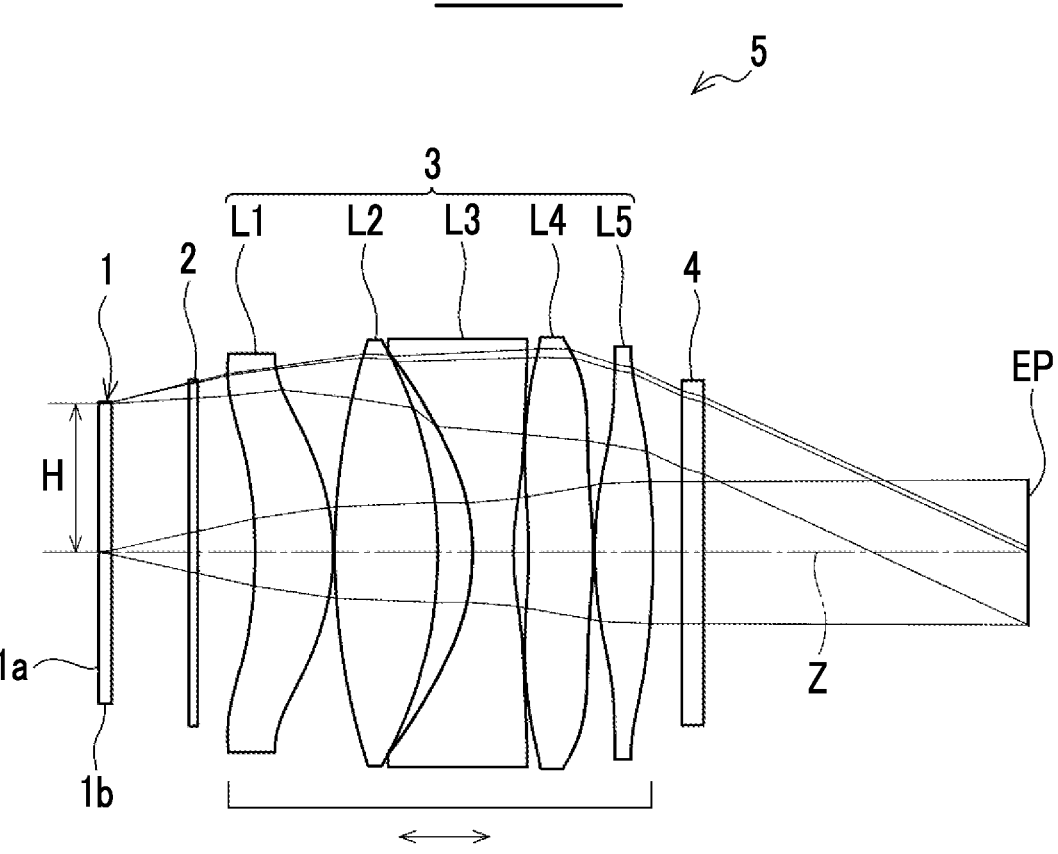
FIG. 1 is a cross-sectional view that corresponds to an observation optical system of Example 1 and illustrates a configuration and luminous flux of an observation optical system according to one embodiment.

FIG. 1 illustrates a cross-sectional view of a configuration and luminous flux of an observation optical system 5 according to one embodiment of the present disclosure. The example illustrated in FIG. 1 corresponds to Example 1 described later. In FIG. 1, on-axis luminous flux and off-axis luminous flux corresponding to a maximum apparent field of view are illustrated as the luminous flux. In FIG. 1, a left side is illustrated as a display element side, and a right side is illustrated as an eyepoint side. An eyepoint EP in FIG. 1 does not illustrate a shape and illustrates a position in an optical axis direction.

The observation optical system 5 comprises a display element 1 and an eyepiece lens 3 arranged on the eyepoint side of the display element 1. The display element 1 is an element that displays an image. The display element 1 includes a display region 1*a* in which the image is displayed, and a cover member 1*b* consisting of an optical member not having optical power. In the example in FIG. 1, the display region 1*a* is positioned on a surface of the cover member 1*b* on the display element side. For example, the display element 1 can be configured as an image display panel consisting of a liquid crystal display device or of an organic electroluminescence (EL) display element. The display element 1 and the eyepiece lens 3 are arranged at a predetermined air interval. In a case where the interval between the display element 1 and the eyepiece lens 3 is configured to change in diopter adjustment, providing the air interval facilitates securing of an interval for diopter adjustment.

The display element 1 is an example of an observed object. The eyepiece lens 3 is used for observing the image displayed in the display region 1*a* of the display element 1. That is, the observation optical system 5 is configured to observe the image displayed on the display element 1 through the eyepiece lens 3.

In the example in FIG. 1, an optical member 2 is arranged between the display element 1 and the eyepiece lens 3, and an optical member 4 is arranged between the eyepiece lens 3 and the eyepoint EP. The optical member 2 and the optical member 4 are parallel flat plate-shaped members not having optical power and are assumed to be cover glass for protection, various filters, or the like. In the disclosed technology, a configuration in which at least one of the optical member 2 or the optical member 4 is removed is also available.

The eyepiece lens 3 of the present embodiment is configured to include at least one negative lens. This configuration is advantageous for correcting a chromatic aberration. Furthermore, the eyepiece lens 3 preferably includes at least one positive lens on the display element side of the at least one negative lens. Such a case is advantageous for correcting the chromatic aberration while suppressing an increase in diameter of the optical system. In addition, the eyepiece lens 3 preferably includes at least one positive lens on the eyepoint side of the at least one negative lens. Such a case is advantageous for increasing the apparent field of view while suppressing an increase in diameter of the optical system.

In a case where the eyepiece lens 3 includes a plurality of negative lenses, the "display element side of the at least one negative lens" means the display element side of any one negative lens of the plurality of negative lenses included in the eyepiece lens 3. Similarly, the "eyepoint side of the at least one negative lens" means the eyepoint side of any one negative lens of the plurality of negative lenses included in the eyepiece lens 3. The same applies to the "display element side of the at least one negative lens" and the "eyepoint side of the at least one negative lens" in the following description.

The eyepiece lens 3 preferably includes at least two lenses on the display element side of the at least one negative lens. Such a case is advantageous for correcting a field curvature. The eyepiece lens 3 more preferably includes at least two positive lenses on the display element side of the at least one negative lens. In such a case, an advantageous effect for correcting a chromatic aberration while suppressing an increase in diameter of the optical system can be obtained in addition to the advantageous effect for correcting the field curvature.

The number of lenses included in the eyepiece lens 3 may be configured to be greater than or equal to four. Such a case is advantageous for favorably correcting the overall aberration. For example, as in the example in FIG. 1, the number of lenses included in the eyepiece lens 3 may be configured to be five. Such a case is advantageous for achieving a small configuration by decreasing the number of lenses while favorably correcting the overall aberration.

As an example, the eyepiece lens 3 in FIG. 1 consists of a lens L1 having positive optical power, a lens L2 having positive optical power, a lens L3 having negative optical power, a lens L4 having positive optical power, and a lens L5 having positive optical power in order from the display element side to the eyepoint side.

In a configuration in which the eyepiece lens 3 includes at least three lenses, the at least three lenses in the eyepiece lens 3 may be configured to move along an optical axis Z in the diopter adjustment. Such a case is advantageous for suppressing aberration changes in the diopter adjustment. In the example in FIG. 1, five lenses of the lens L1 to the lens L5 move as a single body along the optical axis Z in the diopter adjustment. A bracket and a bidirectional arrow in a horizontal direction below the lens L1 to the lens L5 in FIG. 1 illustrate that these five lenses move as a single body along the optical axis Z in the diopter adjustment. In the present specification, "moving as a single body" means moving by the same amount in the same direction at the same time.

Next, preferable configurations and available configurations related to conditional expressions of the observation optical system 5 will be described. In the following description, a negative lens having strongest optical power among the negative lenses included in the eyepiece lens 3 will be referred to as a "first negative lens". A positive lens closest to the display element side among the positive lenses included in the eyepiece lens 3 will be referred to as a "display side positive lens". A positive lens closest to the eyepoint side among the positive lenses included in the eyepiece lens 3 will be referred to as an "EP side positive lens". For example, in the example in FIG. 1, the lens L3 corresponds to the first negative lens. The lens L1 corresponds to the display side positive lens. The lens L5 corresponds to the EP side positive lens. In the following description, description related to the "display side positive lens" is based on a configuration in which the eyepiece lens 3 includes at least one positive lens on the display element side of the at least one negative lens. In addition, in the following description, description related to the "EP side positive lens" is based on a configuration in which the eyepiece lens 3 includes at least one positive lens on the eyepoint side of the at least one negative lens. In addition, in the following description, description related to "all lenses arranged on the eyepoint side of the first negative lens in the eyepiece lens 3" is based on a configuration in which the eyepiece lens 3 includes at least one lens on the eyepoint side of the first negative lens.

In a case where a half value of a longest diameter of the display region 1a in the display element 1 is denoted by H, and a focal length of the eyepiece lens 3 in a state where diopter is −1 diopter is denoted by f, the observation optical system 5 preferably satisfies Conditional Expression (1) below. Causing a corresponding value of Conditional Expression (1) not to be less than or equal to a lower limit thereof is advantageous for increasing the apparent field of view. Causing the corresponding value of Conditional Expression (1) not to be greater than or equal to an upper limit thereof is advantageous for suppressing aberrations such as the field curvature. In order to obtain more favorable characteristics, the observation optical system 5 more preferably satisfies Conditional Expression (1-1) below and still more preferably satisfies Conditional Expression (1-2) below.

$$0.35 < H/f < 0.6 \tag{1}$$

$$0.4 < H/f < 0.55 \tag{1-1}$$

$$0.417 < H/f < 0.482 \tag{1-2}$$

In the present specification, the "longest diameter of the display region 1a in the display element 1" related to H means a double value of a distance between the optical axis Z and a point most separated from the optical axis Z in a diameter direction in the display region 1a that coincides with the optical axis Z at a centroid thereof. For example, in a case where the display region 1a has a rectangular shape, a half length of a diagonal of the display region 1a can be set as H. In addition, for example, in a case where the display region 1a is a perfect circle, a radius of the display region 1a can be set as H. In a case where the display region 1a is an ellipse, a half of the longest diameter (major axis) among diameters of the display region 1a can be set as H.

In addition, the display region 1a means a region in which the image is actually displayed. For example, in a case where the display element 1 comprises a display portion of an aspect ratio of 4:3 in which a plurality of pixels are arranged, and an image of an aspect ratio of 3:2 is displayed in a part of the display portion, the display region 1a refers to a region in which the image of the aspect ratio of 3:2 is displayed. Accordingly, a diameter of the display element 1 does not necessarily coincide with the longest diameter of the display region 1a.

In a case where a paraxial curvature radius of a surface of the first negative lens on the display element side is denoted by Rnf, and a paraxial curvature radius of a surface of the first negative lens on the eyepoint side is denoted by Rnr, the observation optical system 5 preferably satisfies Conditional Expression (2) below. Causing a corresponding value of Conditional Expression (2) not to be less than or equal to a lower limit thereof prevents an excessive increase in refraction of a ray by the surface of the first negative lens on the eyepoint side and thus, is advantageous for suppressing a lateral chromatic aberration. Causing the corresponding value of Conditional Expression (2) not to be greater than or equal to an upper limit thereof prevents an excessive increase in refraction of the ray by the surface of the first negative lens on the display element side and thus, is advantageous for suppressing the field curvature. In order to obtain more favorable characteristics, the observation optical system 5 more preferably satisfies Conditional Expression (2-1) below and still more preferably satisfies Conditional Expression (2-2) below.

$$0 < (Rnr + Rnf)/(Rnr − Rnf) < 0.5 \tag{2}$$

$$0.002 < (Rnr + Rnf)/(Rnr − Rnf) < 0.4 \tag{2-1}$$

$$0.004 < (Rnr + Rnf)/(Rnr − Rnf) < 0.313 \tag{2-2}$$

In a configuration in which the eyepiece lens 3 includes at least one positive lens on the display element side of the first negative lens, the observation optical system 5 preferably satisfies Conditional Expression (3) below. Here, the paraxial curvature radius of the surface of the first negative lens on the display element side is denoted by Rnf. In addition, a paraxial curvature radius of a surface of the display side positive lens on the eyepoint side is denoted by Ropr. Causing a corresponding value of Conditional Expression (3) not to be less than or equal to a lower limit thereof prevents an excessive increase in refraction of the ray by the surface of the first negative lens on the display element side with respect to refraction of an off-axis ray by the surface of the display side positive lens on the eyepoint side and thus, can suppress excessive correction of the lateral chromatic aberration. Causing the corresponding value of Conditional Expression (3) not to be greater than or equal to an upper limit thereof prevents an excessive decrease in refraction of the ray by the surface of the first negative lens on the display element side with respect to refraction of the off-axis ray by the surface of the display side positive lens on the eyepoint side and thus, can suppress insufficient correction of the lateral chromatic aberration. In order to obtain more favorable characteristics, the observation optical system 5 more preferably satisfies Conditional Expression (3-1) below and still more preferably satisfies Conditional Expression (3-2) below.

$$-3 < (Rnf - Ropr)/(Rnf + Ropr) < 0.2 \tag{3}$$

$$-0.3 < (Rnf - Ropr)/(Rnf + Ropr) < 0.15 \tag{3-1}$$

$$-0.05 < (Rnf - Ropr)/(Rnf + Ropr) < 0.07 \tag{3-2}$$

In a case where a paraxial curvature radius of a surface of the display side positive lens on the display element side is denoted by Ropf, and the paraxial curvature radius of the surface of the display side positive lens on the eyepoint side is denoted by Ropr, the observation optical system 5 preferably satisfies Conditional Expression (4) below. Causing a corresponding value of Conditional Expression (4) not to be less than or equal to a lower limit thereof prevents an excessive increase in refraction of the off-axis ray by the surface of the display side positive lens on the eyepoint side and thus, is advantageous for correcting a coma aberration. Causing the corresponding value of Conditional Expression (4) not to be greater than or equal to an upper limit thereof prevents an excessive increase in positive optical power of the surface of the display side positive lens on the display element side or prevents an excessive decrease in negative optical power of the surface of the display side positive lens on the display element side and thus, is advantageous for suppressing a distortion having a barrel shape. In order to obtain more favorable characteristics, the observation optical system 5 more preferably satisfies Conditional Expression (4-1) below and still more preferably satisfies Conditional Expression (4-2) below.

$$-4.5 < (Ropr + Ropf)/(Ropr - Ropf) < 2.7 \tag{4}$$

$$-3.5 < (Ropr + Ropf)/(Ropr - Ropf) < 0.5 \tag{4-1}$$

$$-3.1 < (Ropr + Ropf)/(Ropr - Ropf) < 0 \tag{4-2}$$

In a case where a paraxial curvature radius of a surface of the EP side positive lens on the display element side is denoted by Repf, and a paraxial curvature radius of a surface of the EP side positive lens on the eyepoint side is denoted by Repr, the observation optical system 5 preferably satisfies Conditional Expression (5) below. Causing a corresponding value of Conditional Expression (5) not to be less than or equal to a lower limit thereof can suppress a situation in which a part of the surface of the EP side positive lens on the eyepoint side through which the off-axis ray passes has a shape in which a distance from the eyepoint EP is increased, and thus, is advantageous for achieving size reduction. Causing the corresponding value of Conditional Expression (5) not to be greater than or equal to an upper limit thereof prevents an excessive increase in positive optical power of the surface of the EP side positive lens on the display element side or prevents an excessive decrease in negative optical power of the surface of the EP side positive lens on the display element side and thus, is advantageous for correcting the field curvature. In order to obtain more favorable characteristics, the observation optical system 5 more preferably satisfies Conditional Expression (5-1) below and still more preferably satisfies Conditional Expression (5-2) below.

$$-2.2 < (Repr + Repf)/(Repr - Repf) < 1.1 \tag{5}$$

$$-0.5 < (Repr + Repf)/(Repr - Repf) < 0.9 \tag{5-1}$$

$$0.2 < (Repr + Repf)/(Repr - Repf) < 0.79 \tag{5-2}$$

In a case where a maximum value of d line refractive indexes of all lenses included in the eyepiece lens 3 is denoted by Nmax, the observation optical system 5 preferably satisfies Conditional Expression (6) below. Causing a corresponding value of Conditional Expression (6) not to be less than or equal to a lower limit thereof can suppress an increase in Petzval sum and thus, is advantageous for correcting the field curvature. Causing the corresponding value of Conditional Expression (6) not to be greater than or equal to an upper limit thereof is advantageous for correcting the chromatic aberration. In addition, causing the corresponding value of Conditional Expression (6) not to be greater than or equal to the upper limit thereof can contribute to improvement of productivity in processing a lens material. In order to obtain more favorable characteristics, the observation optical system 5 more preferably satisfies Conditional Expression (6-1) below and still more preferably satisfies Conditional Expression (6-2) below.

$$1.7 < Nmax < 2.1 \tag{6}$$

$$1.75 < Nmax < 1.93 \tag{6-1}$$

$$1.8 < Nmax < 1.85 \tag{6-2}$$

In a case where the focal length of the eyepiece lens 3 in a state where the diopter is −1 diopter is denoted by f, and a focal length of the first negative lens is denoted by fn, the observation optical system 5 preferably satisfies Conditional Expression (7) below. Causing a corresponding value of Conditional Expression (7) not to be less than or equal to a lower limit thereof is advantageous for suppressing an aberration that occurs because of a manufacturing error. Causing the corresponding value of Conditional Expression (7) not to be greater than or equal to an upper limit thereof is advantageous for suppressing the chromatic aberration. In order to obtain more favorable characteristics, the observation optical system 5 more preferably satisfies Conditional Expression (7-1) below and still more preferably satisfies Conditional Expression (7-2) below.

$$-2.8 < f/fn < -0.8 \tag{7}$$

$$-2.2 < f/fn < -1.1 \tag{7-1}$$

$$-1.94 < f/fn < -1.4 \tag{7-2}$$

In a configuration in which the eyepiece lens 3 includes at least one positive lens on the display element side of the first negative lens, the observation optical system 5 preferably satisfies Conditional Expression (8) below. Here, the focal length of the eyepiece lens 3 in a state where the diopter is −1 diopter is denoted by f. In addition, a combined focal length from the surface of the display side positive lens on the display element side to the surface of the first negative lens on the eyepoint side in a state where the diopter is −1 diopter is denoted by fopn. Causing a corresponding value of Conditional Expression (8) not to be less than or equal to a lower limit thereof can suppress a decrease in positive combined optical power from the display side positive lens to the first negative lens and thus, can suppress an increase in negative optical power of the first negative lens. Accordingly, this is advantageous for correcting various aberrations such as an astigmatism and the field curvature. Causing the corresponding value of Conditional Expression (8) not to be greater than or equal to an upper limit thereof can suppress an increase in positive combined optical power from the display side positive lens to the first negative lens and thus, is advantageous for securing a wide apparent field of view and securing a high eyepoint. In order to obtain more favorable characteristics, the observation optical system 5 more preferably satisfies Conditional Expression (8-1) below and still more preferably satisfies Conditional Expression (8-2) below.

$$0.1 < f/fopn < 1 \tag{8}$$

$$0.2 < f/fopn < 0.75 \tag{8-1}$$

$$0.3 < f/fopn < 0.46 \tag{8-2}$$

The observation optical system 5 preferably satisfies Conditional Expression (9) below. Here, the focal length of the eyepiece lens 3 in a state where the diopter is −1 diopter is denoted by f. In addition, a combined focal length of all lenses arranged on the eyepoint side of the first negative lens in the eyepiece lens 3 in a state where the diopter is −1 diopter is denoted by fr. In the example in FIG. 1, a combined focal length of the lens L4 and the lens L5 corresponds to fr. Causing a corresponding value of Conditional Expression (9) not to be less than or equal to a lower limit thereof can suppress a decrease in positive combined optical power of all lenses arranged on the eyepoint side of the first negative lens in the eyepiece lens 3 and thus, is advantageous for suppressing the astigmatism and a spherical aberration. Causing the corresponding value of Conditional Expression (9) not to be greater than or equal to an upper limit thereof can suppress a decrease in optical power of the eyepiece lens 3 and thus, is advantageous for securing a wide apparent field of view. In order to obtain more favorable characteristics, the observation optical system 5 more preferably satisfies Conditional Expression (9-1) below and still more preferably satisfies Conditional Expression (9-2) below.

$$0.6 < f/fr < 2.2 \tag{9}$$

$$0.86 < f/fr < 1.75 \tag{9-1}$$

$$1 < f/fr < 1.56 \tag{9-2}$$

In a case where a focal length of the display side positive lens is denoted by fop, and the focal length of the first negative lens is denoted by fn, the observation optical system 5 preferably satisfies Conditional Expression (10) below. Causing a corresponding value of Conditional Expression (10) not to be less than or equal to a lower limit thereof can suppress an increase in negative optical power of the first negative lens and thus, is advantageous for suppressing the astigmatism and correcting the field curvature.

Causing the corresponding value of Conditional Expression (10) not to be greater than or equal to an upper limit thereof can suppress a decrease in negative optical power of the first negative lens and thus, is advantageous for size reduction in the optical axis direction in a case of securing a wide apparent field of view. In order to obtain more favorable characteristics, the observation optical system 5 more preferably satisfies Conditional Expression (10-1) below, still more preferably satisfies Conditional Expression (10-2) below, and still further preferably satisfies Conditional Expression (10-3).

$$-4.5 < fop/fn < -0.5 \tag{10}$$

$$-4.4 < fop/fn < -0.6 \tag{10-1}$$

$$-4.3 < fop/fn < -0.8 \tag{10-2}$$

$$-4.1 < fop/fn < -1 \tag{10-3}$$

The observation optical system 5 preferably satisfies Conditional Expression (11) below. Here, the focal length of the display side positive lens is denoted by fop. In addition, the combined focal length of all lenses arranged on the eyepoint side of the first negative lens in the eyepiece lens 3 in a state where the diopter is −1 diopter is denoted by fr. Causing a corresponding value of Conditional Expression (11) not to be less than or equal to a lower limit thereof can suppress a decrease in optical power of the EP side positive lens and thus, is advantageous for suppressing the astigmatism and the spherical aberration. Causing the corresponding value of Conditional Expression (11) not to be greater than or equal to an upper limit thereof can suppress a decrease in positive optical power of the display side positive lens and thus, can suppress a relatively excessive influence of the negative optical power of the first negative lens. Accordingly, this is advantageous for correcting the astigmatism and the field curvature. In order to obtain more favorable characteristics, the observation optical system 5 more preferably satisfies Conditional Expression (11-1) below and still more preferably satisfies Conditional Expression (11-2) below.

$$0.1 < fop/fr < 5.5 \tag{11}$$

$$0.5 < fop/fr < 4.2 \tag{11-1}$$

$$1.5 < fop/fr < 3.33 \tag{11-2}$$

In a case where the focal length of the first negative lens is denoted by fn, and the combined focal length of all lenses arranged on the eyepoint side of the first negative lens in the eyepiece lens 3 in a state where the diopter is −1 diopter is denoted by fr, the observation optical system 5 preferably satisfies Conditional Expression (12) below. Causing a corresponding value of Conditional Expression (12) not to be less than or equal to a lower limit thereof can suppress a decrease in negative optical power of the first negative lens and thus, is advantageous for size reduction in the optical axis direction in a case of securing a wide apparent field of view. Causing the corresponding value of Conditional Expression (12) not to be greater than or equal to an upper limit thereof can suppress a decrease in optical power of the EP side positive lens and thus, is advantageous for suppressing the astigmatism and the spherical aberration. In order to obtain more favorable characteristics, the observation optical system 5 more preferably satisfies Conditional Expression (12-1) below and still more preferably satisfies Conditional Expression (12-2) below.

$$-1 < fn/fr < -0.26 \tag{12}$$

$$-0.95 < fn/fr < -0.34 \tag{12-1}$$

$$-0.87 < fn/fr < -0.57 \tag{12-2}$$

In a case where the paraxial curvature radius of the surface of the EP side positive lens on the display element side is denoted by Repf, and the paraxial curvature radius of the surface of the first negative lens on the eyepoint side is denoted by Rnr, the observation optical system 5 preferably satisfies Conditional Expression (13) below. Causing a corresponding value of Conditional Expression (13) not to be less than or equal to a lower limit thereof can suppress an excessive increase in refraction of the off-axis ray by the surface of the EP side positive lens on the display element side with respect to refraction of the off-axis ray by the surface of the first negative lens on the eyepoint side and thus, is advantageous for correcting the spherical aberration and securing a high eyepoint. Causing the corresponding value of Conditional Expression (13) not to be greater than or equal to an upper limit thereof can suppress a decrease in refraction of the off-axis ray by the surface of the EP side positive lens on the display element side with respect to refraction of the off-axis ray by the surface of the first negative lens on the eyepoint side and thus, is advantageous for suppressing the field curvature and the astigmatism. In order to obtain more favorable characteristics, the observation optical system 5 more preferably satisfies Conditional Expression (13-1) below and still more preferably satisfies Conditional Expression (13-2) below.

$$0.01 < (Repf-Rnr)/(Repf+Rnr) < 3.4 \tag{13}$$

$$0.03 < (Repf-Rnr)/(Repf+Rnr) < 2 \tag{13-1}$$

$$0.06 < (Repf-Rnr)/(Repf+Rnr) < 0.29 \tag{13-2}$$

Figure 2:
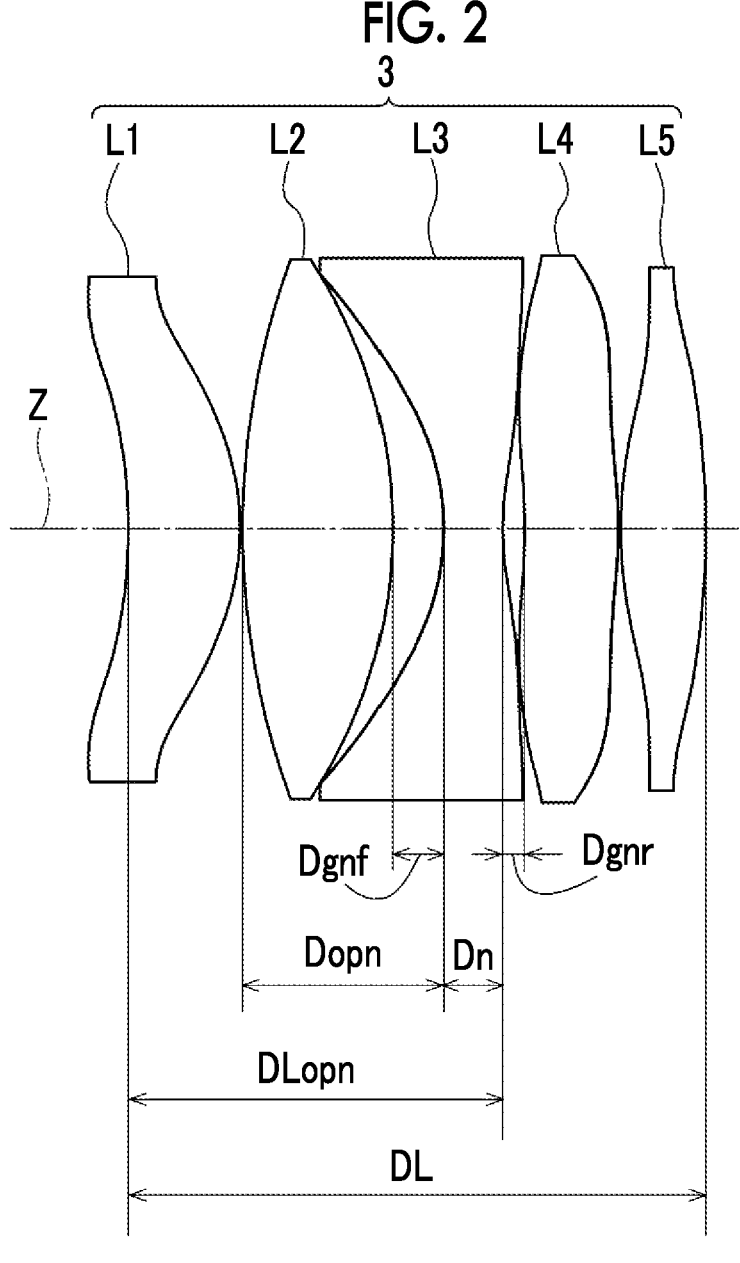
FIG. 2 is a cross-sectional view for describing a configuration of an eyepiece lens in FIG. 1.

The observation optical system 5 preferably satisfies Conditional Expression (14) below. Here, the focal length of the eyepiece lens 3 in a state where the diopter is −1 diopter is denoted by f. In addition, a distance on the optical axis from the surface of the display side positive lens on the display element side to a lens surface of the eyepiece lens 3 closest to the eyepoint side in a state where the diopter is −1 diopter is denoted by DL. As an example, the distance DL is illustrated in FIG. 2. FIG. 2 is a cross-sectional view for describing a configuration of the eyepiece lens 3 in FIG. 1. In FIG. 2, a left side is illustrated as the display element side, and a right side is illustrated as the eyepoint side. Causing a corresponding value of Conditional Expression (14) not to be less than or equal to a lower limit thereof can suppress a decrease in optical power of the eyepiece lens 3 and thus, is advantageous for securing a wide apparent field of view. Causing the corresponding value of Conditional Expression (14) not to be greater than or equal to an upper limit thereof is advantageous for reducing a total length of the observation optical system 5. In order to obtain more favorable characteristics, the observation optical system 5 more preferably satisfies Conditional Expression (14-1) below and still more preferably satisfies Conditional Expression (14-2) below.

$$0.75 < DL/f < 2.2 \tag{14}$$

$$1.05 < DL/f < 1.9 \tag{14-1}$$

$$1.12 < DL/f < 1.63 \tag{14-2}$$

The observation optical system 5 preferably satisfies Conditional Expression (15) below. Here, a distance on the optical axis from the surface of the display side positive lens on the display element side to the surface of the first negative lens on the eyepoint side in a state where the diopter is −1 diopter is denoted by DLopn. As an example, the distance DLopn is illustrated in FIG. 2. In addition, a distance on the optical axis from a display surface of the display element 1 to the surface of the first negative lens on the eyepoint side in a state where the diopter is −1 diopter is denoted by Tn. In a case where an optical member not having optical power is arranged between the display surface of the display element 1 and the surface of the first negative lens on the eyepoint side, Tn is calculated using an air-equivalent length for the optical member not having optical power. Causing a corresponding value of Conditional Expression (15) not to be less than or equal to a lower limit thereof can suppress a steep change in the ray between the display surface of the display element 1 and the first negative lens and thus, is advantageous for correcting the aberrations such as the chromatic aberration and the field curvature. Causing the corresponding value of Conditional Expression (15) not to be greater than or equal to an upper limit thereof is advantageous for reducing the total length of the observation optical system 5. In order to obtain more favorable characteristics, the observation optical system 5 more preferably satisfies Conditional Expression (15-1) below and still more preferably satisfies Conditional Expression (15-2) below.

$$0.4 < DLopn/Tn < 0.9 \tag{15}$$

$$0.5 < DLopn/Tn < 0.8 \tag{15-1}$$

$$0.56 < DLopn/Tn < 0.72 \tag{15-2}$$

The calculation of Tn will be described. In the example in FIG. 1, a position of the display surface of the display element 1 in the optical axis direction is the same as a position of the display region 1a. In the example in FIG. 1, the optical member that does not have optical power and that is arranged between the display surface of the display element 1 and the surface of the first negative lens on the eyepoint side is the cover member 1b and the optical member 2. Thus, in the example in FIG. 1, Tn is a sum of an air-equivalent length of the cover member 1b of the display element 1 in the optical axis direction, an air interval between the display element 1 and the optical member 2, an air-equivalent length of the optical member 2 in the optical axis direction, an air interval between the optical member 2 and the lens L1, and DLopn. The same can be considered for a case of performing the calculation using the air-equivalent length for the optical member not having optical power in the following description.

The observation optical system 5 preferably satisfies Conditional Expression (16) below. Here, an air interval on the optical axis between the first negative lens and a lens adjacent to the display element side of the first negative lens is denoted by Dgnf. In addition, the focal length of the first negative lens is denoted by fn. In the example in FIG. 1, the lens L2 corresponds to the lens adjacent to the display element side of the first negative lens. As an example, the air interval Dgnf is illustrated in FIG. 2. Causing a corresponding value of Conditional Expression (16) not to be less than or equal to a lower limit thereof is advantageous for correcting a distortion. Causing the corresponding value of Conditional Expression (16) not to be greater than or equal to an upper limit thereof can suppress excessive correction of the distortion. In order to obtain more favorable characteristics, the observation optical system 5 more preferably satisfies Conditional Expression (16-1) below and still more preferably satisfies Conditional Expression (16-2) below.

$$-0.9 < Dgnf/fn < -0.01 \tag{16}$$

$$-0.7 < Dgnf/fn < -0.05 \tag{16-1}$$

$$-0.46 < Dgnf/fn < -0.11 \tag{16-2}$$

The observation optical system 5 preferably satisfies Conditional Expression (17) below. Here, an air interval on the optical axis between the first negative lens and a lens adjacent to the eyepoint side of the first negative lens is denoted by Dgnr. In addition, the focal length of the first negative lens is denoted by fn. In the example in FIG. 1, the lens L4 corresponds to the lens adjacent to the eyepoint side of the first negative lens. As an example, the air interval Dgnr is illustrated in FIG. 2. Causing a corresponding value of Conditional Expression (17) not to be less than or equal to a lower limit thereof is advantageous for size reduction. Causing the corresponding value of Conditional Expression (17) not to be greater than or equal to an upper limit thereof is advantageous for correcting the field curvature. In order to obtain more favorable characteristics, the observation optical system 5 more preferably satisfies Conditional Expression (17-1) below and still more preferably satisfies Conditional Expression (17-2) below.

$$-0.7 < Dgnr/fn < -0.01 \tag{17}$$

$$-0.4 < Dgnr/fn < -0.02 \tag{17-1}$$

$$-0.27 < Dgnr/fn < -0.04 \tag{17-2}$$

In a case where the half value of the longest diameter of the display region 1a in the display element 1 is denoted by H, and the focal length of the first negative lens is denoted by fn, the observation optical system 5 preferably satisfies Conditional Expression (18) below. Causing a corresponding value of Conditional Expression (18) not to be less than or equal to a lower limit thereof can suppress an increase in negative optical power of the first negative lens and thus, is advantageous for correcting the lateral chromatic aberration and the field curvature. Causing the corresponding value of Conditional Expression (18) not to be greater than or equal to an upper limit thereof can suppress a decrease in negative optical power of the first negative lens and a decrease in divergence of the ray heading toward the EP side positive lens from the first negative lens. Accordingly, this is advantageous for size reduction in the optical axis direction in a case of securing a wide apparent field of view. In order to obtain more favorable characteristics, the observation optical system 5 more preferably satisfies Conditional Expression (18-1) below and still more preferably satisfies Conditional Expression (18-2) below.

$$-1.05 < H/fn < -0.4 \tag{18}$$

$$-0.95 < H/fn < -0.55 \tag{18-1}$$

$$-0.86 < H/fn < -0.64 \tag{18-2}$$

The observation optical system 5 preferably satisfies Conditional Expression (19) below. Here, the half value of the longest diameter of the display region 1a in the display element 1 is denoted by H. In addition, the combined focal length of all lenses arranged on the eyepoint side of the first negative lens in the eyepiece lens 3 in a state where the diopter is −1 diopter is denoted by fr. Causing a corresponding value of Conditional Expression (19) not to be less than or equal to a lower limit thereof can suppress a decrease in positive combined optical power of all lenses arranged on the eyepoint side of the first negative lens in the eyepiece lens 3 and thus, is advantageous for suppressing the astigmatism and the spherical aberration. Causing the corresponding value of Conditional Expression (19) not to be greater than or equal to an upper limit thereof is advantageous for suppressing the aberrations such as the field curvature. In order to obtain more favorable characteristics, the observation optical system 5 more preferably satisfies Conditional Expression (19-1) below and still more preferably satisfies Conditional Expression (19-2) below.

$$0.22 < H/fr < 0.92 \tag{19}$$

$$0.3 < H/fr < 0.8 \tag{19-1}$$

$$0.39 < H/fr < 0.71 \tag{19-2}$$

In a case where the focal length of the eyepiece lens 3 in a state where the diopter is −1 diopter is denoted by f, and the focal length of the display side positive lens is denoted by fop, the observation optical system 5 preferably satisfies Conditional Expression (20) below. Causing a corresponding value of Conditional Expression (20) not to be less than or equal to a lower limit thereof can suppress a decrease in positive optical power of the display side positive lens and thus, can suppress a relatively excessive influence of the negative optical power of the first negative lens. Accordingly, this is advantageous for correcting the astigmatism and the field curvature. Causing the corresponding value of Conditional Expression (20) not to be greater than or equal to an upper limit thereof can suppress a decrease in optical power of the eyepiece lens 3 and thus, is advantageous for securing a wide apparent field of view. In order to obtain more favorable characteristics, the observation optical system 5 more preferably satisfies Conditional Expression (20-1) below and still more preferably satisfies Conditional Expression (20-2) below.

$$0.22 < f/fop < 1.95 \tag{20}$$

$$0.33 < f/fop < 1.73 \tag{20-1}$$

$$0.44 < f/fop < 0.75 \tag{20-2}$$

The observation optical system 5 preferably satisfies Conditional Expression (21) below. Here, a distance on the optical axis from the surface of the display side positive lens on the eyepoint side to the surface of the first negative lens on the display element side in a state where the diopter is −1 diopter is denoted by Dopn. In addition, a thickness of the first negative lens on the optical axis is denoted by Dn. As an example, the distance Dopn and the thickness Dn are illustrated in FIG. 2. Causing a corresponding value of Conditional Expression (21) not to be less than or equal to a lower limit thereof facilitates securing of a distance for increasing a luminous flux diameter and thus, is advantageous for increasing the apparent field of view. Causing the corresponding value of Conditional Expression (21) not to be greater than or equal to an upper limit thereof facilitates securing of a sufficient thickness of the first negative lens and thus, is advantageous for correcting the lateral chromatic aberration. In order to obtain more favorable characteristics, the observation optical system 5 more preferably satisfies Conditional Expression (21-1) below and still more preferably satisfies Conditional Expression (21-2) below.

$$0.5 < Dopn/Dn < 7 \tag{21}$$

$$2.1 < Dopn/Dn < 5.9 \tag{21-1}$$

$$3.2 < Dopn/Dn < 4 \tag{21-2}$$

The observation optical system 5 preferably satisfies Conditional Expression (22) below. Here, the distance on the optical axis from the surface of the display side positive lens on the eyepoint side to the surface of the first negative lens on the display element side in a state where the diopter is –1 diopter is denoted by Dopn. In addition, a distance on the optical axis from the display surface of the display element 1 to the lens surface of the eyepiece lens 3 closest to the eyepoint side in a state where the diopter is –1 diopter is denoted by TTL. In a case where an optical member not having optical power is arranged between the display surface of the display element 1 and the lens surface of the eyepiece lens 3 closest to the eyepoint side, TTL is calculated using an air-equivalent length for the optical member not having optical power. Causing a corresponding value of Conditional Expression (22) not to be less than or equal to a lower limit thereof can suppress a decrease in optical power of the eyepiece lens 3 and thus, is advantageous for securing a wide apparent field of view. Causing the corresponding value of Conditional Expression (22) not to be greater than or equal to an upper limit thereof can secure the total length of an appropriate length for bending the diverging ray to converge and thus, can prevent a steep change in an angle of the ray. Accordingly, this is advantageous for correcting the aberrations such as the chromatic aberration and the field curvature. In order to obtain more favorable characteristics, the observation optical system 5 more preferably satisfies Conditional Expression (22-1) below, still more preferably satisfies Conditional Expression (22-2) below, and still further preferably satisfies Conditional Expression (22-3).

$$0.04 < Dopn/TTL < 0.6 \tag{22}$$

$$0.041 < Dopn/TTL < 0.5 \tag{22-1}$$

$$0.043 < Dopn/TTL < 0.42 \tag{22-2}$$

$$0.18 < Dopn/TTL < 0.42 \tag{22-3}$$

In a case where the half value of the longest diameter of the display region 1a in the display element 1 is denoted by H, and the focal length of the display side positive lens is denoted by fop, the observation optical system 5 preferably satisfies Conditional Expression (23) below. Causing a corresponding value of Conditional Expression (23) not to be less than or equal to a lower limit thereof can suppress a decrease in positive optical power of the display side positive lens and thus, can suppress a relatively excessive influence of the negative optical power of the first negative lens. Accordingly, this is advantageous for correcting the astigmatism and the field curvature. Causing the corresponding value of Conditional Expression (23) not to be greater than or equal to an upper limit thereof is advantageous for suppressing the aberrations such as the field curvature. In order to obtain more favorable characteristics, the observation optical system 5 more preferably satisfies Conditional Expression (23-1) below and still more preferably satisfies Conditional Expression (23-2) below.

$$0.05 < H/fop < 0.9 \tag{23}$$

$$0.15 < H/fop < 0.79 \tag{23-1}$$

$$0.19 < H/fop < 0.33 \tag{23-2}$$

The observation optical system 5 preferably satisfies Conditional Expression (24) below. Here, the half value of the longest diameter of the display region 1a in the display element 1 is denoted by H. In addition, a distance on the optical axis from the display surface of the display element 1 to the surface of the EP side positive lens on the eyepoint side in a state where the diopter is –1 diopter is denoted by Tep. In a case where an optical member not having optical power is arranged between the display surface of the display element 1 and the surface of the EP side positive lens on the eyepoint side, Tep is calculated using an air-equivalent length for the optical member not having optical power. Causing a corresponding value of Conditional Expression (24) not to be less than or equal to a lower limit thereof can suppress a decrease in optical power of the eyepiece lens 3 and thus, is advantageous for securing a wide apparent field of view. Causing the corresponding value of Conditional Expression (24) not to be greater than or equal to an upper limit thereof is advantageous for suppressing the aberrations such as the field curvature. In order to obtain more favorable characteristics, the observation optical system 5 more preferably satisfies Conditional Expression (24-1) below and still more preferably satisfies Conditional Expression (24-2) below.

$$0.15 < H/Tep < 0.5 \tag{24}$$

$$0.18 < H/Tep < 0.41 \tag{24-1}$$

$$0.23 < H/Tep < 0.29 \tag{24-2}$$

The observation optical system 5 preferably satisfies Conditional Expression (25) below. Here, the focal length of the eyepiece lens 3 in a state where the diopter is –1 diopter is denoted by f. In addition, a distance on the optical axis from the display surface of the display element 1 to the surface of the display side positive lens on the display element side in a state where the diopter is –1 diopter is denoted by Doop. In a case where an optical member not having optical power is arranged between the display surface of the display element 1 and the surface of the display side positive lens on the display element side, Doop is calculated using an air-equivalent length for the optical member not having optical power. Causing a corresponding value of Conditional Expression (25) not to be less than or equal to a lower limit thereof is advantageous for securing a sufficient interval for diopter adjustment between the display element 1 and the eyepiece lens 3. Causing the corresponding value of Conditional Expression (25) not to be greater than or equal to an upper limit thereof is advantageous for reducing the total length of the observation optical system 5. In order to obtain more favorable characteristics, the observation optical system 5 more preferably satisfies Conditional Expression (25-1) below and still more preferably satisfies Conditional Expression (25-2) below.

$$0.2 < Doop/f < 0.7 \tag{25}$$

$$0.3 < Doop/f < 0.6 \tag{25-1}$$

$$0.38 < Doop/f < 0.49 \tag{25-2}$$

The first negative lens is preferably a non-cemented single lens. Configuring an object side surface and an image side surface of the first negative lens as an air contact surface is advantageous for correcting the distortion.

All lenses included in the eyepiece lens 3 may be configured to be a non-cemented single lens. Such a case can increase a degree of design freedom and thus, is advantageous for correcting various aberrations.

The eyepiece lens 3 may be configured to include an aspherical lens. Including the aspherical lens is advantageous for favorable aberration correction.

As illustrated in FIG. 1, the eyepiece lens 3 may be configured to consist of four positive lenses and one negative lens. Such a case in a configuration in which the eyepiece lens 3 consists of five lenses can achieve a configuration particularly advantageous for size reduction. Specifically, for example, the eyepiece lens 3 may be configured to consist of a positive lens, a positive lens, a negative lens, a positive lens, and a positive lens in order from the display element side to the eyepoint side.

The example illustrated in FIG. 1 is an example of the observation optical system 5 according to the embodiment of the present disclosure. The eyepiece lens 3 of the observation optical system 5 according to the embodiment of the present disclosure can have a different configuration from the example illustrated in FIG. 1. For example, the eyepiece lens 3 may be configured to consist of three positive lenses and two negative lenses. Such a case in a configuration in which the eyepiece lens 3 consists of five lenses can achieve a configuration particularly advantageous in terms of the lateral chromatic aberration. Specifically, for example, the eyepiece lens 3 may be configured to consist of a positive lens, a negative lens, a positive lens, a positive lens, and a negative lens in order from the display element side to the eyepoint side. Alternatively, the eyepiece lens 3 may be configured to consist of a negative lens, a positive lens, a positive lens, a negative lens, and a positive lens in order from the display element side to the eyepoint side.

The number of lenses included in the eyepiece lens 3 may be a different number from the example in FIG. 1. For example, the number of lenses included in the eyepiece lens 3 may be configured to be four. Such a case is advantageous for weight reduction. For example, the eyepiece lens 3 may be configured to consist of two positive lenses and two negative lenses. In this case, the eyepiece lens 3 may be configured to consist of a negative lens, a positive lens, a negative lens, and a positive lens in order from the display element side to the eyepoint side. Alternatively, the eyepiece lens 3 may be configured to consist of three positive lenses and one negative lens. In this case, the eyepiece lens 3 may be configured to consist of a positive lens, a positive lens, a negative lens, and a positive lens in order from the display element side to the eyepoint side.

In addition, alternatively, the number of lenses included in the eyepiece lens 3 may be configured to be six. Such a case is advantageous for correcting various aberrations. For example, the eyepiece lens 3 may be configured to consist of four positive lenses and two negative lenses. In this case, the eyepiece lens 3 may be configured to consist of a positive lens, a negative lens, a positive lens, a negative lens, a positive lens, and a positive lens in order from the display element side to the eyepoint side. Alternatively, the eyepiece lens 3 may be configured to consist of three positive lenses and three negative lenses. In this case, the eyepiece lens 3 may be configured to consist of a positive lens, a negative lens, a positive lens, a negative lens, a negative lens, and a positive lens in order from the display element side to the eyepoint side.

The display element 1 may be configured to move along the optical axis Z in the diopter adjustment. Such a case is advantageous for decreasing the total length of the observation optical system 5. For example, the display element 1 may be configured to move, and the eyepiece lens 3 may be configured to be fixed in the diopter adjustment. Alternatively, the display element 1 and a lens closest to the display element side in the eyepiece lens 3 may be configured to move as a single body in the diopter adjustment.

At least one air interval from the display element 1 to the surface of the first negative lens on the display element side may be configured to change in the diopter adjustment. Such a case is advantageous for suppressing aberration changes in the diopter adjustment.

In a case where the eyepiece lens 3 includes a plurality of negative lenses, a negative lens closest to the display element side among the negative lenses included in the eyepiece lens 3 may be configured to be the first negative lens. Alternatively, a second negative lens from the display element side among the negative lenses included in the eyepiece lens 3 may be configured to be the first negative lens.

The above preferable configurations and available configurations including the configurations related to the conditional expressions are available in any combination thereof and are preferably employed appropriately and selectively in accordance with required specifications. The conditional expressions preferably satisfied by the observation optical system 5 according to the embodiment of the present disclosure are not limited to the conditional expressions disclosed in the form of an expression and include all conditional expressions obtained by any combination of lower limits and upper limits from the preferable, more preferable, and still more preferable conditional expressions.

As an example, one preferable aspect of the present disclosure is the observation optical system 5 comprising the display element 1 and the eyepiece lens 3 arranged on the eyepoint side of the display element 1, in which the eyepiece lens 3 includes at least one negative lens, and Conditional Expression (1) is satisfied.

In an observation optical system for a viewfinder such as a digital camera, there recently have been advances in increasing the number of pixels of the display element. Thus, a wider apparent field of view and high resolution performance are required. However, in a case of obtaining a wider apparent field of view, an amount of occurrence of various aberrations such as the field curvature and the chromatic aberration is increased, and it is difficult to establish both of a wider apparent field of view and high resolution performance. Therefore, employing the one preferable aspect facilitates implementation of an observation optical system that enables observation with a wider apparent field of view while suppressing the field curvature, the chromatic aberration, and the like.

Next, examples of the observation optical system 5 according to the embodiment of the present disclosure will be described with reference to the drawings. Reference numerals attached to constituents of a cross-sectional view of each example are independently used for each example in order to avoid complication of the description and of the drawings due to an increase in the number of digits of the reference numerals. Accordingly, a common reference numeral attached in the drawings of different examples does not necessarily denote a common configuration.

Example 1

The configuration of the observation optical system 5 of Example 1 is illustrated in FIG. 1, and an illustration method and the configuration are described above. Thus, duplicate description will be partially omitted here. The observation optical system 5 of Example 1 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

For the observation optical system 5 of Example 1, basic lens data is shown in Table 1, specifications are shown in Table 2, variable surface spacing is shown in Table 3, and aspherical coefficients are shown in Table 4.

Table 1 is disclosed as follows. The Sn column shows a surface number of each surface in a case where a surface on which the display region 1a of the display element 1 is arranged is referred to as a first surface, and the number is increased by one at a time toward the eyepoint side. In the optical axis direction, a position of the first surface corresponds to the position of the display surface. The R column shows a curvature radius of each surface. The D column shows surface spacing between each surface and a surface adjacent to the eyepoint side thereof on the optical axis. The Nd column shows a d line refractive index of each constituent. The vd column shows a d line-based Abbe number of each constituent.

In Table 1, the display element 1, the optical member 2, the optical member 4, and the eyepoint EP are also disclosed, and a surface number and a word (EP) are disclosed in the field of Sn of a surface corresponding to the eyepoint EP. A * mark is attached to a surface number of an aspherical surface, and a numerical value of a paraxial curvature radius is disclosed in the field of the curvature radius of the aspherical surface. In Table 1, a sign of a curvature radius of a surface having a shape of a convex surface facing toward the display element side is positive. A sign of a curvature radius of a surface having a shape of a convex surface facing toward the eyepoint side is negative. Variable surface spacing in the diopter adjustment is disclosed in the D column by using a symbol DD[ ] and attaching a surface number on the display element side of the spacing within [ ].

Table 2 shows the focal length f of the eyepiece lens 3 at each diopter and the apparent field of view at a full angle of view. In the field of the diopter, a unit diopter is referred to as "dpt", and this abbreviation method also applies in Table 3. In the field of the apparent field of view, (°) indicates that a unit is degrees. In addition, Table 2 shows the half value H of the longest diameter of the display region 1a in the display element 1.

Table 3 shows a value of the variable surface spacing at each diopter. The observation optical system 5 of Example 1 enables the diopter adjustment within a range of −4.5 diopter to +2.5 diopter.

In Table 4, the Sn row shows the surface number of the aspherical surface. The KA and Am rows show numerical values of the aspherical coefficients for each aspherical surface. Here, m is an integer greater than or equal to 3 and varies depending on the surface. For example, m=3, 4, 5, . . . 16 applies to a fifth surface of Example 1. In Table 4, "E±n" (n: integer) in the numerical values of the aspherical coefficients means "×10$^{\pm n}$". KA and Am are aspherical coefficients in an aspheric equation represented by the following equation.

$$Zd = C \times h^2 / \{1 + (1 - KA \times C2 \times h^2)^{1/2}\} + \Sigma Am \times h^m$$

where

Zd: a depth of the aspherical surface (a length of a vertical line drawn from a point on the aspherical surface at a height h down to a plane that is tangential to an aspherical surface apex and that is perpendicular to the optical axis Z)

h: a height (a distance from the optical axis Z to the lens surface)

C: a reciprocal of the paraxial curvature radius

KA and Am: aspherical coefficients

In the aspheric equation, $\Sigma$ means a total sum related to m.

In data of each table, while degrees are used as a unit of angle, and millimeters (mm) are used as a unit of length, the optical system can also be used by proportionally increasing or proportionally reducing the optical system. Thus, other appropriate units can also be used. In addition, in each table shown below, numerical values rounded in a predetermined number of digits are disclosed.

TABLE 1

| Example 1 | | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.51680 | 64.20 |
| 4 | ∞ | DD[4] | | |
| *5 | −29.7010 | 4.2852 | 1.80625 | 40.91 |
| *6 | −13.1138 | 0.1000 | | |
| 7 | 38.5552 | 5.7100 | 1.73515 | 54.49 |
| 8 | −23.7079 | 1.9451 | | |
| *9 | −13.6758 | 2.2691 | 1.63351 | 23.63 |
| *10 | 14.0624 | 0.8387 | | |
| *11 | −28.3638 | 3.5767 | 1.50959 | 57.35 |
| *12 | −22.0279 | 0.1000 | | |
| *13 | 23.9503 | 3.2544 | 1.80625 | 40.91 |
| *14 | −40.6884 | DD[14] | | |
| 15 | ∞ | 1.2000 | 1.49023 | 57.5 |
| 16 | ∞ | 18 | | |
| 17 (EP) | ∞ | | | |

TABLE 2

| Example 1 | | | |
|---|---|---|---|
| Diopter | −1 dpt | −4.5 dpt | +2.5 dpt |
| f | 17.87 | 17.87 | 17.87 |
| Apparent Field of View (°) | 49.46 | 47.92 | 50.68 |
| H | 8.20 | | |

TABLE 3

| Example 1 | | | |
|---|---|---|---|
| Diopter | −1 dpt | −4.5 dpt | +2.5 dpt |
| DD[4] | 3.17 | 2.07 | 4.27 |
| DD[14] | 1.60 | 2.70 | 0.50 |

TABLE 4

| | Example 1 | | | |
|---|---|---|---|---|
| Sn | 5 | 6 | 9 | 10 |
| KA | −2.8586415E+00 | −3.1640923E+00 | 8.8166849E−01 | 8.8864963E−01 |
| A3 | −7.7715612E−19 | −3.5527137E−18 | 0.0000000E+00 | 1.6653345E−19 |
| A4 | −1.4285743E−04 | −1.8839346E−04 | −4.3423071E−04 | −8.6154187E−04 |
| A5 | −3.4176560E−06 | 1.7413067E−05 | 2.6631256E−05 | −2.7783276E−05 |
| A6 | 2.6084311E−06 | −6.8824102E−06 | 8.4993037E−06 | 1.4829027E−05 |
| A7 | −7.1069065E−07 | 1.4494354E−06 | −2.2760415E−07 | 2.0700890E−07 |
| A8 | 9.1449443E−08 | −5.8698154E−08 | −8.8961292E−08 | −1.2766883E−07 |
| A9 | 4.1497008E−09 | −1.4551516E−08 | 1.4183803E−09 | −1.0408857E−09 |
| A10 | −8.7403079E−10 | 1.5148123E−09 | 5.0171561E−10 | 6.1327433E−10 |
| A11 | −1.0444414E−11 | 5.1621218E−11 | −4.8408294E−12 | 3.0810350E−12 |
| A12 | 3.1621299E−12 | −8.7125557E−12 | −1.5524815E−12 | −1.6846340E−12 |
| A13 | 1.2161322E−14 | −8.6076605E−14 | 8.3741517E−15 | −4.8576192E−15 |
| A14 | −5.1442629E−15 | 2.0306590E−14 | 2.4834907E−15 | 2.4810086E−15 |
| A15 | −5.4930075E−18 | 5.5714119E−17 | −5.7839511E−18 | 3.1305144E−18 |
| A16 | 3.1269989E−18 | −1.7047140E−17 | −1.6065901E−18 | −1.5226337E−18 |

| Sn | 11 | 12 | 13 | 14 |
|---|---|---|---|---|
| KA | 1.6579518E+00 | 2.5343937E+00 | 1.6161596E+00 | 6.4543782E−01 |
| A3 | 2.2204460E−19 | 0.0000000E+00 | 1.6653345E−19 | 1.3322676E−18 |
| A4 | 4.0010209E−04 | 6.6103913E−04 | 1.7311870E−04 | −1.8601582E−05 |
| A5 | 2.1552294E−05 | 2.0151087E−06 | 1.1704537E−05 | 3.2313751E−05 |
| A6 | −5.8813781E−06 | −7.8209010E−06 | −1.0953470E−05 | −2.7764654E−06 |
| A7 | −2.3588308E−07 | −5.6496596E−08 | −4.7638581E−08 | −6.9992326E−07 |
| A8 | 5.5709420E−08 | 3.7259328E−08 | 1.2706667E−07 | 6.1512703E−08 |
| A9 | 1.1672110E−09 | 4.9480275E−10 | −3.8531887E−11 | 4.8841317E−09 |
| A10 | −3.0014514E−10 | −3.9986430E−11 | −7.2604479E−10 | −3.4548304E−10 |
| A11 | −3.2698954E−12 | −1.8510322E−12 | 6.4398987E−13 | −1.7643240E−11 |
| A12 | 8.9004546E−13 | −2.4170743E−13 | 2.2375838E−12 | 7.7990040E−13 |
| A13 | 4.8839443E−15 | 3.2748236E−15 | −1.6416263E−15 | 3.1453180E−14 |
| A14 | −1.3591336E−15 | 8.0676356E−16 | −3.5594660E−15 | −6.3791593E−16 |
| A15 | −3.0000123E−18 | −2.2647149E−18 | 1.4047693E−18 | −2.2030111E−17 |
| A16 | 8.3583918E−19 | −7.2213261E−19 | 2.2919095E−18 | −4.3035810E−22 |

Figure 3:
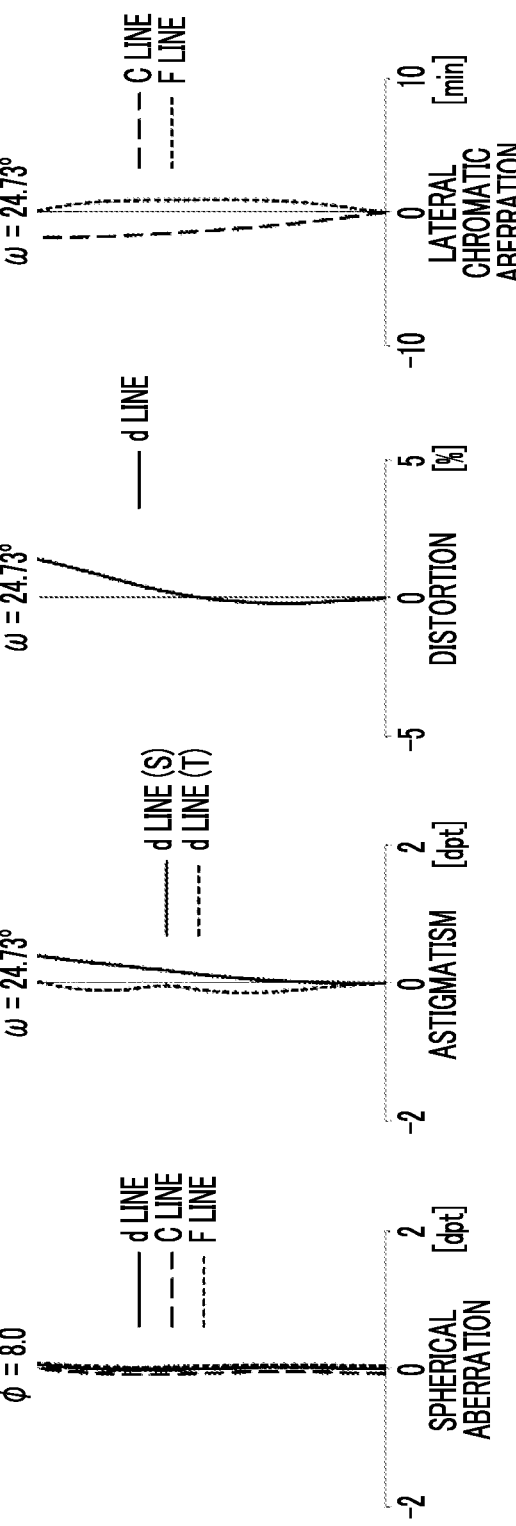
FIG. 3 is a spherical aberration diagram, an astigmatism diagram, a distortion diagram, and a lateral chromatic aberration diagram of the observation optical system of Example 1.
Figure 4:
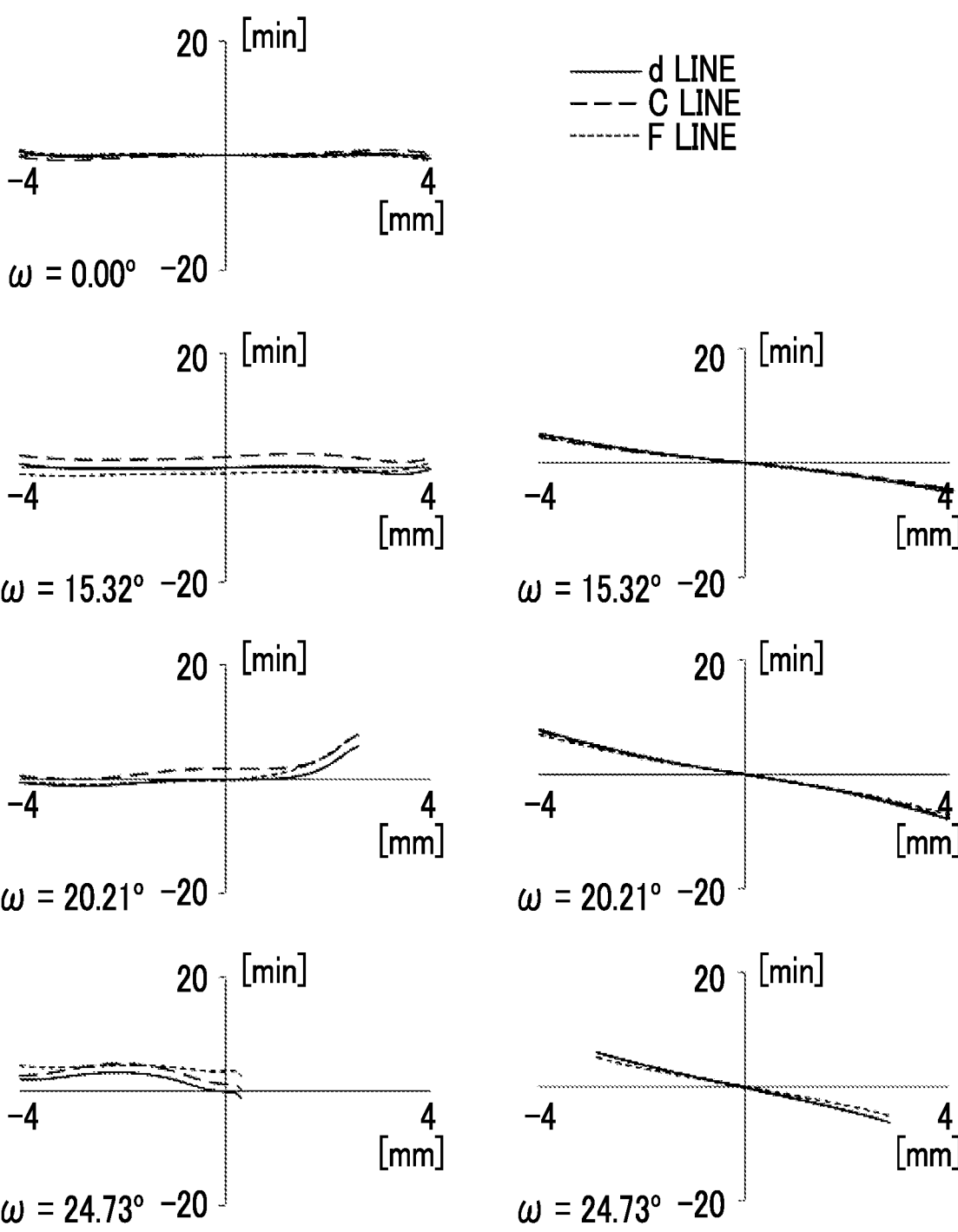
FIG. 4 is a lateral aberration diagram of the observation optical system of Example 1.

FIG. 3 and FIG. 4 illustrate various aberration diagrams of the observation optical system 5 of Example 1 in a state where the diopter is −0.98 diopter. In FIG. 3, the spherical aberration, the astigmatism, the distortion, and the lateral chromatic aberration are illustrated in order from the left. In the spherical aberration diagram, aberrations for a d line, a C line, and an F line are illustrated by a solid line, a long broken line, and a short broken line, respectively. In the astigmatism diagram, the aberration for the d line in a sagittal direction is illustrated by a solid line, and the aberration for the d line in a tangential direction is illustrated by a short broken line. In the distortion diagram, the aberration for the d line is illustrated by a solid line. In the lateral chromatic aberration diagram, the aberrations for the C line and the F line are illustrated by a long broken line and a short broken line, respectively. The unit "dpt" on a horizontal axis of the spherical aberration diagram and of the astigmatism diagram denotes diopter. The unit "min" on a horizontal axis of the lateral chromatic aberration diagram denotes a minute of angle. In the spherical aberration diagram, a diameter of the eyepoint EP in units of millimeters (mm) is shown after "Φ=". In other aberration diagrams, a value of the apparent field of view at a half angle of view is shown after "ω=".

In FIG. 4, for each apparent field of view, a lateral aberration in the tangential direction is shown in the left column, and a lateral aberration in the sagittal direction is shown in the right column. In FIG. 4, aberrations for the d line, the C line, and the F line are illustrated by a solid line, a long broken line, and a short broken line, respectively. In FIG. 4, a value of the apparent field of view at a half angle of view is shown after "ω=".

Symbols, meanings, disclosure methods, and illustration methods of each of the data related to Example 1 are the same as in the following examples unless otherwise specified. Thus, duplicate description will be omitted below.

Example 2

Figure 5:
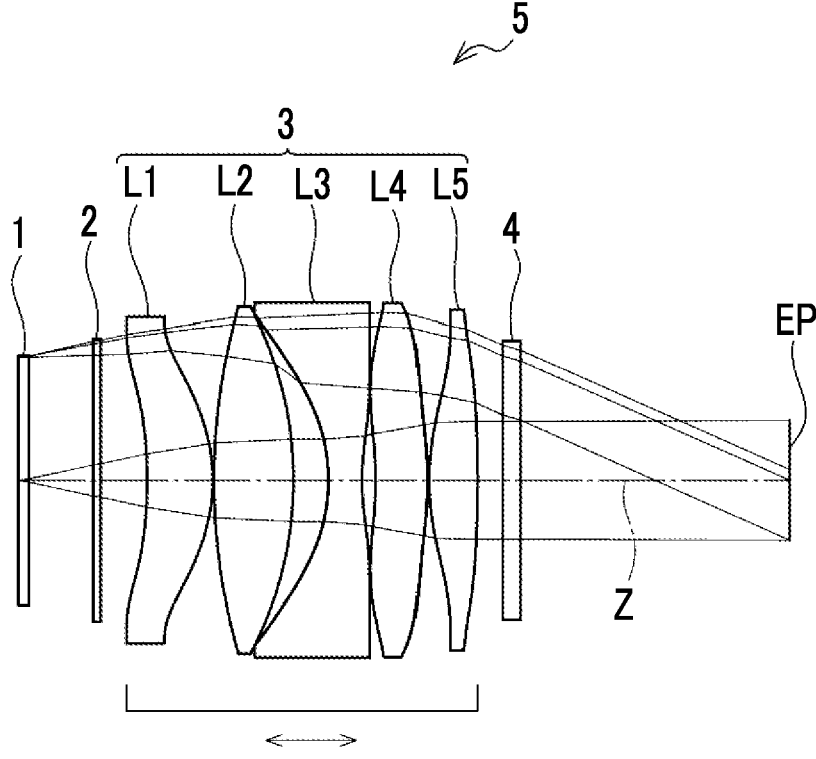
FIG. 5 is a cross-sectional view illustrating a configuration and luminous flux of an observation optical system of Example 2.

FIG. 5 illustrates a configuration and luminous flux of the observation optical system 5 of Example 2. The observation optical system 5 of Example 2 comprises the display element 1, the optical member 2, the eyepiece lens 3, and the optical member 4 in order from the display element side to the eyepoint side. In FIG. 5, reference numerals of the display region 1a and of the cover member 1b are not illustrated. This point also applies to the drawings illustrating configurations of Example 3 and later.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 6:
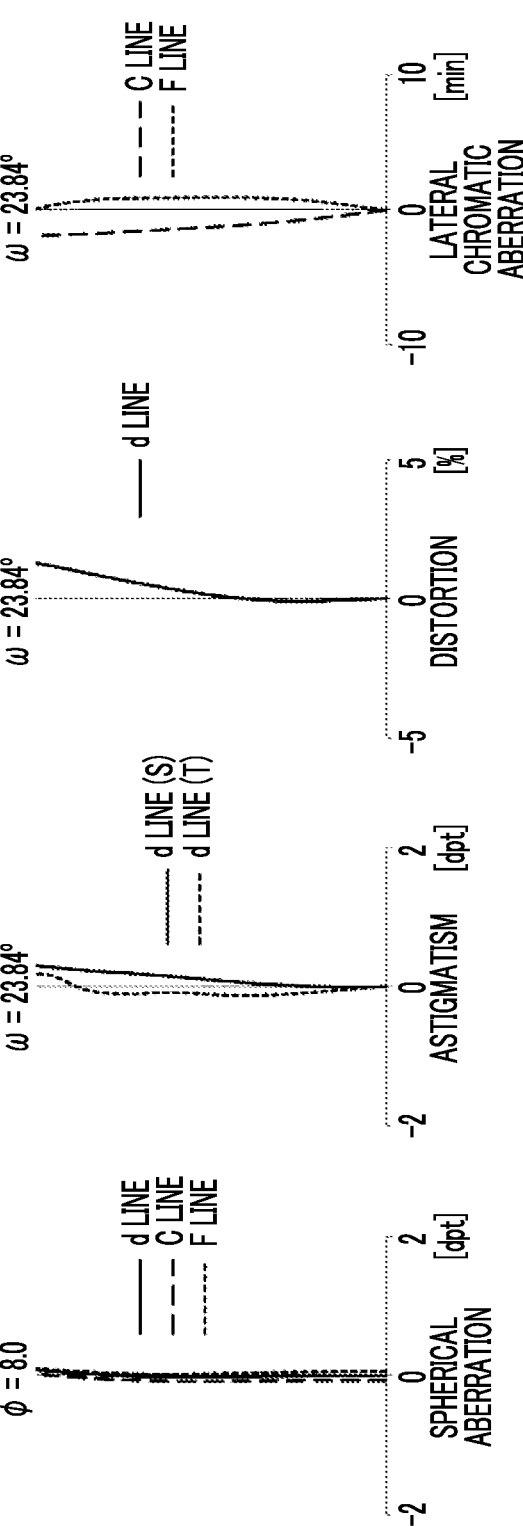
FIG. 6 is a spherical aberration diagram, an astigmatism diagram, a distortion diagram, and a lateral chromatic aberration diagram of the observation optical system of Example 2.
Figure 7:
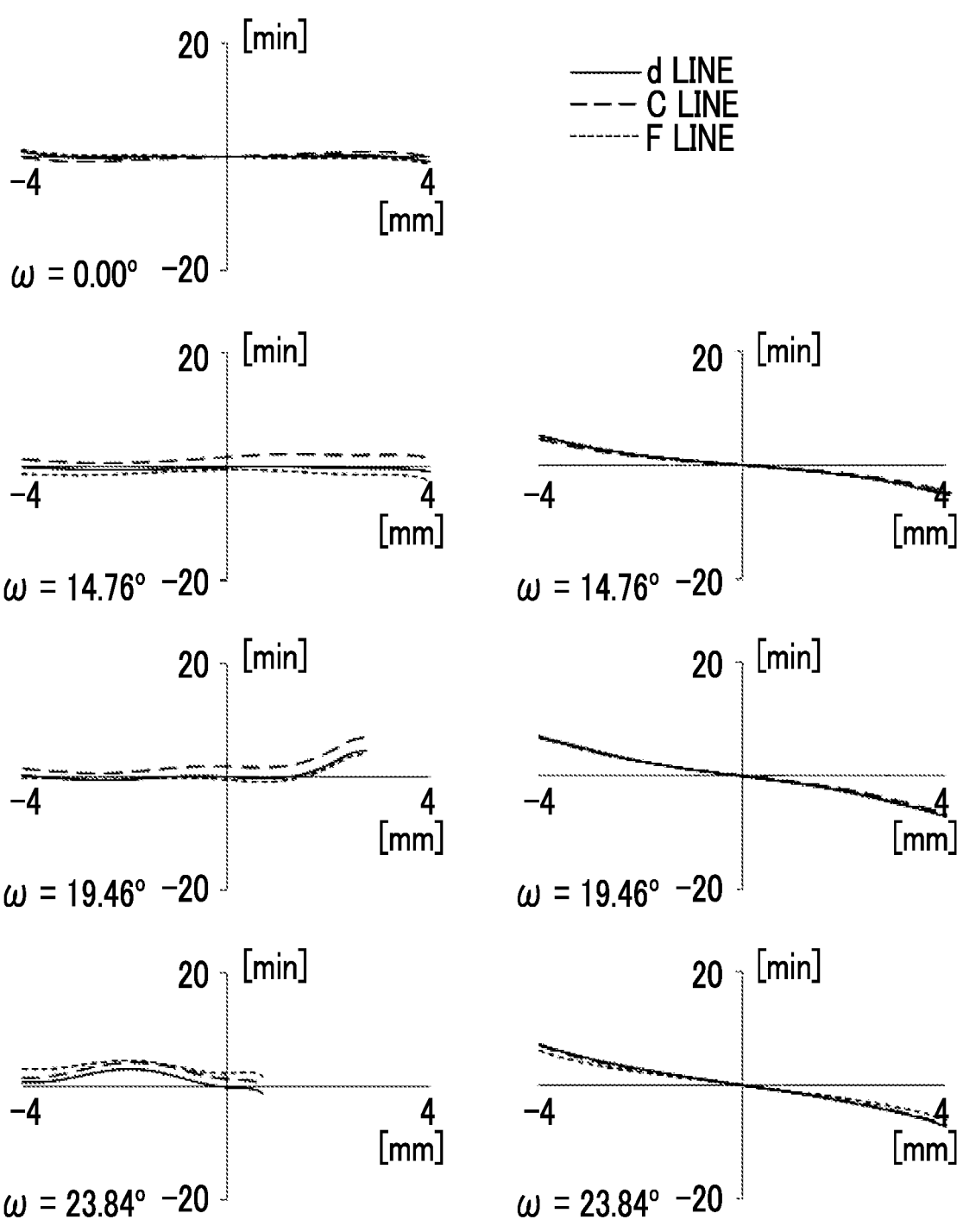
FIG. 7 is a lateral aberration diagram of the observation optical system of Example 2.

For the observation optical system 5 of Example 2, basic lens data is shown in Table 5, specifications are shown in Table 6, variable surface spacing is shown in Table 7, aspherical coefficients are shown in Table 8, and various aberration diagrams in a state where the diopter is –0.98 diopter are illustrated in FIG. 6 and FIG. 7.

TABLE 5

| | | Example 2 | | |
|---|---|---|---|---|
| Sn | R | D | Nd | νd |
| 1 | ∞ | 0.7000 | 1.51680 | 64.20 |
| 2 | ∞ | 4.3000 | | |
| 3 | ∞ | 0.5000 | 1.51680 | 64.20 |
| 4 | ∞ | DD[4] | | |
| *5 | −33.7325 | 4.3911 | 1.53501 | 55.68 |
| *6 | −11.9185 | 0.1000 | | |
| 7 | 41.7770 | 5.3088 | 1.81757 | 46.24 |
| 8 | −24.6334 | 2.3268 | | |
| *9 | −13.5353 | 2.2494 | 1.63351 | 23.63 |
| *10 | 13.9481 | 0.9168 | | |
| *11 | −21.3914 | 3.4156 | 1.53501 | 55.68 |
| *12 | −22.3309 | 0.1000 | | |
| *13 | 17.3166 | 3.2527 | 1.80625 | 40.91 |
| *14 | −59.828 | DD[14] | | |
| 15 | ∞ | 1.2000 | 1.49023 | 57.5 |
| 16 | ∞ | 18 | | |
| 17 (EP) | ∞ | | | |

TABLE 6

| | Example 2 | | |
|---|---|---|---|
| Diopter | −1 dpt | −4.5 dpt | +2.5 dpt |
| f | 18.58 | 18.58 | 18.58 |
| Apparent Field of View (°) | 47.67 | 46.32 | 48.68 |
| H | 8.20 | | |

TABLE 7

| | Example 2 | | |
|---|---|---|---|
| Diopter | −1 dpt | −4.5 dpt | +2.5 dpt |
| DD[4] | 3.10 | 1.92 | 4.29 |
| DD[14] | 1.68 | 2.87 | 0.50 |

TABLE 8

| | Example 2 | | | |
|---|---|---|---|---|
| Sn | 5 | 6 | 9 | 10 |
| KA | 2.2096653E+00 | −2.0191605E+00 | 8.4539461E−01 | 8.3041527E−01 |
| A3 | −1.7763568E−18 | 0.0000000E+00 | −7.2164497E−19 | 2.7755576E−19 |
| A4 | −3.1118375E−04 | −2.4630770E−04 | −4.8829123E−04 | −1.0320680E−03 |
| A5 | 6.4040167E−05 | 5.9525314E−05 | 2.1725147E−05 | −4.4038078E−06 |
| A6 | −2.7466390E−06 | −1.1252569E−05 | 9.3252430E−06 | 1.5585907E−05 |
| A7 | −1.5210212E−06 | 1.0564343E−06 | −7.6057275E−08 | −7.4703484E−08 |
| A8 | 2.0149907E−07 | 1.2437351E−08 | −1.0972777E−07 | −1.2648664E−07 |
| A9 | 8.3274878E−09 | −1.2804915E−08 | 5.3527639E−10 | 6.9565044E−10 |
| A10 | −1.6673528E−09 | 1.0452295E−09 | 6.7420738E−10 | 5.9533546E−10 |
| A11 | −2.2627157E−11 | 4.7502000E−11 | −2.2419308E−12 | −2.5757268E−12 |
| A12 | 5.9557315E−12 | −7.2667240E−12 | −2.2187017E−12 | −1.6479903E−12 |
| A13 | 3.0887178E−14 | −8.1034685E−14 | 4.4371633E−15 | 4.5286192E−15 |
| A14 | −9.9708662E−15 | 1.8275459E−14 | 3.7159929E−15 | 2.4909910E−15 |
| A15 | −1.7288496E−17 | 5.3028381E−17 | −3.3556284E−18 | −3.1193268E−18 |
| A16 | 6.4011316E−18 | −1.6048820E−17 | −2.4909924E−18 | −1.5849043E−18 |

| Sn | 11 | 12 | 13 | 14 |
|---|---|---|---|---|
| KA | 1.3567435E+00 | 2.4510953E+00 | 1.6302346E+00 | 2.9999976E+00 |
| A3 | 2.7755576E−19 | −1.6653345E−19 | 2.7755576E−19 | 8.8817842E−19 |
| A4 | 5.1812736E−04 | 3.6983835E−04 | −1.0199859E−04 | 2.5984738E−05 |
| A5 | 1.5306009E−06 | 2.2942559E−06 | 3.6104761E−05 | 3.0107494E−05 |
| A6 | −4.8104073E−06 | −2.7307931E−06 | −8.7179537E−06 | −2.6091809E−06 |
| A7 | 1.1096531E−08 | −5.5349217E−08 | −2.8486757E−07 | −7.3343178E−07 |
| A8 | 3.7720676E−08 | 2.7581903E−09 | 1.0343106E−07 | 5.6598918E−08 |
| A9 | −4.3417625E−10 | 3.8216888E−10 | 1.1611141E−09 | 5.1360532E−09 |
| A10 | −1.8677180E−10 | 7.4089675E−11 | −5.7726569E−10 | −3.1023203E−10 |
| A11 | 1.9754922E−12 | −1.3330122E−12 | −2.9473556E−12 | −1.8575341E−11 |
| A12 | 5.1228566E−13 | −4.2149380E−13 | 1.7110982E−12 | 6.4995297E−13 |
| A13 | −3.8195994E−15 | 2.2750287E−15 | 4.0301460E−15 | 3.3152449E−14 |
| A14 | −7.0601610E−16 | 8.9863228E−16 | −2.6030009E−15 | −3.9565294E−16 |
| A15 | 2.7692589E−18 | −1.5544602E−18 | −2.2377934E−18 | −2.3245278E−17 |
| A16 | 3.7594702E−19 | −6.9089832E−19 | 1.5993245E−18 | −1.8049344E−19 |

Example 3

Figure 8:
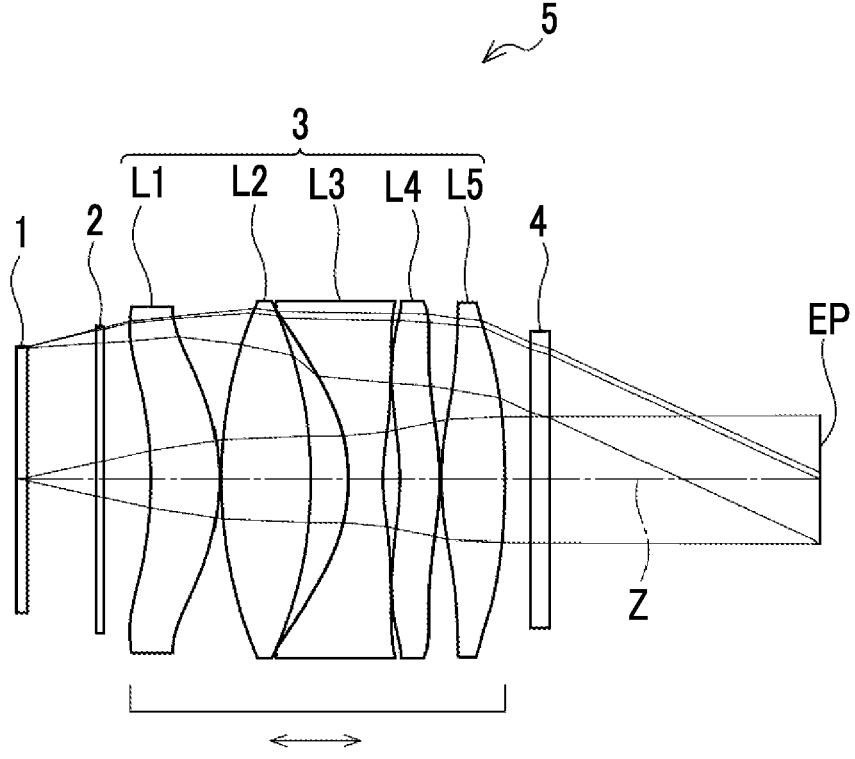
FIG. 8 is a cross-sectional view illustrating a configuration and luminous flux of an observation optical system of Example 3.

FIG. 8 illustrates a configuration and luminous flux of the observation optical system 5 of Example 3. The observation optical system 5 of Example 3 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 9:
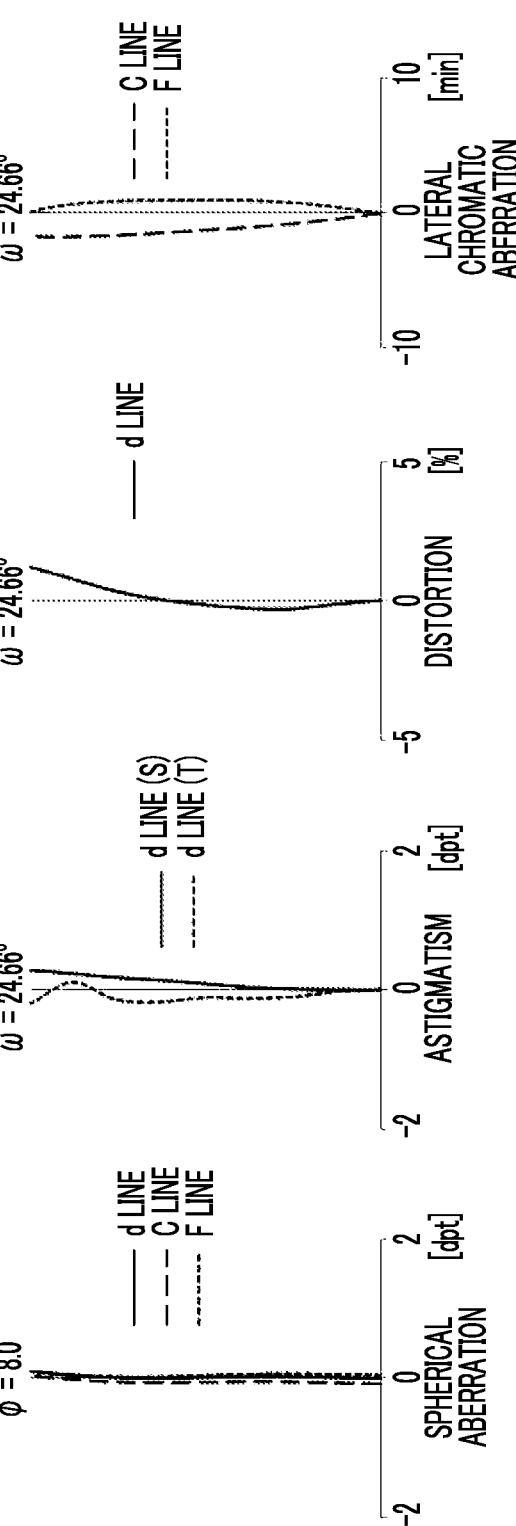
FIG. 9 is a spherical aberration diagram, an astigmatism diagram, a distortion diagram, and a lateral chromatic aberration diagram of the observation optical system of Example 3.
Figure 10:
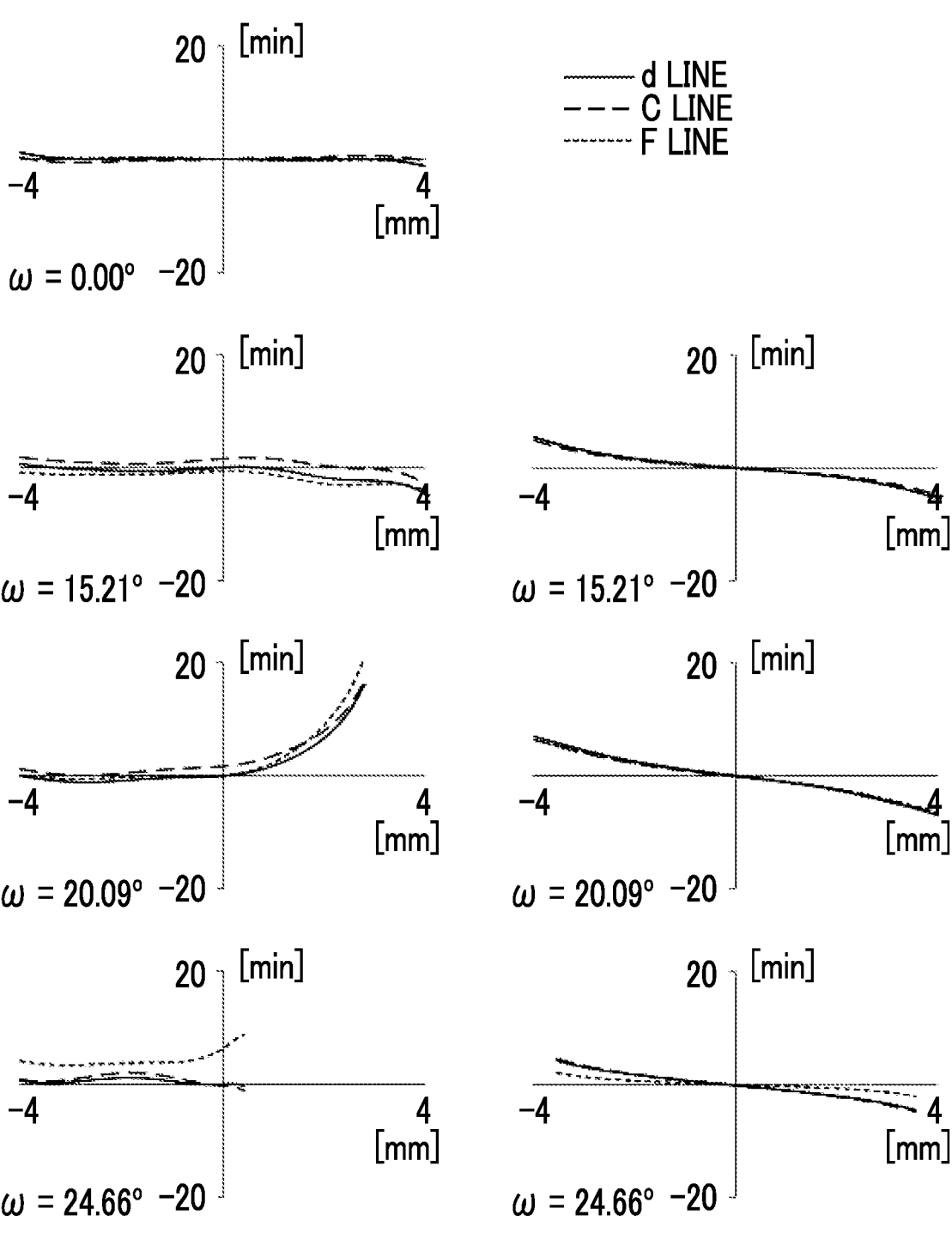
FIG. 10 is a lateral aberration diagram of the observation optical system of Example 3.

For the observation optical system 5 of Example 3, basic lens data is shown in Table 9, specifications are shown in Table 10, variable surface spacing is shown in Table 11, aspherical coefficients are shown in Table 12, and various aberration diagrams in a state where the diopter is −0.98 diopter are illustrated in FIG. 9 and FIG. 10.

TABLE 9

| | Example 3 | | | |
|---|---|---|---|---|
| Sn | R | D | Nd | νd |
| 1 | ∞ | 0.7000 | 1.51680 | 64.20 |
| 2 | ∞ | 4.3000 | | |

TABLE 9-continued

| | Example 3 | | | |
|---|---|---|---|---|
| Sn | R | D | Nd | νd |
| 3 | ∞ | 0.5000 | 1.51680 | 64.20 |
| 4 | ∞ | DD[4] | | |
| *5 | −29.2927 | 4.2931 | 1.80625 | 40.91 |
| *6 | −14.4437 | 0.1000 | | |
| 7 | 28.4546 | 5.6560 | 1.73000 | 55.00 |
| 8 | −26.6848 | 2.3545 | | |
| *9 | −13.0825 | 2.1873 | 1.63351 | 23.63 |
| *10 | 13.2062 | 1.0590 | | |
| *11 | −15.7442 | 2.5141 | 1.53501 | 55.68 |
| *12 | −15.5939 | 0.1000 | | |
| *13 | 18.6978 | 4.0208 | 1.80625 | 40.91 |
| *14 | −41.0829 | DD[14] | | |
| 15 | ∞ | 1.2000 | 1.49023 | 57.5 |
| 16 | ∞ | 17 | | |
| 17 (EP) | ∞ | | | |

TABLE 10

| | Example 3 | | |
|---|---|---|---|
| Diopter | −1 dpt | −4.5 dpt | +2.5 dpt |
| f | 17.96 | 17.96 | 17.96 |
| Apparent Field of View (°) | 49.32 | 47.71 | 50.59 |
| H | 8.20 | | |

TABLE 11

| | Example 3 | | |
|---|---|---|---|
| Diopter | −1 dpt | −4.5 dpt | +2.5 dpt |
| DD[4] | 2.96 | 1.85 | 4.07 |
| DD[14] | 1.60 | 2.71 | 0.49 |

TABLE 12

| | Example 3 | | | |
|---|---|---|---|---|
| Sn | 5 | 6 | 9 | 10 |
| KA | 1.5655428E+00 | −2.3842699E+00 | 5.3256056E−01 | 1.0946960E+00 |
| A3 | 5.3290705E−18 | −2.6645353E−18 | 0.0000000E+00 | 8.8817842E−19 |
| A4 | −2.6900356E−04 | −1.8878184E−04 | −8.5425015E−04 | −1.2837726E−03 |
| A5 | 6.4891728E−05 | 5.0512009E−05 | 1.1363897E−04 | 7.8862086E−06 |
| A6 | −3.8476640E−08 | −1.1733574E−05 | 4.3695249E−06 | 2.1642437E−05 |
| A7 | −2.2274350E−06 | 1.5840220E−06 | −4.4378151E−07 | −7.9811040E−07 |
| A8 | 2.2314680E−07 | −4.8002173E−08 | −8.6430446E−08 | −1.3869145E−07 |
| A9 | 1.3428279E−08 | −1.7108427E−08 | 1.8230221E−09 | 5.6305363E−09 |
| A10 | −1.9062512E−09 | 1.7630205E−09 | 6.6872919E−10 | 5.0584470E−10 |
| A11 | −4.0010304E−11 | 6.3135791E−11 | −5.9579677E−12 | −1.8611766E−11 |
| A12 | 6.8203781E−12 | −1.0632133E−11 | −2.5099466E−12 | −1.1349324E−12 |
| A13 | 5.9941893E−14 | −1.0822437E−13 | 1.0707480E−14 | 3.0578921E−14 |
| A14 | −1.1382783E−14 | 2.5414134E−14 | 4.5874149E−15 | 1.5580707E−15 |
| A15 | −3.6617410E−17 | 7.1368632E−17 | −7.7367080E−18 | −2.0100146E−17 |
| A16 | 7.2642509E−18 | −2.1748918E−17 | −3.2816846E−18 | −1.0126245E−18 |

| | | | | |
|---|---|---|---|---|
| Sn | 11 | 12 | 13 | 14 |
| KA | 1.5988813E+00 | 1.3354350E+00 | 1.2701087E+00 | −1.0904735E+00 |
| A3 | −4.4408921E−19 | 2.2204460E−19 | 3.3306691E−19 | −4.4408921E−19 |
| A4 | 1.2015309E−03 | 7.1091880E−04 | −1.8404065E−04 | −8.5110593E−05 |
| A5 | −1.3751239E−04 | −8.7360288E−06 | 4.9844970E−05 | 3.6675325E−05 |
| A6 | −1.8223116E−06 | −5.9096868E−06 | −1.2244985E−05 | −3.2958056E−06 |
| A7 | 1.6392978E−06 | −5.5506088E−07 | −1.4687564E−07 | −5.9649769E−07 |
| A8 | −5.5213550E−08 | 1.2445178E−07 | 1.5726528E−07 | 5.7092741E−08 |
| A9 | −9.3320753E−09 | 3.0919922E−09 | −4.2807819E−10 | 4.3690274E−09 |
| A10 | 5.2684447E−10 | −8.9556988E−10 | −9.5291612E−10 | −3.3762231E−10 |

TABLE 12-continued

| | Example 3 | | | |
|---|---|---|---|---|
| A11 | 2.8317754E−11 | −9.5514062E−12 | 3.7168229E−12 | −1.6197790E−11 |
| A12 | −2.1643511E−12 | 3.0291850E−12 | 3.0356728E−12 | 8.7644615E−13 |
| A13 | −4.4502161E−14 | 1.5663005E−14 | −8.5890624E−15 | 2.8988517E−14 |
| A14 | 4.2476443E−15 | −4.9895543E−15 | −4.9050917E−15 | −1.0029053E−15 |
| A15 | 2.8158756E−17 | −1.0583355E−17 | 6.8981048E−18 | −2.0229877E−17 |
| A16 | −3.2379944E−18 | 3.2182434E−18 | 3.1609563E−18 | 3.6363157E−19 |

Example 4

Figure 11:
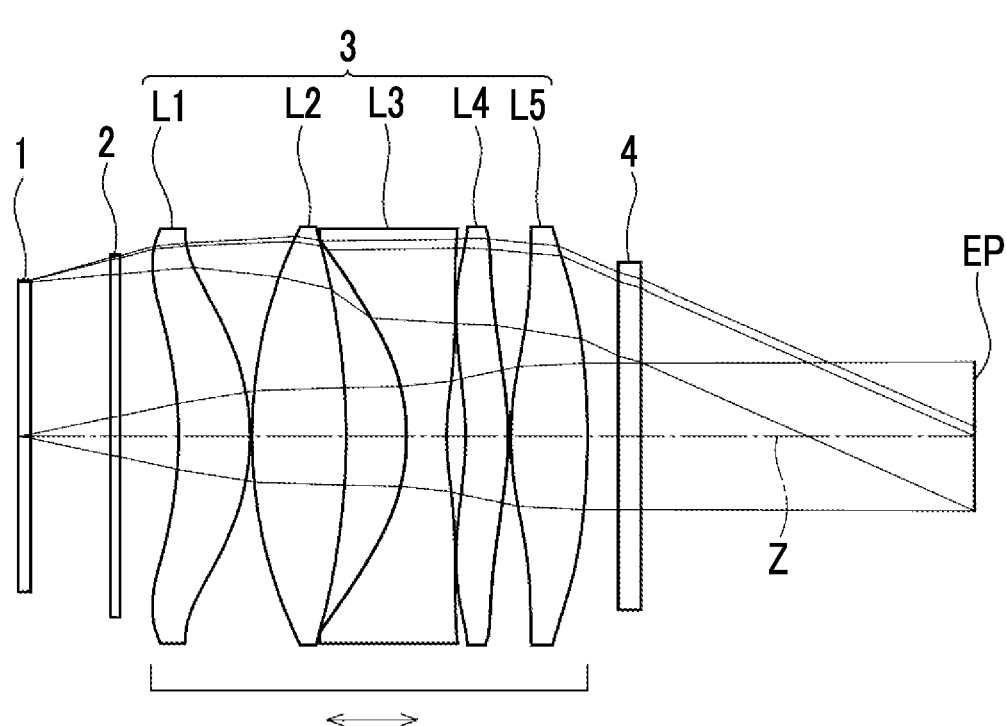
FIG. 11 is a cross-sectional view illustrating a configuration and luminous flux of an observation optical system of Example 4.

FIG. 11 illustrates a configuration and luminous flux of the observation optical system 5 of Example 4. The observation optical system 5 of Example 4 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 12:
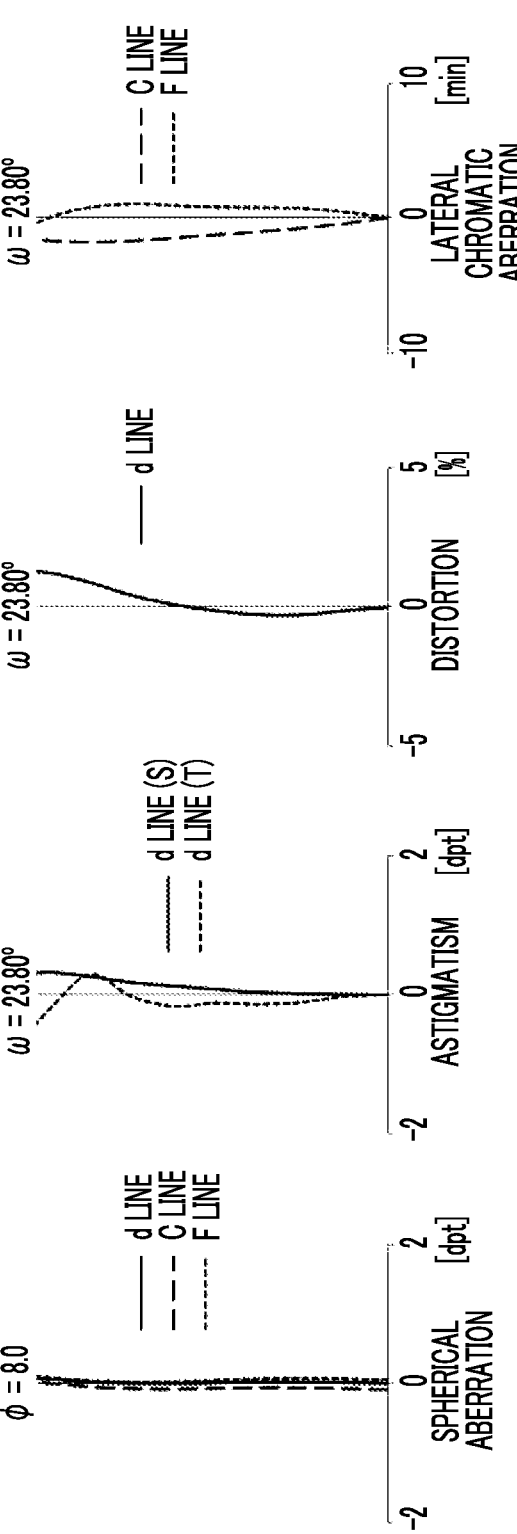
FIG. 12 is a spherical aberration diagram, an astigmatism diagram, a distortion diagram, and a lateral chromatic aberration diagram of the observation optical system of Example 4.
Figure 13:
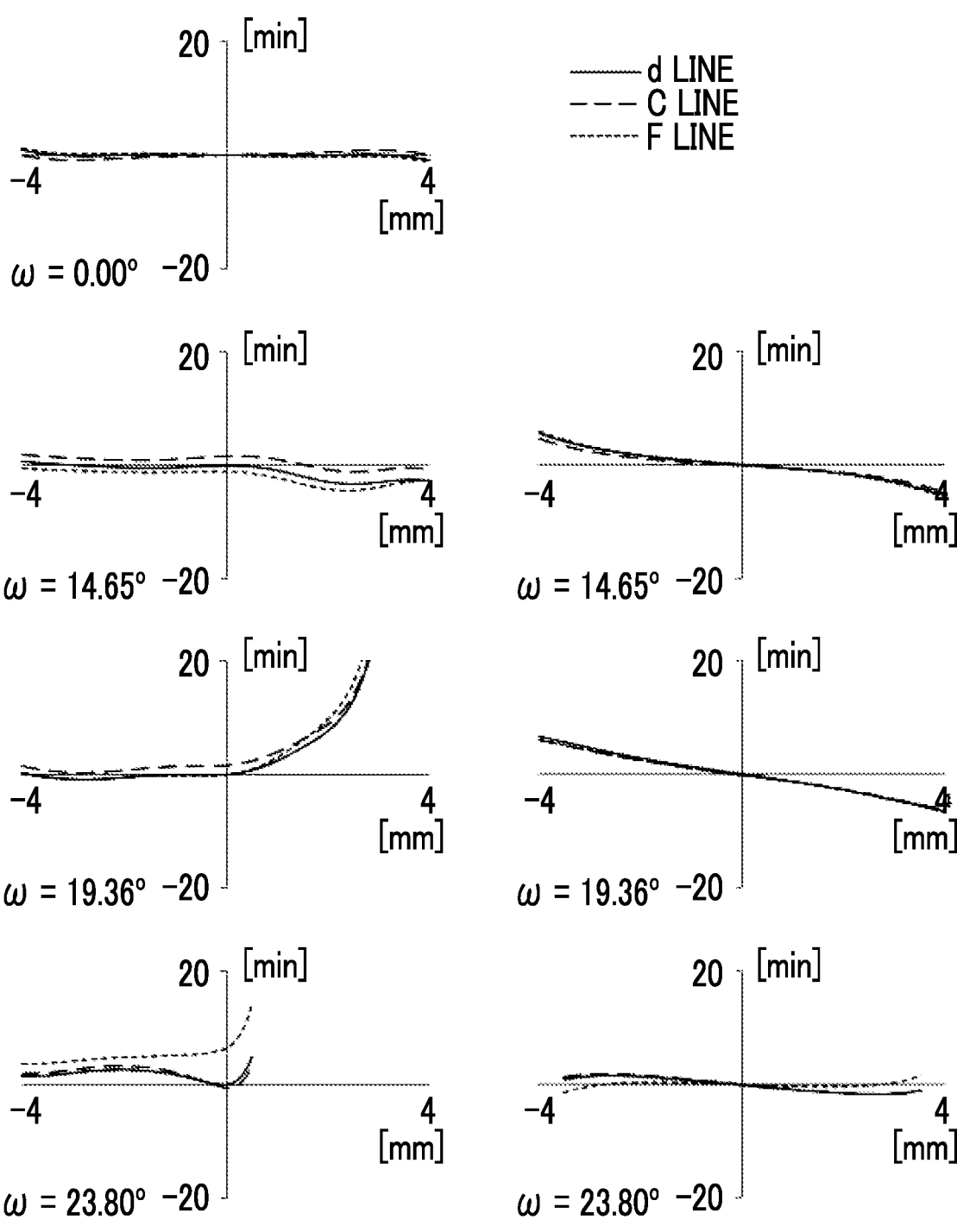
FIG. 13 is a lateral aberration diagram of the observation optical system of Example 4.

For the observation optical system 5 of Example 4, basic lens data is shown in Table 13, specifications are shown in Table 14, variable surface spacing is shown in Table 15, aspherical coefficients are shown in Table 16, and various aberration diagrams in a state where the diopter is −0.98 diopter are illustrated in FIG. 12 and FIG. 13.

TABLE 13

| | Example 4 | | | |
|---|---|---|---|---|
| Sn | R | D | Nd | νd |
| 1 | ∞ | 0.7000 | 1.51680 | 64.20 |
| 2 | ∞ | 4.3000 | | |

TABLE 13-continued

| | Example 4 | | | |
|---|---|---|---|---|
| Sn | R | D | Nd | νd |
| 3 | ∞ | 0.5000 | 1.51680 | 64.20 |
| 4 | ∞ | DD[4] | | |
| *5 | −24.5923 | 3.8653 | 1.53501 | 55.68 |
| *6 | −12.2021 | 0.1000 | | |
| 7 | 25.2533 | 5.0825 | 1.79982 | 48.02 |
| 8 | −39.2177 | 3.2512 | | |
| *9 | −12.9220 | 2.1686 | 1.63351 | 23.63 |
| *10 | 13.4612 | 1.0216 | | |
| *11 | −16.1044 | 2.2963 | 1.53501 | 55.68 |
| *12 | −16.1775 | 0.1000 | | |
| *13 | 17.0888 | 4.1199 | 1.80625 | 40.91 |
| *14 | −38.4968 | DD[14] | | |
| 15 | ∞ | 1.2000 | 1.49023 | 57.5 |
| 16 | ∞ | 18 | | |
| 17 (EP) | ∞ | | | |

TABLE 14

| | Example 4 | | |
|---|---|---|---|
| Diopter | −1 dpt | −4.5 dpt | +2.5 dpt |
| f | 18.68 | 18.68 | 18.68 |
| Apparent Field of View (°) | 47.59 | 45.73 | 49.13 |
| H | 8.20 | | |

TABLE 15

| | Example 4 | | |
|---|---|---|---|
| Diopter | −1 dpt | −4.5 dpt | +2.5 dpt |
| DD[4] | 3.15 | 1.95 | 4.35 |
| DD[14] | 1.69 | 2.89 | 0.49 |

TABLE 16

| | Example 4 | | | |
|---|---|---|---|---|
| Sn | 5 | 6 | 9 | 10 |
| KA | 1.0959572E+00 | −1.8481554E+00 | 5.5702349E−01 | 1.0667382E+00 |
| A3 | 3.5527137E−18 | 8.8817842E−19 | −2.4424907E−18 | 2.2204460E−18 |
| A4 | −3.6266179E−04 | −2.7599388E−04 | −8.8823642E−04 | −1.3111070E−03 |
| A5 | 9.2397679E−05 | 6.2496193E−05 | 1.1878305E−04 | 7.1747468E−06 |
| A6 | −6.8274971E−08 | −1.0888890E−05 | 4.0000036E−06 | 2.2972621E−05 |
| A7 | −2.4823365E−06 | 1.4153657E−06 | −4.9415852E−07 | −7.8319984E−07 |
| A8 | 2.1359509E−07 | −5.9370563E−08 | −7.7857439E−08 | −1.5557650E−07 |
| A9 | 1.5045288E−08 | −1.5928399E−08 | 2.0611787E−09 | 5.5346221E−09 |
| A10 | −1.7596706E−09 | 1.8853592E−09 | 6.0878058E−10 | 6.0544197E−10 |
| A11 | −4.5498185E−11 | 5.8704379E−11 | −6.6233113E−12 | −1.8280940E−11 |
| A12 | 6.0904274E−12 | −1.1240250E−11 | −2.3106105E−12 | −1.4428367E−12 |
| A13 | 6.9334066E−14 | −1.0003478E−13 | 1.1726157E−14 | 3.0024285E−14 |
| A14 | −9.8323081E−15 | 2.6770386E−14 | 4.2619821E−15 | 2.0419356E−15 |

TABLE 16-continued

| | Example 4 | | | |
|---|---|---|---|---|
| A15 | −4.2991933E−17 | 6.5474282E−17 | −8.3878871E−18 | −1.9730780E−17 |
| A16 | 6.0535061E−18 | −2.2866581E−17 | −3.0716956E−18 | −1.3174688E−18 |

| Sn | 11 | 12 | 13 | 14 |
|---|---|---|---|---|
| KA | 1.6299897E+00 | 1.3168019E+00 | 1.2414053E+00 | −8.8935809E−011 |
| A3 | 0.0000000E+00 | −1.9984014E−18 | 1.3322676E−18 | 4.4408921E−19 |
| A4 | 1.1449939E−03 | 6.1542941E−04 | −2.3113300E−04 | −4.1506137E−05 |
| A5 | −1.3527304E−04 | −7.3052035E−06 | 4.9678172E−05 | 3.4860963E−05 |
| A6 | −5.6405077E−07 | −6.1614129E−06 | −1.2146031E−05 | −3.9370607E−06 |
| A7 | 1.6082652E−06 | −5.0714241E−07 | −1.3964202E−07 | −5.8144062E−07 |
| A8 | −7.1340545E−08 | 1.2898108E−07 | 1.5853759E−07 | 6.3869045E−08 |
| A9 | −9.1021270E−09 | 2.8730516E−09 | −4.6440060E−10 | 4.2502097E−09 |
| A10 | 6.2534686E−10 | −9.1766599E−10 | −9.7081610E−10 | −3.7919499E−10 |
| A11 | 2.7583929E−11 | −9.0069084E−12 | 3.8240747E−12 | −1.5781572E−11 |
| A12 | −2.4762299E−12 | 3.0773985E−12 | 3.1179468E−12 | 1.0166845E−12 |
| A13 | −4.3373603E−14 | 1.4938995E−14 | −8.7516443E−15 | 2.8269868E−14 |
| A14 | 4.7445215E−15 | −5.0326156E−15 | −5.0734450E−15 | −1.2449539E−15 |
| A15 | 2.7473746E−17 | −1.0179225E−17 | 6.9952689E−18 | −1.9739271E−17 |
| A16 | −3.5535066E−18 | 3.2257393E−18 | 3.2909224E−18 | 5.3069628E−19 |

Example 5

Figure 14:
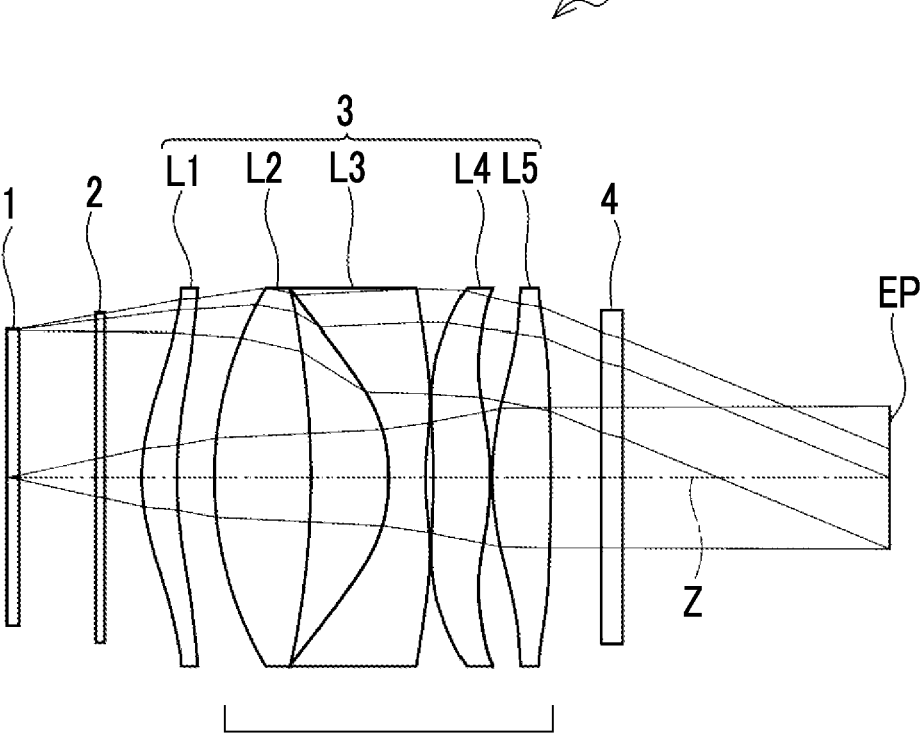
FIG. 14 is a cross-sectional view illustrating a configuration and luminous flux of an observation optical system of Example 5.

FIG. 14 illustrates a configuration and luminous flux of the observation optical system 5 of Example 5. The observation optical system 5 of Example 5 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a convex surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, four lenses of the lens L2 to the lens L5 move as a single body along the optical axis Z, and the lens L1, the display element 1, the optical member 2, and the optical member 4 are fixed.

Figure 15:
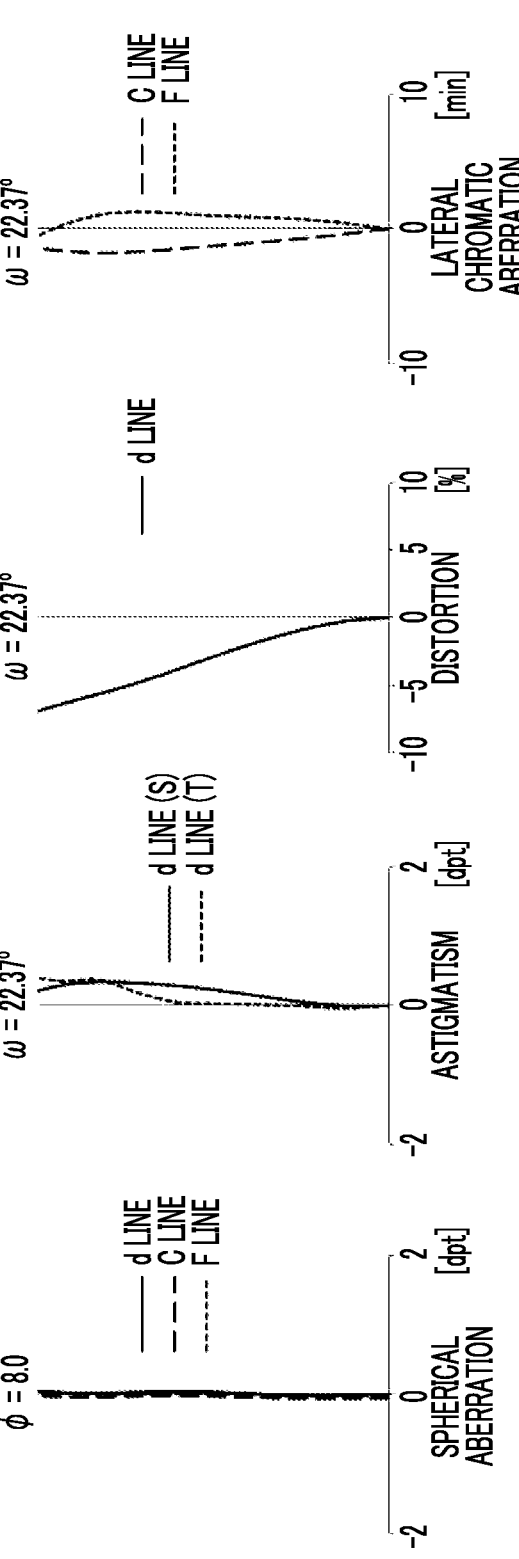
FIG. 15 is a spherical aberration diagram, an astigmatism diagram, a distortion diagram, and a lateral chromatic aberration diagram of the observation optical system of Example 5.
Figure 16:
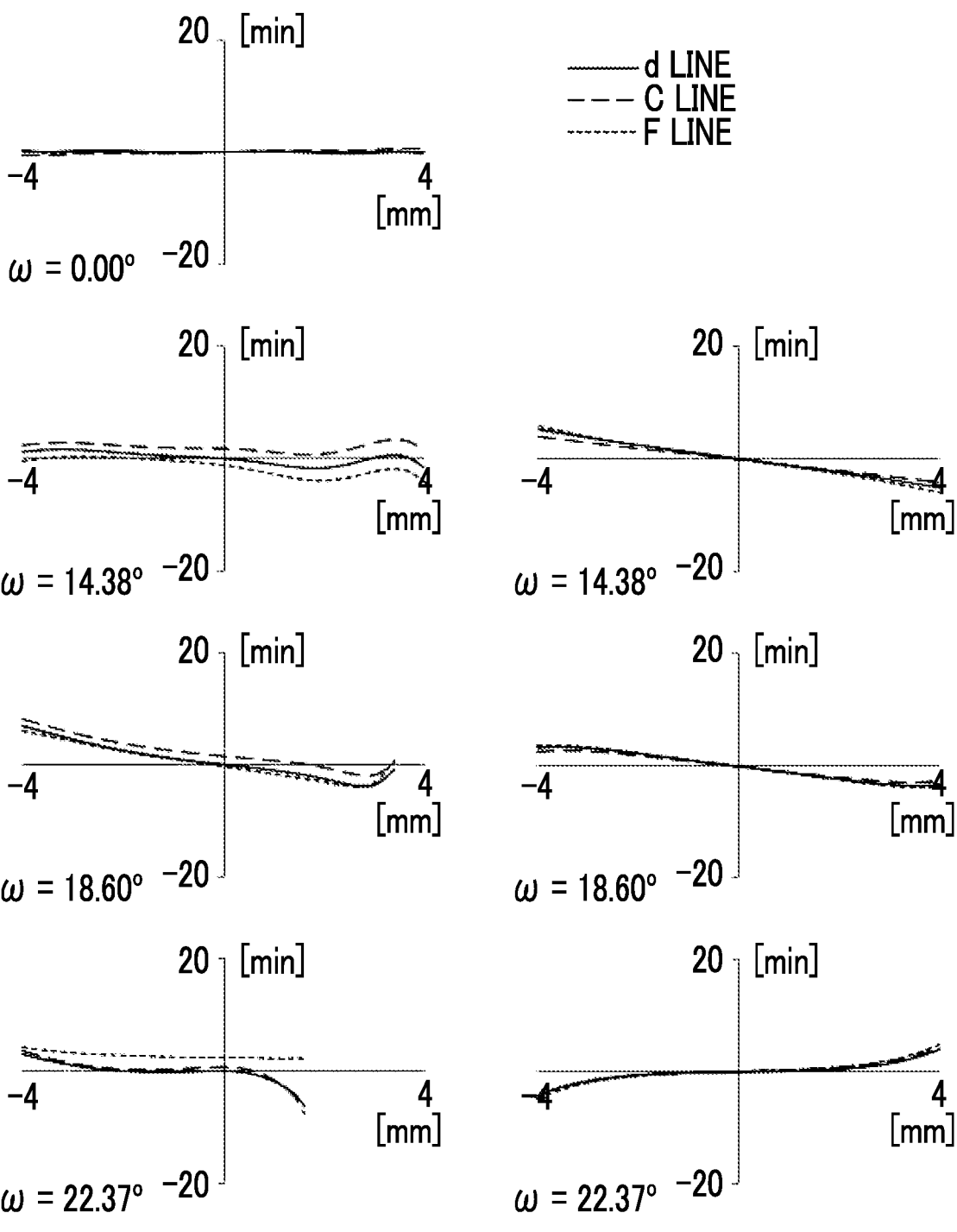
FIG. 16 is a lateral aberration diagram of the observation optical system of Example 5.

For the observation optical system 5 of Example 5, basic lens data is shown in Table 17, specifications are shown in Table 18, variable surface spacing is shown in Table 19, aspherical coefficients are shown in Table 20, and various aberration diagrams in a state where the diopter is −0.98 diopter are illustrated in FIG. 15 and FIG. 16.

TABLE 17

| | Example 5 | | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.51680 | 64.20 |
| 4 | ∞ | 2.0795 | | |
| *5 | 11.8500 | 1.9818 | 1.53501 | 55.68 |
| *6 | 26.4580 | DD[6] | | |
| 7 | 20.7066 | 5.4433 | 1.82563 | 45.44 |
| 8 | −48.3660 | 4.3670 | | |
| *9 | −12.8302 | 2.0550 | 1.63351 | 23.63 |

TABLE 17-continued

| | Example 5 | | | |
|---|---|---|---|---|
| Sn | R | D | Nd | vd |
| *10 | 13.2872 | 0.4579 | | |
| *11 | −35.9512 | 3.1385 | 1.53501 | 55.68 |
| *12 | −15.2457 | 0.1000 | | |
| *13 | 15.1392 | 3.2986 | 1.80625 | 40.91 |
| *14 | −105.757 | DD[14] | | |
| 15 | ∞ | 1.2000 | 1.49023 | 57.5 |
| 16 | ∞ | 15 | | |
| 17 (EP) | ∞ | | | |

TABLE 18

| | Example 5 | | |
|---|---|---|---|
| Diopter | −1 dpt | −4.5 dpt | +2.5 dpt |
| f | 17.96 | 17.96 | 17.96 |
| Apparent Field of View (°) | 44.75 | 43.84 | 45.20 |
| H | 8.20 | | |

TABLE 19

| | Example 5 | | |
|---|---|---|---|
| Diopter | −1 dpt | −4.5 dpt | +2.5 dpt |
| DD[6] | 2.09 | 0.49 | 3.68 |
| DD[14] | 2.84 | 4.44 | 1.25 |

TABLE 20

| | | Example 5 | | |
|---|---|---|---|---|
| Sn | 5 | 6 | 9 | 10 |
| KA | −1.2148103E+00 | −2.9999903E+00 | 3.4535538E−01 | 8.4148914E−01 |
| A3 | 6.2172489E−18 | −8.8817842E−19 | 2.6645353E−18 | 0.0000000E+00 |
| A4 | −1.2641028E−04 | −6.0961867E−06 | −1.8625567E−03 | −2.3229863E−03 |
| A5 | 2.8757571E−05 | 8.2574401E−05 | 1.8892433E−04 | 1.8175603E−04 |
| A6 | 3.3917154E−07 | −2.0464564E−05 | 1.8842485E−05 | 2.3142579E−05 |
| A7 | −2.1062029E−06 | 5.1958242E−07 | −1.3982883E−06 | −2.5184787E−06 |
| A8 | 1.8227993E−07 | 1.5106416E−07 | −2.1321328E−07 | −1.1546549E−07 |
| A9 | 1.3009812E−08 | −8.2627312E−09 | 7.6563819E−09 | 1.5388000E−08 |
| A10 | −1.3325389E−09 | −1.8895881E−10 | 1.3504525E−09 | 3.0371408E−10 |
| A11 | −4.0897952E−11 | 3.4307840E−11 | −2.5071709E−11 | −4.9327767E−11 |
| A12 | 3.6876512E−12 | −2.0277875E−12 | −4.6340697E−12 | −4.3359014E−13 |
| A13 | 6.6023366E−14 | −6.4854928E−14 | 4.2739383E−14 | 8.0732427E−14 |
| A14 | −4.1499478E−15 | 7.9307242E−15 | 8.0845625E−15 | 4.2948989E−16 |
| A15 | −4.2577409E−17 | 4.7260187E−17 | −2.9302433E−17 | −5.3191844E−17 |
| A16 | 1.2870564E−18 | −8.2892830E−18 | −5.6178475E−18 | −3.1674054E−19 |

| Sn | 11 | 12 | 13 | 14 |
|---|---|---|---|---|
| KA | 3.0000087E+00 | −1.0639583E−01 | 1.1276501E+00 | −3.0000038E+00 |
| A3 | 4.4408921E−19 | −2.3314684E−18 | −1.3322676E−18 | 2.6645353E−18 |
| A4 | 6.0663411E−04 | 2.2989769E−04 | −2.3686430E−04 | 8.6208081E−05 |
| A5 | −1.1251206E−04 | −5.9952495E−05 | 1.6012609E−05 | −1.4729524E−05 |
| A6 | 1.6028509E−05 | 2.3826119E−05 | −2.4984621E−06 | 2.6980196E−06 |
| A7 | 1.2146492E−06 | 2.8653685E−07 | 7.5113382E−08 | −5.6256054E−07 |
| A8 | −3.3735235E−07 | −4.0248599E−07 | −1.6654883E−09 | t.1946975E−09 |
| A9 | −5.2033368E−09 | 4.9467218E−10 | −5.4333791E−10 | 5.2051190E−09 |
| A10 | 2.5833050E−09 | 2.8685453E−09 | 1.1267569E−10 | −1.6166657E−11 |
| A11 | 1.2683228E−11 | −3.6076246E−12 | 2.9540361E−12 | −2.0377311E−11 |
| A12 | −9.6910543E−12 | −1.0099229E−11 | −5.1270373E−13 | −1.9445078E−13 |
| A13 | −1.6871068E−14 | 7.3477443E−15 | −6.7168518E−15 | 3.7361349E−14 |
| A14 | 1.7767113E−14 | 1.7411569E−14 | 9.2096215E−16 | 8.6172753E−16 |
| A15 | 9.3594511E−18 | −5.4445539E−18 | 5.5521558E−18 | −2.6384718E−17 |
| A16 | −1.2720436E−17 | −1.1784881E−17 | −6.0757838E−19 | −9.3502376E−19 |

Example 6

Figure 17:
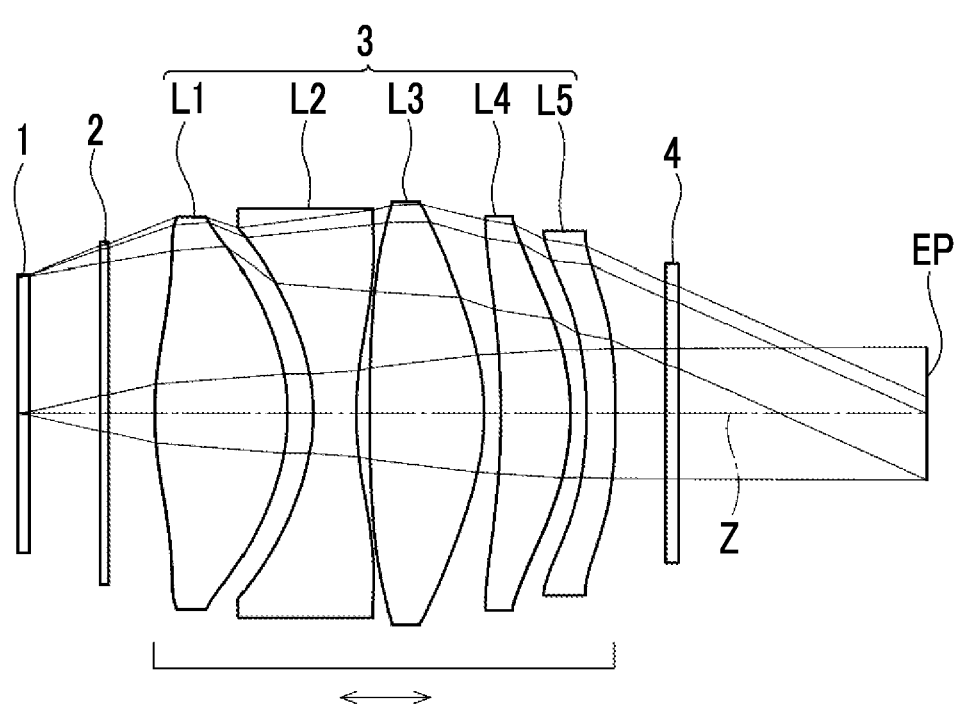
FIG. 17 is a cross-sectional view illustrating a configuration and luminous flux of an observation optical system of Example 6.

FIG. 17 illustrates a configuration and luminous flux of the observation optical system 5 of Example 6. The observation optical system 5 of Example 6 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a biconvex shape in a paraxial region. The lens L2 is a negative lens having a biconcave shape in a paraxial region. The lens L3 is a positive lens having a biconvex shape in a paraxial region. The lens L4 is a positive lens having a meniscus shape of which a concave surface faces toward the display element side in a paraxial region. The lens L5 is a negative lens having a meniscus shape of which a concave surface faces toward the display element side in a paraxial region. All of the lens L1 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 18:
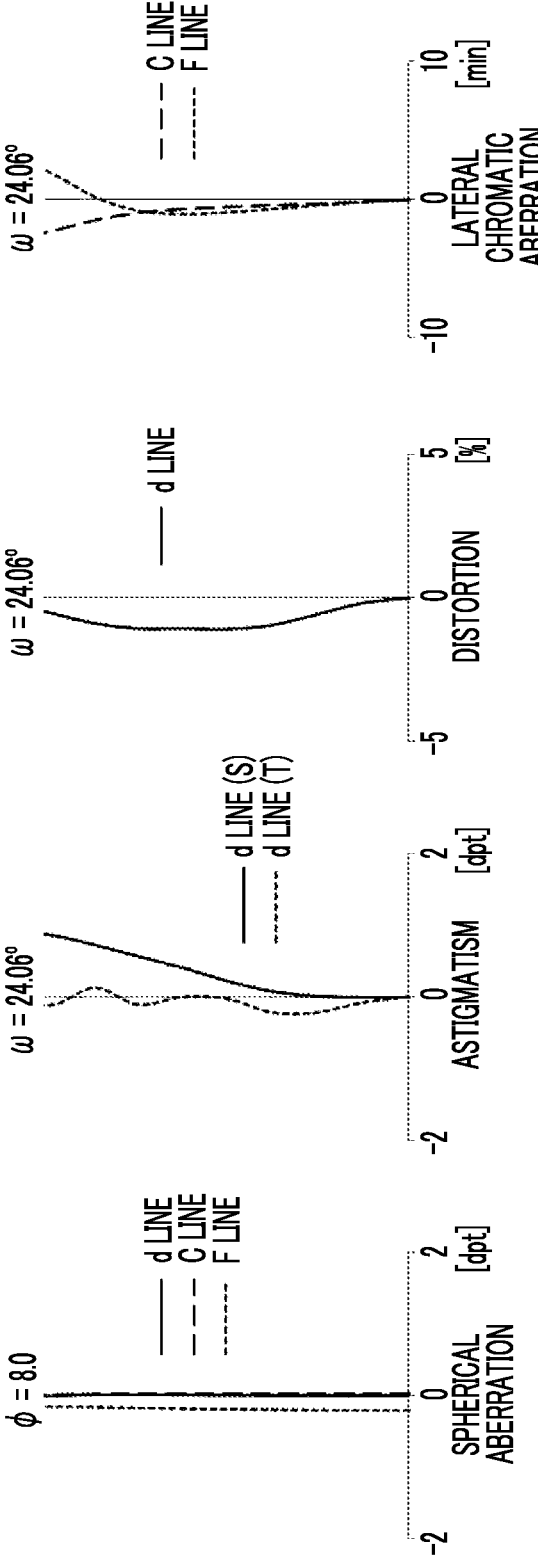
FIG. 18 is a spherical aberration diagram, an astigmatism diagram, a distortion diagram, and a lateral chromatic aberration diagram of the observation optical system of Example 6.
Figure 19:
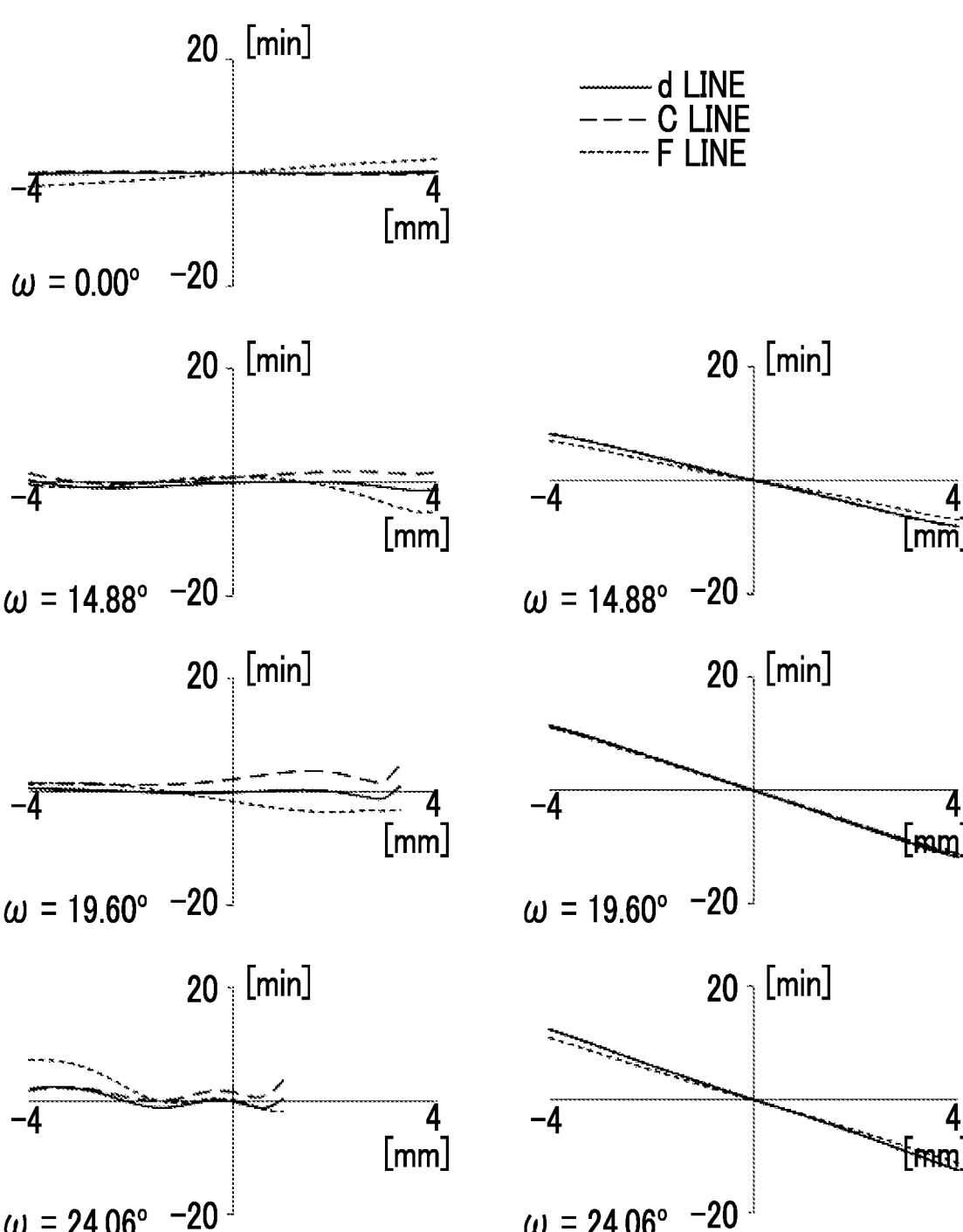
FIG. 19 is a lateral aberration diagram of the observation optical system of Example 6.

For the observation optical system 5 of Example 6, basic lens data is shown in Table 21, specifications are shown in Table 22, variable surface spacing is shown in Table 23, aspherical coefficients are shown in Table 24, and various aberration diagrams in a state where the diopter is −0.98 diopter are illustrated in FIG. 18 and FIG. 19.

TABLE 21

| | | Example 6 | | |
|---|---|---|---|---|
| Sn | R | D | Nd | vd |
| 1 | ∞ | 0.7000 | 1.51680 | 64.20 |
| 2 | ∞ | 4.3000 | | |
| 3 | ∞ | 0.5000 | 1.51680 | 64.20 |
| 4 | ∞ | DD[4] | | |
| *5 | 19.5458 | 8.0000 | 1.81000 | 41.00 |
| *6 | −13.1456 | 1.5647 | | |
| *7 | −12.1932 | 2.5879 | 1.63351 | 23.63 |
| *8 | 20.7155 | 0.8101 | | |
| *9 | 123.0755 | 6.9585 | 1.53500 | 55.73 |
| *10 | −14.2498 | 1.0000 | | |
| *11 | −50.2835 | 4.2145 | 1.53500 | 55.73 |
| *12 | −14.6415 | 1.0000 | | |
| *13 | −23.2883 | 1.7434 | 1.63351 | 23.63 |
| *14 | −47.1704 | DD[14] | | |
| 15 | ∞ | 0.8000 | 1.49023 | 57.5 |
| 16 | ∞ | 15 | | |
| 17 (EP) | ∞ | | | |

TABLE 22

| | Example 6 | | |
|---|---|---|---|
| Diopter | −1 dpt | −4.5 dpt | +2.5 dpt |
| f | 18.00 | 18.00 | 18.00 |
| Apparent Field of View (°) | 48.12 | 46.03 | 50.10 |
| H | 8.20 | | |

TABLE 23

| Example 6 | | | |
| --- | --- | --- | --- |
| Diopter | −1 dpt | −4.5 dpt | +2.5 dpt |
| DD[4] | 2.80 | 1.67 | 3.93 |
| DD[14] | 3.02 | 4.15 | 1.89 |

TABLE 24

| Example 6 | | | | |
| --- | --- | --- | --- | --- |
| Sn | 5 | 6 | 7 | 8 |
| KA | 1.0000000E+00 | 1.0000000E+00 | 1.0000000E+00 | 1.0000000E+00 |
| A4 | −2.1019368E−04 | 9.3378064E−05 | 1.5328539E−04 | −1.4639119E−04 |
| A6 | 4.9097534E−07 | −4.8309689E−07 | 6.6568935E−07 | −2.4354185E−07 |
| A8 | −2.8336917E−09 | 1.0397931E−08 | −1.3231248E−08 | 1.1062380E−09 |
| A10 | 1.9745890E−11 | −3.3629055E−11 | 3.4935581E−11 | 5.6091406E−12 |
| A12 | 3.5925936E−14 | −1.2150956E−12 | 4.0532556E−13 | 3.1182122E−14 |
| A14 | −7.2634669E−16 | 9.0395366E−15 | −3.2243893E−16 | −2.5387323E−17 |
| A16 | −5.8000249E−18 | 9.5830355E−17 | −8.6862909E−19 | −5.3635124E−19 |
| A18 | 1.4347506E−19 | −1.2693347E−18 | −9.7982677E−20 | −3.2622309E−21 |
| A20 | −5.0311610E−22 | 3.9844790E−21 | 6.5659920E−22 | 1.4643777E−23 |

| Sn | 9 | 10 | 11 | 12 |
| --- | --- | --- | --- | --- |
| KA | 1.0000000E+00 | 1.0000000E+00 | 1.0000000E+00 | 1.0000000E+00 |
| A4 | 3.0527586E−05 | 1.5986211E−04 | 5.6000884E−04 | 5.3406024E−05 |
| A6 | 8.3450885E−09 | −1.0369557E−07 | 1.2462344E−07 | 4.1131103E−07 |
| A8 | −2.2285149E−10 | −3.6492722E−10 | 5.6403604E−11 | 8.7340235E−10 |
| A10 | −7.5117722E−14 | −3.6541530E−13 | 4.5553257E−13 | 1.1721234E−13 |
| A12 | 5.7815185E−15 | 1.1017987E−14 | 7.5914978E−15 | −2.5656450E−15 |
| A14 | −4.7535308E−18 | 3.9371850E−17 | 6.3325883E−17 | 1.3929207E−17 |
| A16 | 6.7383557E−20 | −2.0941804E−19 | 3.4818702E−19 | −1.7923644E−19 |
| A18 | −3.2268807E−21 | 1.6124564E−21 | −3.0745967E−21 | −1.5974714E−21 |
| A20 | 1.4149447E−23 | 7.5952901E−24 | −1.4847442E−23 | 1.2178529E−25 |

| Sn | 13 | 14 |
| --- | --- | --- |
| KA | 1.0000000E+00 | 1.0000000E+00 |
| A4 | −8.2108541E−05 | −1.6647681E−04 |
| A6 | 2.6411674E−07 | 6.9657129E−07 |
| A8 | 1.7276728E−09 | 2.5348040E−09 |
| A10 | 1.6393339E−11 | −2.3440859E−13 |
| A12 | 5.0137588E−14 | −8.8917123E−15 |
| A14 | −1.5144177E−16 | −4.0304309E−16 |
| A16 | 1.2974510E−18 | 7.5284361E−18 |
| A18 | −2.2783304E−20 | 1.8735148E−20 |
| A20 | 1.5719213E−23 | −9.0673406E−23 |

Figure 20:
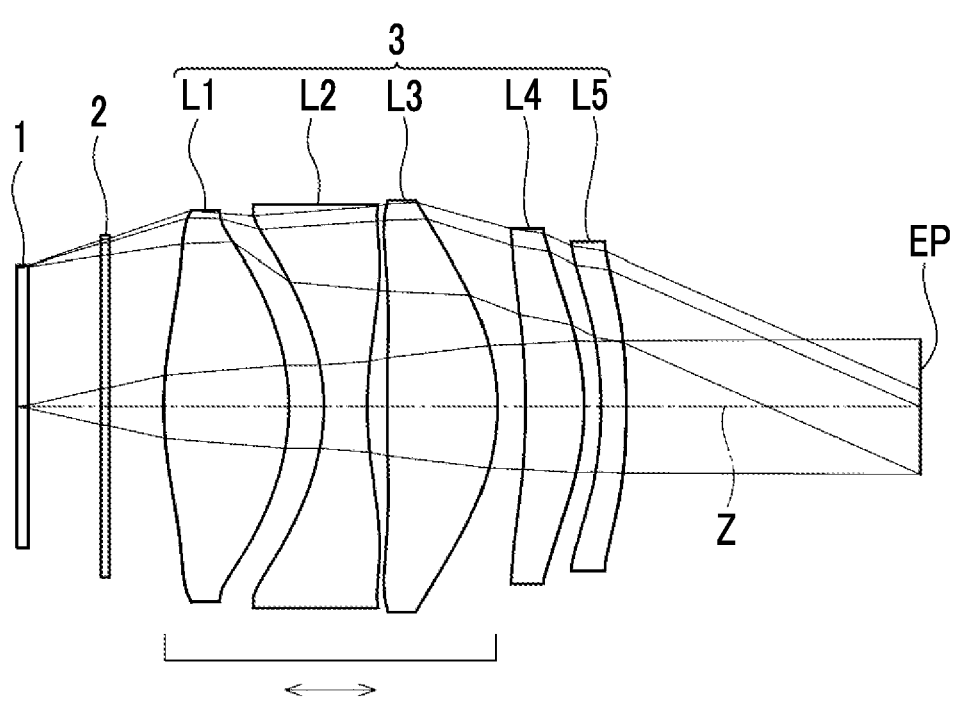
FIG. 20 is a cross-sectional view illustrating a configuration and luminous flux of an observation optical system of Example 7.

FIG. 20 illustrates a configuration and luminous flux of the observation optical system 5 of Example 7. The observation optical system 5 of Example 7 comprises the display element 1, the optical member 2, and the eyepiece lens 3 in order from the display element side to the eyepoint side.

The eyepiece lens 3 consists of five lenses of the lens L1 to the lens L5 in order from the display element side to the eyepoint side. The lens L1 is a positive lens having a biconvex shape in a paraxial region. The lens L2 is a negative lens having a biconcave shape in a paraxial region. The lens L3 is a positive lens having a biconvex shape in a paraxial region. The lens L4 is a positive lens having a meniscus shape of which a concave surface faces toward the display element side in a paraxial region. The lens L5 is a negative lens having a meniscus shape of which a concave surface faces toward the display element side in a paraxial region. All of the lens L1 to the lens L5 are aspherical lenses. All of the lens L1 to the lens L5 are single lenses. In the diopter adjustment, three lenses of the lens L1 to the lens L3 move as a single body along the optical axis Z, and two lenses of the lens L4 and the lens L5, the display element 1, and the optical member 2 are fixed.

Figure 21:
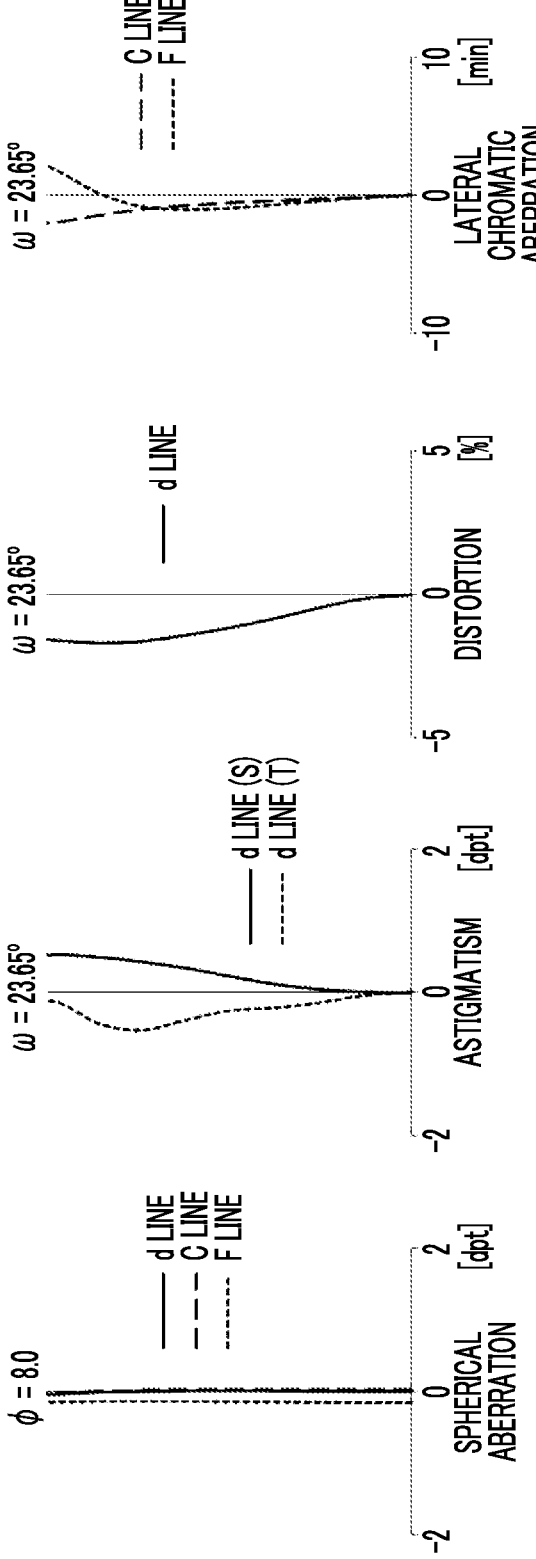
FIG. 21 is a spherical aberration diagram, an astigmatism diagram, a distortion diagram, and a lateral chromatic aberration diagram of the observation optical system of Example 7.
Figure 22:
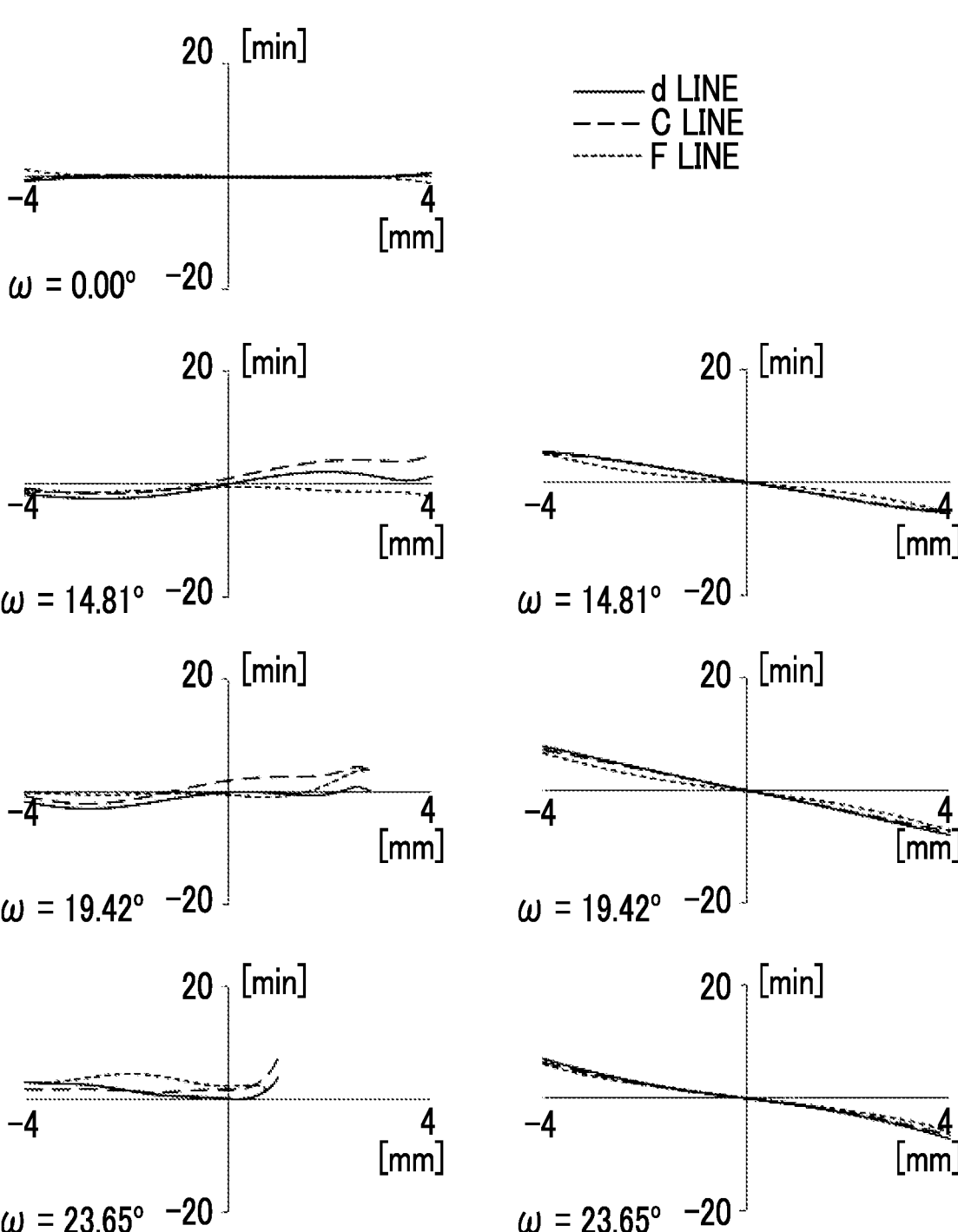
FIG. 22 is a lateral aberration diagram of the observation optical system of Example 7.

For the observation optical system 5 of Example 7, basic lens data is shown in Table 25, specifications are shown in Table 26, variable surface spacing is shown in Table 27, aspherical coefficients are shown in Table 28, and various aberration diagrams in a state where the diopter is −0.98 diopter are illustrated in FIG. 21 and FIG. 22.

TABLE 25

| Example 7 | | | | |
| --- | --- | --- | --- | --- |
| Sn | R | D | Nd | vd |
| 1 | ∞ | 0.7000 | 1.51680 | 64.20 |
| 2 | ∞ | 4.3000 | | |
| 3 | ∞ | 0.5000 | 1.51680 | 64.20 |
| 4 | ∞ | DD[4] | | |
| *5 | 20.7655 | 7.4516 | 1.80337 | 45.53 |
| *6 | −13.3540 | 2.0772 | | |
| *7 | −12.2564 | 2.5755 | 1.63351 | 23.63 |
| *8 | 22.6707 | 1.1781 | | |
| *9 | 100.8605 | 6.5236 | 1.53500 | 55.73 |
| *10 | −13.4774 | DD[10] | | |
| *11 | −43.1171 | 3.4891 | 1.53500 | 55.73 |
| *12 | −14.9600 | 1.0000 | | |

TABLE 25-continued

| | | Example 7 | | | |
|---|---|---|---|---|---|
| Sn | R | D | Nd | νd | |
| *13 | −23.2349 | 1.5000 | 1.68948 | 31.02 | 5 |
| *14 | −47.2589 | 17.5 | | | |
| 15 (EP) | ∞ | | | | |

TABLE 26

| | Example 7 | | |
|---|---|---|---|
| Diopter | −1 dpt | −4.5 dpt | +2.5 dpt |
| f | 18.00 | 18.00 | 18.00 |
| Apparent Field of View (°) | 47.31 | 44.69 | 49.93 |
| H | 8.20 | | |

TABLE 27

| | Example 7 | | |
|---|---|---|---|
| Diopter | −1 dpt | −4.5 dpt | +2.5 dpt |
| DD[4] | 3.25 | 2.08 | 4.42 |
| DD[14] | 1.67 | 2.83 | 0.50 |

TABLE 28

| | | Example 7 | | |
|---|---|---|---|---|
| Sn | 5 | 6 | 7 | 8 |
| KA | 1.0000000E+00 | 1.0000000E+00 | 1.0000000E+00 | 1.0000000E+00 |
| A4 | −1.7088564E−04 | 1.0064696E−04 | 1.5230671E−04 | −1.7718341E−04 |
| A6 | 3.3627854E−07 | −3.9340026E−07 | 2.3183510E−07 | −1.3857239E−07 |
| A8 | −2.5441668E−09 | 3.7482304E−09 | −8.8376607E−09 | 9.8514183E−10 |
| A10 | 1.6482201E−11 | 4.3405549E−11 | 5.2721070E−11 | 1.0356273E−11 |
| A12 | 4.3871579E−14 | −1.3773642E−12 | 3.5036913E−13 | 4.5995912E−14 |
| A14 | −1.7114993E−16 | 8.7018525E−15 | −9.0510704E−16 | −7.6552376E−17 |
| A16 | −4.2235123E−18 | 8.5464080E−17 | −4.6939488E−18 | −3.2112857E−20 |
| A18 | 1.5261147E−19 | −1.2363496E−18 | −9.8732976E−20 | −6.2694456E−21 |
| A20 | −7.1034280E−22 | 4.4152285E−21 | 9.4799222E−22 | 2.6716407E−23 |

| | | | | |
|---|---|---|---|---|
| Sn | 9 | 10 | 11 | 12 |
| KA | 1.0000000E+00 | 1.0000000E+00 | 1.0000000E+00 | 1.0000000E+00 |
| A4 | −9.5495238E−05 | 4.1416636E−05 | −2.2331144E−05 | 1.2714960E−04 |
| A6 | −1.0032588E−07 | 3.7388029E−07 | 7.9539515E−07 | 2.9456321E−07 |
| A8 | 3.6681873E−09 | 6.8109732E−10 | −1.9014201E−11 | −2.2011593E−10 |
| A10 | 1.4362111E−12 | 4.7958022E−12 | −2.1816809E−11 | 1.2804365E−12 |
| A12 | −3.8662047E−14 | 2.6774811E−14 | −1.9606409E−14 | 1.5982391E−15 |
| A14 | 4.0056831E−16 | −1.8854169E−17 | 3.1552704E−16 | −4.0937812E−16 |
| A16 | −1.5776936E−19 | −2.0011875E−18 | −6.3429898E−18 | −5.0473112E−18 |
| A18 | −2.0357308E−21 | 1.6879737E−21 | 5.6494459E−20 | 1.2070143E−20 |
| A20 | −4.7652824E−23 | 4.3253783E−23 | −1.3459665E−22 | 1.6417246E−22 |

| | | |
|---|---|---|
| Sn | 13 | 14 |
| KA | 1.0000000E+00 | 1.0000000E+00 |
| A4 | −5.2019031E−05 | −1.5428799E−04 |
| A6 | 6.6845006E−07 | 1.1298244E−06 |
| A8 | 2.8856844E−09 | 2.2842771E−09 |
| A10 | 6.3929406E−12 | 1.4149946E−11 |
| A12 | 2.3142624E−14 | −4.0494235E−13 |
| A14 | −4.4874873E−16 | 1.2535051E−15 |
| A16 | −4.1966117E−18 | 5.3730888E−18 |
| A18 | −1.4020185E−19 | 7.6370408E−20 |
| A20 | 1.2945796E−21 | −5.1221892E−22 |

Figure 23:
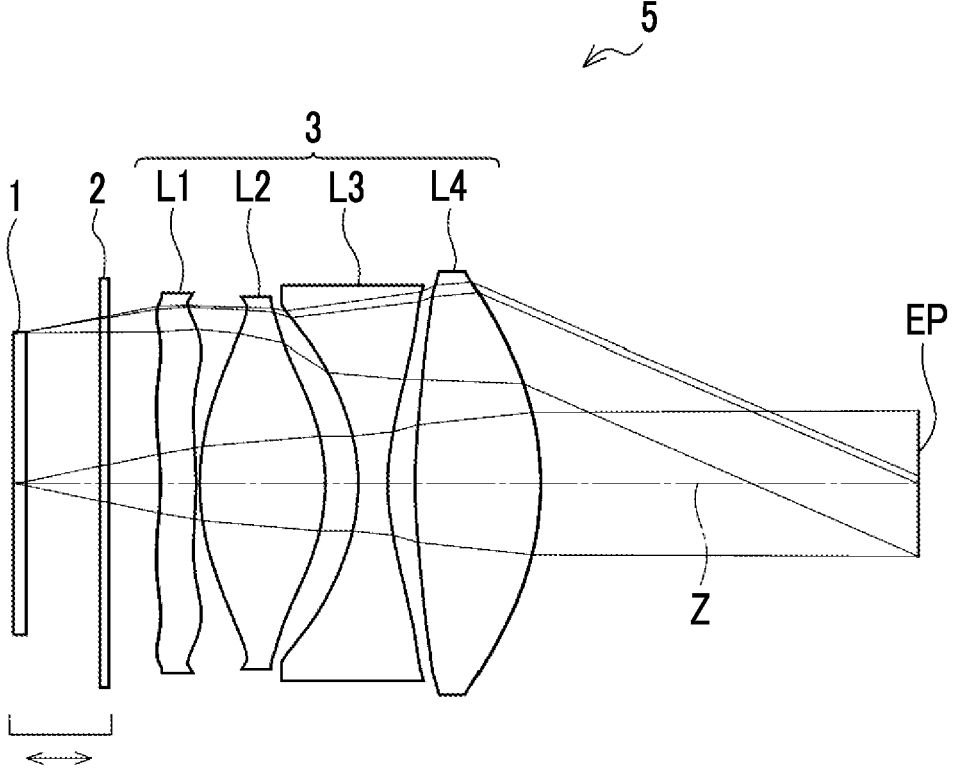
FIG. 23 is a cross-sectional view illustrating a configuration and luminous flux of an observation optical system of Example 8.

FIG. 23 illustrates a configuration and luminous flux of the observation optical system 5 of Example 8. The observation optical system 5 of Example 8 comprises the display element 1, the optical member 2, and the eyepiece lens 3 in order from the display element side to the eyepoint side.

The eyepiece lens 3 consists of four lenses of the lens L1 to the lens L4 in order from the display element side to the eyepoint side. The lens L1 is a negative lens having a meniscus shape of which a concave surface faces toward the display element side in a paraxial region. The lens L2 is a positive lens having a biconvex shape in a paraxial region. The lens L3 is a negative lens having a biconcave shape in a paraxial region. The lens L4 is a positive lens having a biconvex shape in a paraxial region. All of the lens L1 to the lens L4 are aspherical lenses. All of the lens L1 to the lens L4 are single lenses. In the diopter adjustment, the display element 1 and the optical member 2 move as a single body along the optical axis Z, and the four lenses of the lens L1 to the lens L4 are fixed.

Figure 24:
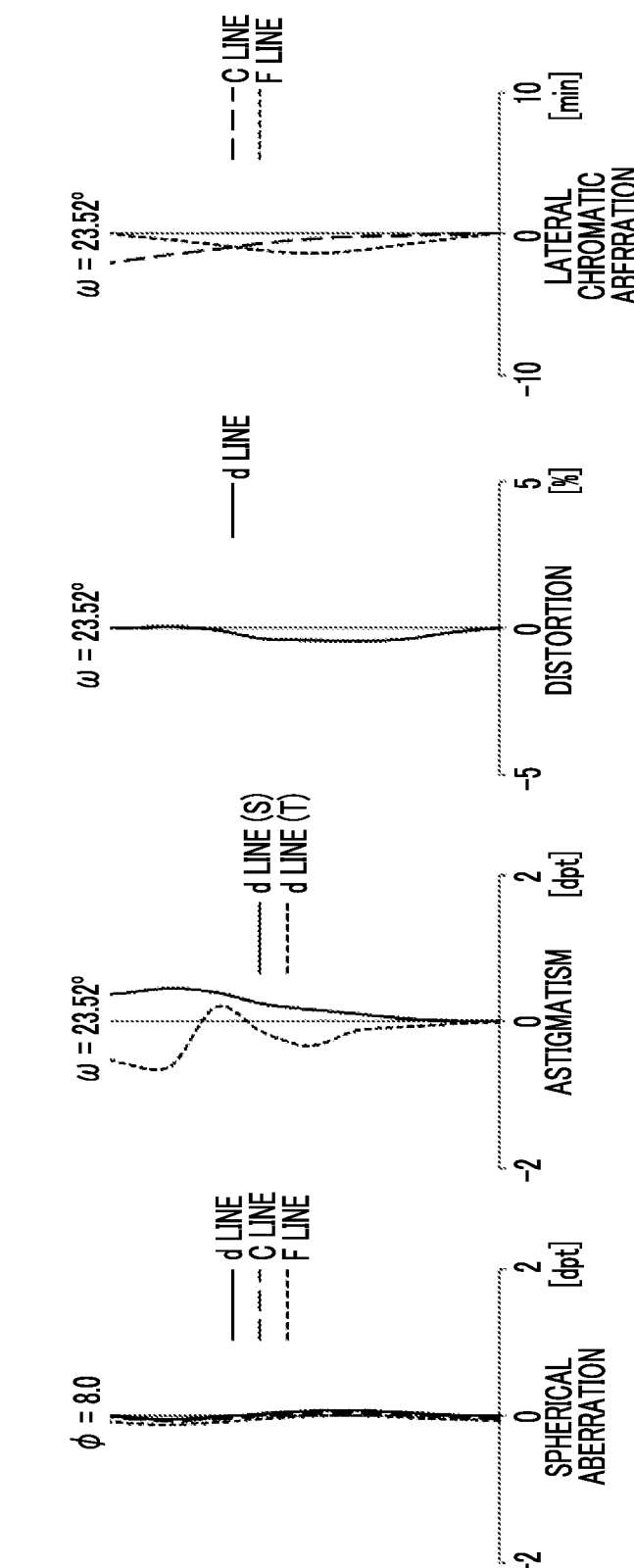
FIG. 24 is a spherical aberration diagram, an astigmatism diagram, a distortion diagram, and a lateral chromatic aberration diagram of the observation optical system of Example 8.
Figure 25:
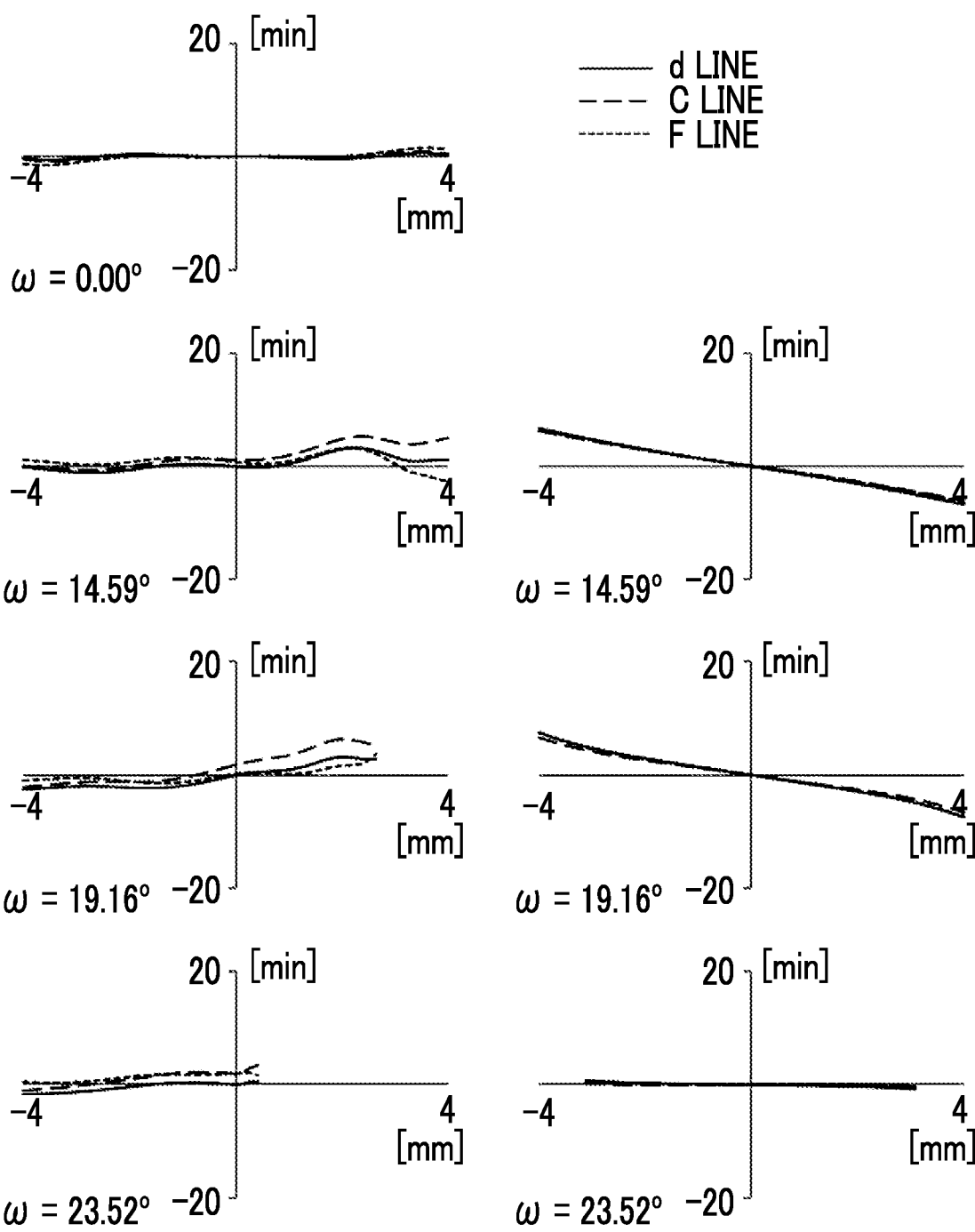
FIG. 25 is a lateral aberration diagram of the observation optical system of Example 8.

For the observation optical system 5 of Example 8, basic lens data is shown in Table 29, specifications are shown in Table 30, variable surface spacing is shown in Table 31, aspherical coefficients are shown in Table 32, and various aberration diagrams in a state where the diopter is −1.00 diopter are illustrated in FIG. 24 and FIG. 25.

TABLE 29

Example 8

| Sn | R | D | Nd | vd |
|---|---|---|---|---|
| 1 | ∞ | 0.7000 | 1.51900 | 64.90 |
| 2 | ∞ | 4.0000 | | |

TABLE 29-continued

Example 8

| Sn | R | D | Nd | vd |
|---|---|---|---|---|
| 3 | ∞ | 0.5000 | 1.51900 | 64.90 |
| 4 | ∞ | DD[4] | | |
| *5 | −17.8339 | 1.9444 | 1.53409 | 55.87 |
| *6 | −21.1316 | 0.2000 | | |
| *7 | 13.0337 | 6.8580 | 1.53409 | 55.87 |
| *8 | −10.9107 | 1.7845 | | |
| *9 | −11.5109 | 1.6000 | 1.63351 | 23.63 |
| *10 | 11.2770 | 1.4967 | | |
| *11 | 29.6165 | 6.7817 | 1.85260 | 40.53 |
| *12 | −16.4208 | 20.6000 | | |
| 13 (EP) | ∞ | | | |

TABLE 30

Example 8

| Diopter | −1.0 dpt | −5.5 dpt | +2.5 dpt |
|---|---|---|---|
| f | 18.70 | 18.70 | 18.70 |
| Apparent Field of View (°) | 47.03 | 45.99 | 48.04 |
| H | 8.20 | | |

TABLE 31

Example 8

| Diopter | −1.0 dpt | −5.5 dpt | +2.5 dpt |
|---|---|---|---|
| DD[4] | 2.80 | 1.15 | 4.01 |

TABLE 32

Example 8

| Sn | 5 | 6 |
|---|---|---|
| KA | 1.0000000E+00 | −1.0000000E+00 |
| A4 | 9.6929395E−04 | 9.1514355E−04 |
| A6 | 1.3025067E−05 | 1.0816716E−05 |
| A8 | −1.6200335E−06 | −9.3067583E−07 |
| A10 | 6.9825237E−08 | 3.0668627E−08 |
| A12 | −2.0742236E−09 | −8.9856706E−10 |
| A14 | 4.2858076E−11 | 1.9318667E−11 |
| A16 | −6.1390587E−13 | −2.8147454E−13 |
| A18 | 6.0189206E−15 | 2.7742105E−15 |
| A20 | −3.8521041E−17 | −1.7950782E−17 |
| A22 | 1.4279641E−19 | 6.7064579E−20 |
| A24 | −1.9027170E−22 | −8.1081344E−23 |
| A26 | −4.9211181E−25 | −2.3268129E−25 |
| A28 | 1.6269335E−27 | 4.2270524E−28 |

| Sn | 7 | 8 |
|---|---|---|
| KA | 1.0000000E+00 | 1.0000000E+00 |
| A4 | −2.0653864E−04 | 1.9518565E−05 |
| A6 | 2.3886791E−06 | 7.9796433E−06 |
| A8 | −3.4288101E−08 | −1.3997461E−07 |
| A10 | 8.0573518E−11 | 1.1283674E−09 |
| A12 | −2.6492078E−13 | 6.1541366E−12 |
| A14 | −7.5387606E−16 | −3.3515275E−14 |
| A16 | 4.6420983E−16 | −7.6299384E−16 |
| A18 | −4.0930263E−18 | −4.6332134E−18 |
| A20 | −9.7381205E−22 | 7.5581128E−20 |

| Sn | 9 | 10 | 11 | 12 |
|---|---|---|---|---|
| KA | 1.0000000E+00 | 1.0000000E+00 | 1.0000000E+00 | −1.0000000E+00 |
| A4 | −3.1875252E−04 | −9.4095592E−04 | −2.2039892E−04 | −9.1443218E−05 |
| A6 | 3.0988721E−05 | 1.8057873E−05 | 5.5998288E−06 | 6.1444370E−06 |

TABLE 32-continued

| | Example 8 | | | |
|---|---|---|---|---|
| A8 | −1.2872915E−06 | −3.9286581E−07 | −3.5648489E−07 | −3.6933166E−07 |
| A10 | 3.6719957E−08 | 9.9142917E−09 | 1.5210916E−08 | 1.3366622E−08 |
| A12 | −6.4481095E−10 | −2.5293369E−10 | −3.9748111E−10 | −3.2729596E−10 |
| A14 | 3.8773723E−12 | 5.0150793E−12 | 7.2245914E−12 | 5.8388264E−12 |
| A16 | 9.7934853E−14 | −7.1028836E−14 | −9.8951047E−14 | −7.9234168E−14 |
| A18 | −2.7649979E−15 | 6.9320545E−16 | 1.0645848E−15 | 8.4418999E−16 |
| A20 | 3.2780719E−17 | −4.4513583E−18 | −9.0904417E−18 | −7.1376658E−18 |
| A22 | −2.1141327E−19 | 1.6946893E−20 | 5.9680166E−20 | 4.6422129E−20 |
| A24 | 6.9412654E−22 | −2.6434139E−23 | −2.7739040E−22 | −2.1418759E−22 |
| A26 | −7.0718404E−25 | −3.3788723E−26 | 7.9097566E−25 | 6.0910106E−25 |
| A28 | −9.3524016E−28 | 1.1629473E−28 | −1.0201454E−27 | −7.8821918E−28 |

Figure 26:
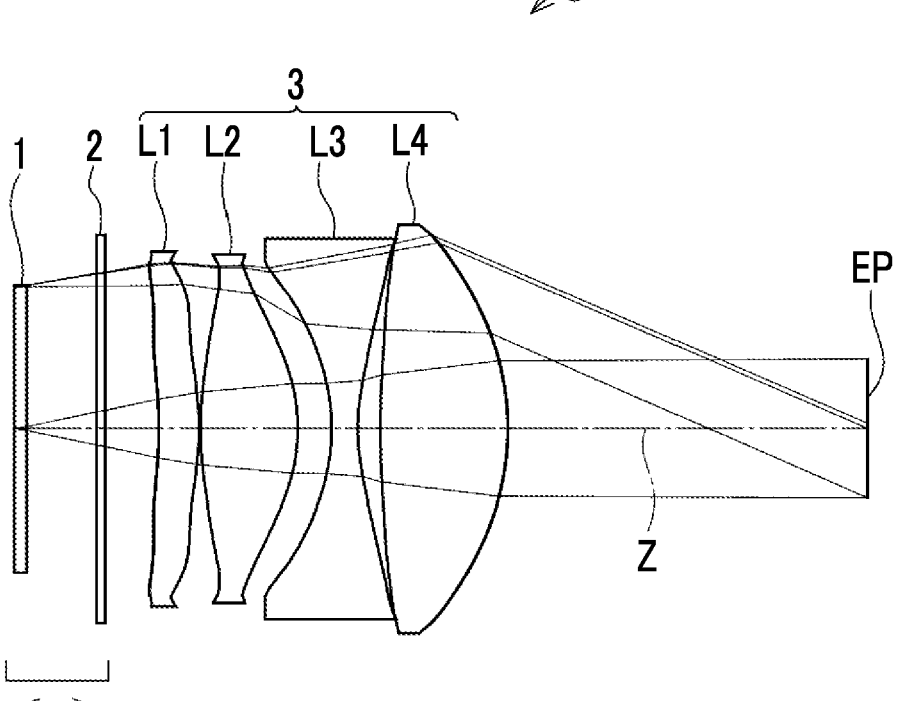
FIG. 26 is a cross-sectional view illustrating a configuration and luminous flux of an observation optical system of Example 9.

FIG. 26 illustrates a configuration and luminous flux of the observation optical system 5 of Example 9. The observation optical system 5 of Example 9 comprises the display element 1, the optical member 2, and the eyepiece lens 3 in order from the display element side to the eyepoint side.

The eyepiece lens 3 consists of four lenses of the lens L1 to the lens L4 in order from the display element side to the eyepoint side. The lens L1 is a positive lens having a meniscus shape of which a concave surface faces toward the display element side in a paraxial region. The lens L2 is a positive lens having a biconvex shape in a paraxial region. The lens L3 is a negative lens having a biconcave shape in a paraxial region. The lens L4 is a positive lens having a biconvex shape in a paraxial region. All of the lens L1 to the lens L4 are aspherical lenses. All of the lens L1 to the lens L4 are single lenses. In the diopter adjustment, the display element 1 and the optical member 2 move as a single body along the optical axis Z, and the four lenses of the lens L1 to the lens L4 are fixed.

Figure 27:
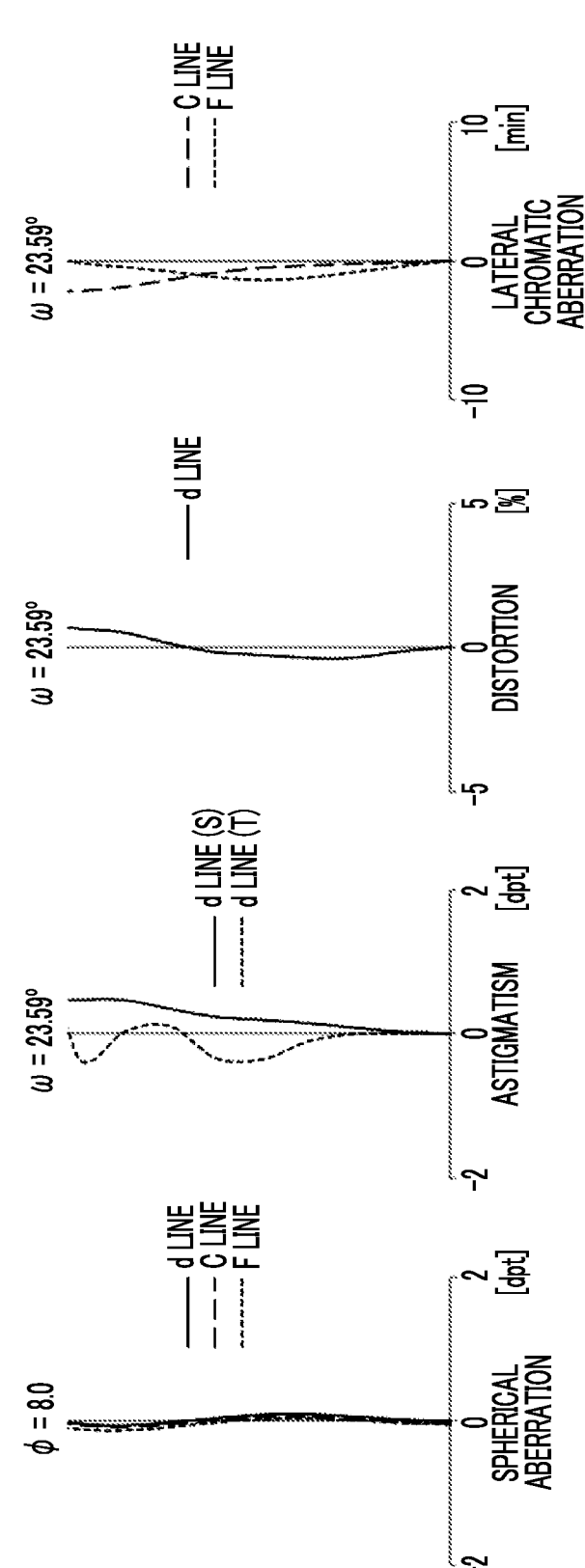
FIG. 27 is a spherical aberration diagram, an astigmatism diagram, a distortion diagram, and a lateral chromatic aberration diagram of the observation optical system of Example 9.
Figure 28:
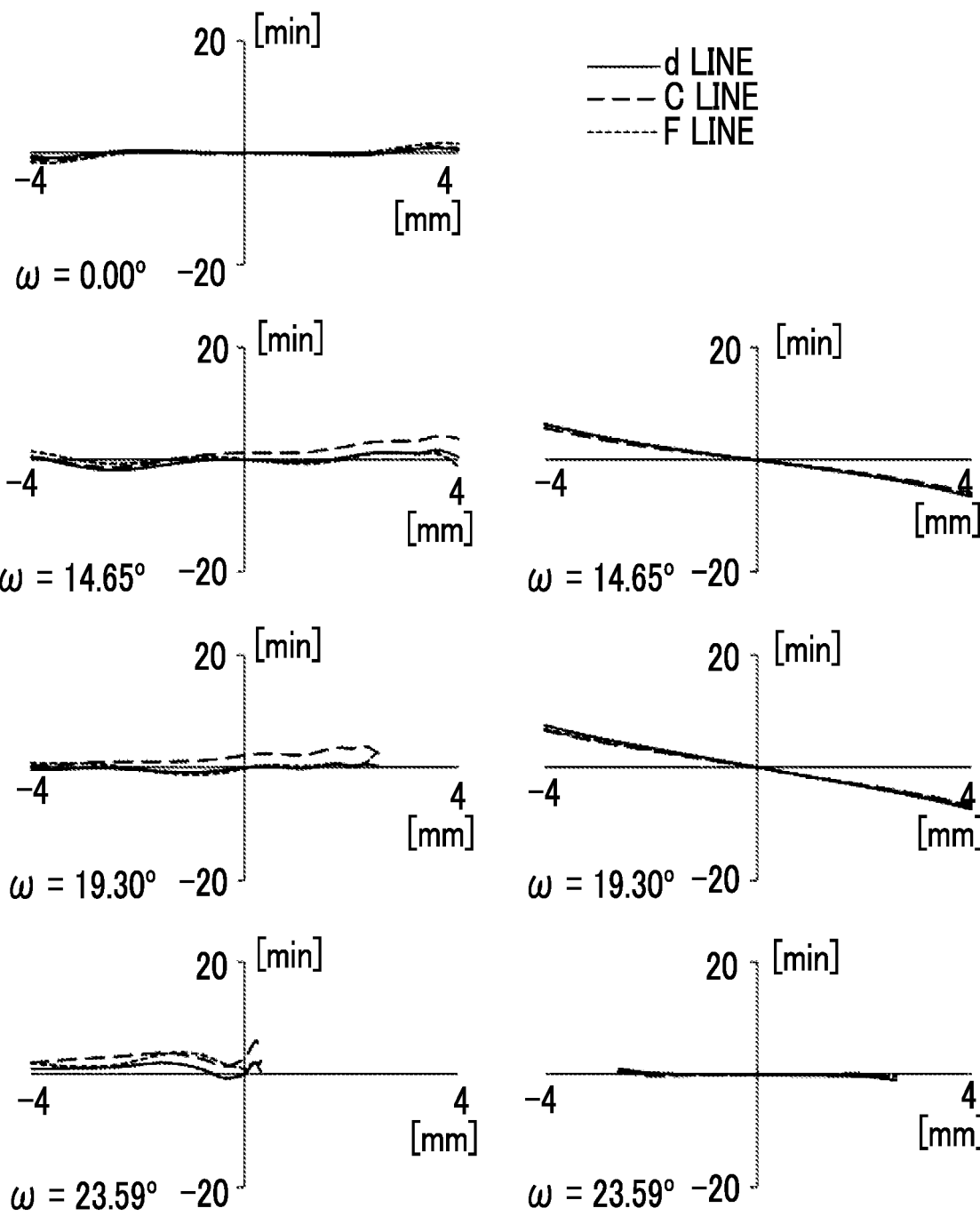
FIG. 28 is a lateral aberration diagram of the observation optical system of Example 9.

For the observation optical system 5 of Example 9, basic lens data is shown in Table 33, specifications are shown in Table 34, variable surface spacing is shown in Table 35, aspherical coefficients are shown in Table 36, and various aberration diagrams in a state where the diopter is −1.00 diopter are illustrated in FIG. 27 and FIG. 28.

TABLE 33

| | Example 9 | | | |
|---|---|---|---|---|
| Sn | R | D | Nd | νd |
| 1 | ∞ | 0.7000 | 1.51900 | 64.90 |
| 2 | ∞ | 4.0000 | | |

TABLE 33-continued

| | Example 9 | | | |
|---|---|---|---|---|
| Sn | R | D | Nd | νd |
| 3 | ∞ | 0.5000 | 1.51900 | 64.90 |
| 4 | ∞ | DD[4] | | |
| *5 | −20.9846 | 2.2970 | 1.53409 | 55.87 |
| *6 | −16.1845 | 0.1000 | | |
| *7 | 19.9173 | 5.5268 | 1.53409 | 55.87 |
| *8 | −10.5175 | 1.9308 | | |
| *9 | −12.6002 | 1.5000 | 1.63351 | 23.63 |
| *10 | 11.3632 | 1.2992 | | |
| *11 | 46.0087 | 7.3254 | 1.85218 | 41.30 |
| *12 | −15.2425 | 20.6000 | | |
| 13 (EP) | ∞ | | | |

TABLE 34

| | Example 9 | | |
|---|---|---|---|
| Diopter | −1.0 dpt | −5.5 dpt | +2.5 dpt |
| f | 18.68 | 18.68 | 18.68 |
| Apparent Field of View (°) | 47.18 | 46.07 | 48.22 |
| H | 8.20 | | |

TABLE 35

| | Example 9 | | |
|---|---|---|---|
| Diopter | −1.0 dpt | −5.5 dpt | +2.5 dpt |
| DD[4] | 3.11 | 1.45 | 4.31 |

TABLE 36

| | Example 9 | |
|---|---|---|
| Sn | 5 | 6 |
| KA | 1.0000000E+00 | −1.0000000E+00 |
| A4 | 3.9152906E−04 | 2.9966571E−04 |
| A6 | 2.2793299E−05 | 1.8722405E−05 |
| A8 | −1.6986351E−06 | −9.2694346E−07 |
| A10 | 7.0142055E−08 | 3.0973440E−08 |
| A12 | −2.0675270E−09 | −9.0818164E−10 |
| A14 | 4.2803334E−11 | 1.9316129E−11 |
| A16 | −6.1404208E−13 | −2.8131219E−13 |
| A18 | 6.0101251E−15 | 2.7772821E−15 |
| A20 | −3.8481626E−17 | −1.7884299E−17 |
| A22 | 1.4333642E−19 | 6.6644610E−20 |
| A24 | −1.8638438E−22 | −8.9306713E−23 |
| A26 | −5.2586026E−25 | −2.0563715E−25 |
| A28 | 1.5136798E−27 | 6.7418256E−28 |

TABLE 36-continued

| | Example 9 | |
|---|---|---|
| Sn | 7 | 8 |
| KA | 1.0000000E+00 | 1.0000000E+00 |
| A4 | −4.2064504E−04 | 1.2014301E−05 |
| A6 | 8.8235674E−06 | 7.6835653E−06 |
| A8 | −1.0175380E−07 | −1.2258106E−07 |
| A10 | 2.8274226E−10 | 1.0781832E−09 |
| A12 | 4.5022491E−12 | 3.5613308E−12 |
| A14 | −2.8307922E−14 | −4.0200657E−14 |
| A16 | −1.6926989E−17 | −6.1410746E−16 |
| A18 | −3.5305824E−18 | −2.4680793E−18 |
| A20 | 2.7972723E−20 | 6.8956121E−20 |

| Sn | 9 | 10 | 11 | 12 |
|---|---|---|---|---|
| KA | 1.0000000E+00 | 1.0000000E+00 | 1.0000000E+00 | −1.0000000E+00 |
| A4 | −3.5089098E−04 | −9.7873444E−04 | −1.4062470E−04 | −9.1473209E−05 |
| A6 | 3.0989914E−05 | 1.9465240E−05 | 4.8597057E−06 | 6.2910276E−06 |
| A8 | −1.2758395E−06 | −4.0724435E−07 | −3.5234933E−07 | −3.7554979E−07 |
| A10 | 3.6361725E−08 | 9.9643662E−09 | 1.5223044E−08 | 1.3395270E−08 |
| A12 | −6.4392606E−10 | −2.5256256E−10 | −3.9766618E−10 | −3.2728119E−10 |
| A14 | 3.8911647E−12 | 5.0155700E−12 | 7.2242128E−12 | 5.8403506E−12 |
| A16 | 9.8059472E−14 | −7.1063595E−14 | −9.8950141E−14 | −7.9246118E−14 |
| A18 | −2.7660317E−15 | 6.9311983E−16 | 1.0645822E−15 | 8.4419204E−16 |
| A20 | 3.2774074E−17 | −4.4523058E−18 | −9.0900227E−18 | −7.1373070E−18 |
| A22 | −2.1134628E−19 | 1.6953042E−20 | 5.9680303E−20 | 4.6420189E−20 |
| A24 | 6.9460825E−22 | −2.6271622E−23 | −2.7740170E−22 | −2.1420056E−22 |
| A26 | −6.9646121E−25 | −3.3336839E−26 | 7.9091661E−25 | 6.0907520E−25 |
| A28 | −1.1302821E−27 | 1.0964106E−28 | −1.0197744E−27 | −7.8781969E−28 |

Figure 29:
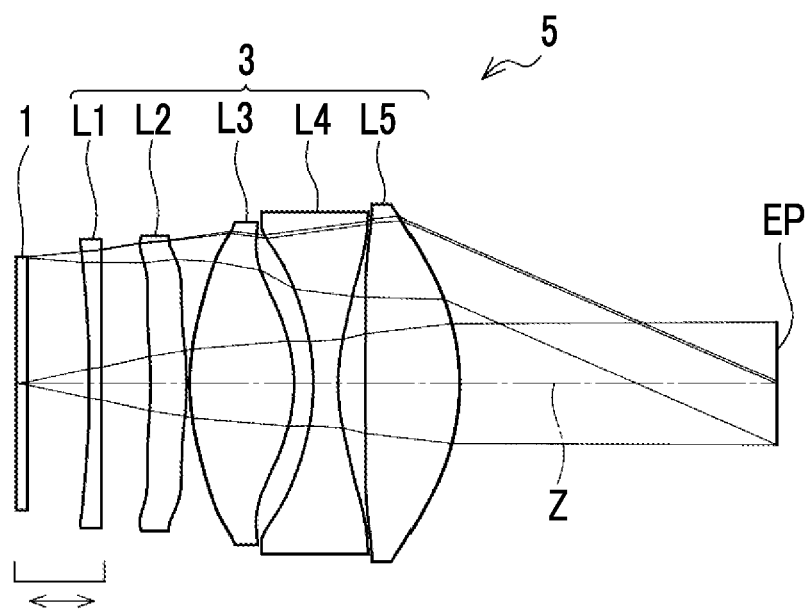
FIG. 29 is a cross-sectional view illustrating a configuration and luminous flux of an observation optical system of Example 10.

FIG. 29 illustrates a configuration and luminous flux of the observation optical system 5 of Example 10. The observation optical system 5 of Example 10 comprises the display element 1 and the eyepiece lens 3 in order from the display element side to the eyepoint side.

The eyepiece lens 3 consists of five lenses of the lens L1 to the lens L5 in order from the display element side to the eyepoint side. The lens L1 is a negative lens having a flat concave shape of which a concave surface faces toward the display element side. The lens L2 is a positive lens having a meniscus shape of which a concave surface faces toward the display element side in a paraxial region. The lens L3 is a positive lens having a biconvex shape in a paraxial region. The lens L4 is a negative lens having a biconcave shape in a paraxial region. The lens L5 is a positive lens having a biconvex shape in a paraxial region. The lens L1 is a spherical lens, and the lens L2 to the lens L5 are aspherical lenses. All of the lens L1 to the lens L5 are single lenses. In the diopter adjustment, the display element 1 and the lens L1 move as a single body along the optical axis Z, and the four lenses of the lens L2 to the lens L5 are fixed.

Figure 30:
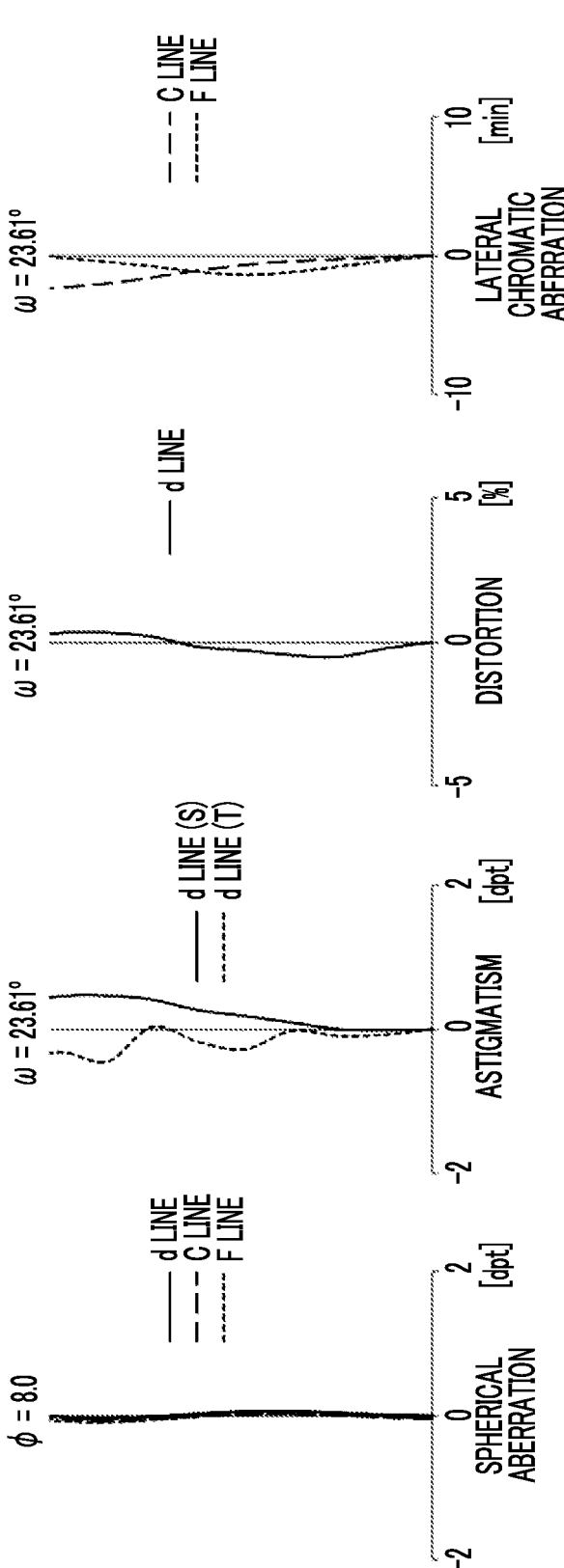
FIG. 30 is a spherical aberration diagram, an astigmatism diagram, a distortion diagram, and a lateral chromatic aberration diagram of the observation optical system of Example 10.
Figure 31:
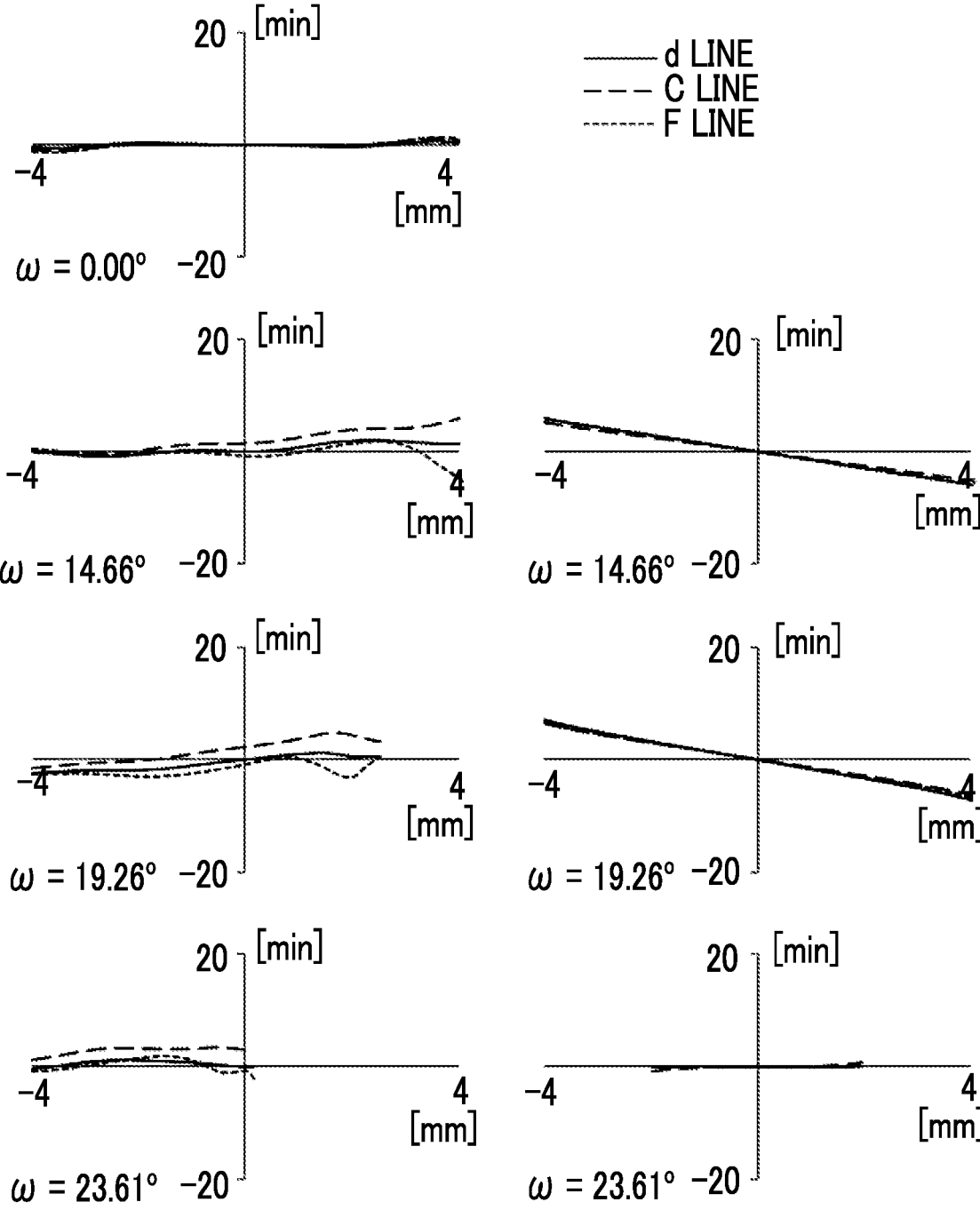
FIG. 31 is a lateral aberration diagram of the observation optical system of Example 10.

For the observation optical system 5 of Example 10, basic lens data is shown in Table 37, specifications are shown in Table 38, variable surface spacing is shown in Table 39, aspherical coefficients are shown in Table 40, and various aberration diagrams in a state where the diopter is −1.00 diopter are illustrated in FIG. 30 and FIG. 31.

TABLE 37

| | Example 10 | | | |
|---|---|---|---|---|
| Sn | R | D | Nd | vd |
| 1 | ∞ | 0.7000 | 1.51900 | 64.90 |
| 2 | ∞ | 4.0000 | | |
| 3 | −71.8625 | 0.8000 | 1.57501 | 41.50 |
| 4 | ∞ | DD[4] | | |
| *5 | −22.8027 | 2.3093 | 1.53409 | 55.87 |

TABLE 37-continued

| | Example 10 | | | |
|---|---|---|---|---|
| Sn | R | D | Nd | vd |
| *6 | −19.2969 | 0.2000 | | |
| *7 | 14.6755 | 6.7664 | 1.53409 | 55.87 |
| *8 | −10.4721 | 1.2305 | | |
| *9 | −16.6956 | 1.6000 | 1.63351 | 23.63 |
| *10 | 11.5672 | 1.7657 | | |
| *11 | 130.4934 | 6.0297 | 1.85260 | 40.53 |
| *12 | −15.6603 | 20.5000 | | |
| 13 (EP) | ∞ | | | |

TABLE 38

| | Example 10 | | |
|---|---|---|---|
| Diopter | −1.0 dpt | −5.5 dpt | +2.5 dpt |
| f | 18.69 | 18.93 | 18.52 |
| Apparent Field of View (°) | 47.21 | 46.24 | 48.06 |
| H | 8.20 | | |

TABLE 39

| | Example 10 | | |
|---|---|---|---|
| Diopter | −1.0 dpt | −5.5 dpt | +2.5 dpt |
| DD[4] | 3.17 | 1.63 | 4.29 |

TABLE 40

| | Example 10 | |
|---|---|---|
| Sn | 5 | 6 |
| KA | 1.0000000E+00 | −1.0000000E+00 |
| A4 | 4.5967599E−04 | 4.7966762E−04 |
| A6 | 2.3634357E−05 | 1.1725595E−05 |
| A8 | −1.7988581E−06 | −7.6927655E−07 |
| A10 | 7.2202619E−08 | 2.7927893E−08 |
| A12 | −2.0928469E−09 | −8.7976052E−10 |
| A14 | 4.2795986E−11 | 1.9218285E−11 |
| A16 | −6.1366296E−13 | −2.8051920E−13 |
| A18 | 6.0418700E−15 | 2.7745437E−15 |
| A20 | −3.8402266E−17 | −1.7993436E−17 |
| A22 | 1.4065183E−19 | 6.6242269E−20 |
| A24 | −2.0726109E−22 | −7.5445628E−23 |
| A26 | −4.1401703E−25 | −1.4390939E−25 |
| A28 | 2.1839665E−27 | −1.4541473E−28 |

| Sn | 7 | 8 |
|---|---|---|
| KA | 1.0000000E+00 | 1.0000000E+00 |
| A4 | −2.3860732E−04 | 9.1992305E−05 |
| A6 | −2.3844668E−08 | 6.1459442E−06 |
| A8 | 1.3655397E−08 | −1.1049745E−07 |
| A10 | 1.6040967E−10 | 1.1345057E−09 |
| A12 | −2.2832712E−12 | 4.8232902E−12 |
| A14 | −1.1179112E−14 | −2.6046422E−14 |
| A16 | 5.0292996E−16 | −7.7305609E−16 |
| A18 | −4.3860283E−18 | −4.1619611E−18 |
| A20 | 1.0143969E−20 | 7.2813610E−20 |

| Sn | 9 | 10 | 11 | 12 |
|---|---|---|---|---|
| KA | 1.0000000E+00 | 1.0000000E+00 | 1.0000000E+00 | −1.0000000E+00 |
| A4 | −4.5625971E−04 | −8.9145974E−04 | −1.7771474E−04 | −1.3480383E−04 |
| A6 | 3.2230942E−05 | 1.79293.34E−05 | 6.3596669E−06 | 6.6383269E−06 |
| A8 | −1.2980945E−06 | −3.8819636E−07 | −3.5872836E−07 | −3.6993123E−07 |
| A10 | 3.6744945E−08 | 9.9047043E−09 | 1.5208033E−08 | 1.3317503E−08 |
| A12 | −6.4522242E−10 | −2.5312890E−10 | −3.9761359E−10 | −3.2720264E−10 |
| A14 | 3.8730466E−12 | 5.0141964E−12 | 7.2238935E−12 | 5.8416279E−12 |
| A16 | 9.7937913E−14 | −7.1033242E−14 | −9.8958254E−14 | −7.9226777E−14 |
| A18 | −2.7650327E−15 | 6.9314104E−16 | 1.0646399E−15 | 8.4418198E−16 |
| A20 | 3.2780750E−17 | −4.4512644E−18 | −9.0902993E−18 | −7.1382577E−18 |
| A22 | −2.1138528E−19 | 1.6948178E−20 | 5.9682820E−20 | 4.6418091E−20 |
| A24 | 6.9461158E−22 | −2.6402647E−23 | −2.7737265E−22 | −2.1419582E−22 |
| A26 | −7.0873535E−25 | −3.3751973E−26 | 7.9096454E−25 | 6.0914517E−25 |
| A28 | −9.6682005E−28 | 1.1952309E−28 | −1.0217559E−27 | −7.8722259E−28 |

Figure 32:
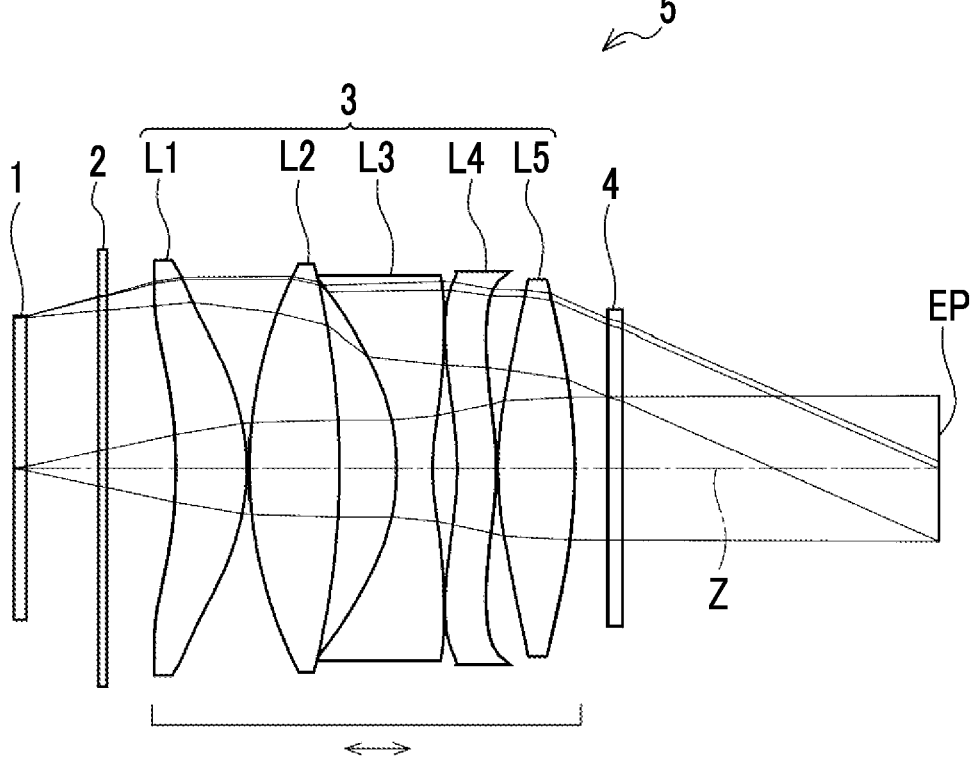
FIG. 32 is a cross-sectional view illustrating a configuration and luminous flux of an observation optical system of Example 11.

FIG. 32 illustrates a configuration and luminous flux of the observation optical system 5 of Example 11. The observation optical system 5 of Example 11 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 33:
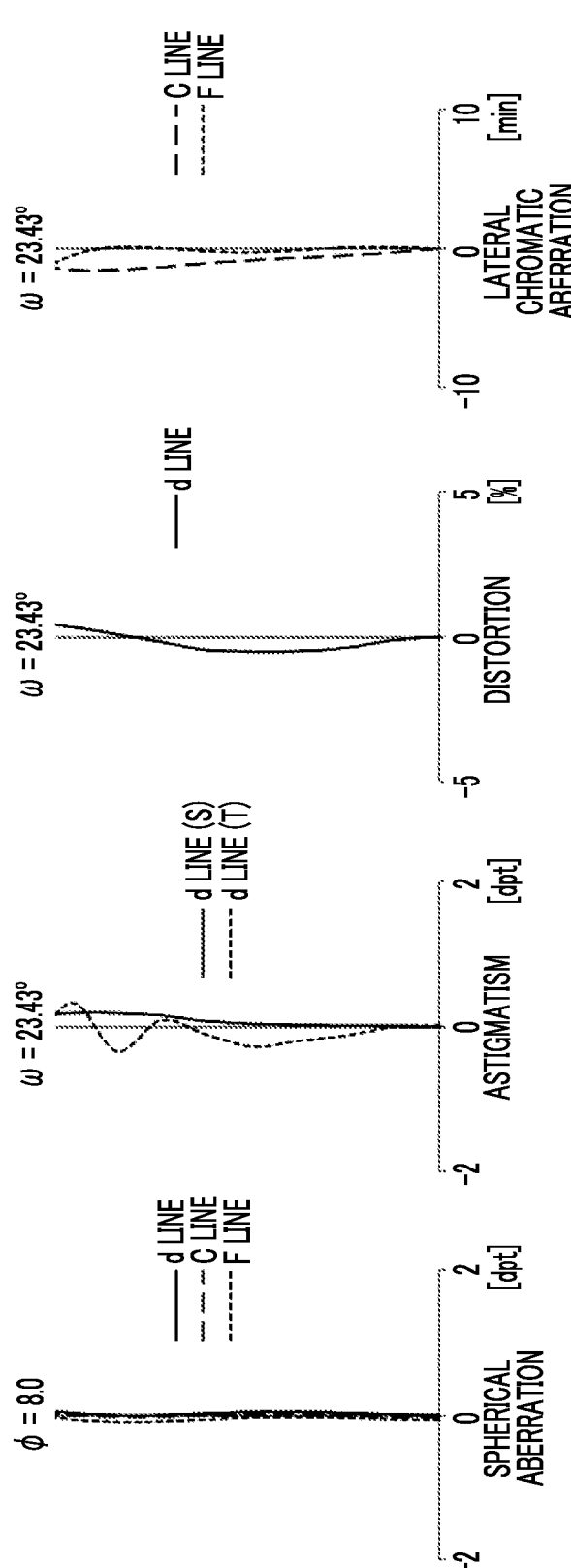
FIG. 33 is a spherical aberration diagram, an astigmatism diagram, a distortion diagram, and a lateral chromatic aberration diagram of the observation optical system of Example 11.
Figure 34:
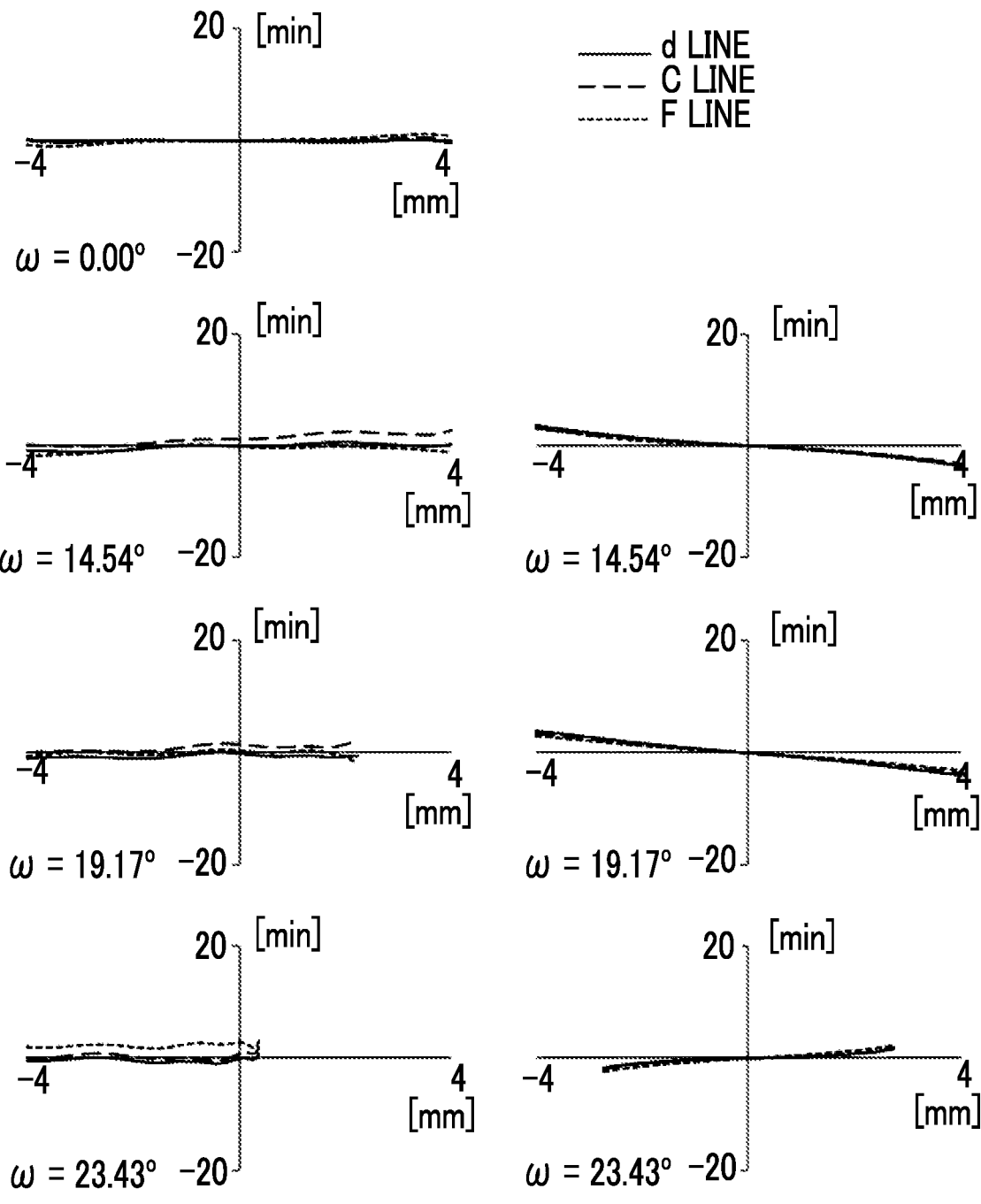
FIG. 34 is a lateral aberration diagram of the observation optical system of Example 11.

For the observation optical system 5 of Example 11, basic lens data is shown in Table 41, specifications are shown in Table 42, variable surface spacing is shown in Table 43, aspherical coefficients are shown in Table 44, and various aberration diagrams in a state where the diopter is −1.00 diopter are illustrated in FIG. 33 and FIG. 34.

TABLE 41

| | Example 11 | | | |
|---|---|---|---|---|
| Sn | R | D | Nd | vd |
| 1 | ∞ | 0.1000 | 1.51900 | 64.90 |
| 2 | ∞ | 4.0000 | | |
| 3 | ∞ | 0.5000 | 1.51900 | 64.90 |
| 4 | ∞ | DD[4] | | |
| *5 | −28.0790 | 3.9440 | 1.53500 | 55.73 |
| *6 | −12.2589 | 0.1000 | | |
| 7 | 24.3320 | 5.0240 | 1.84850 | 43.79 |
| 8 | −44.9548 | 3.1723 | | |
| *9 | −14.9026 | 2.0091 | 1.63351 | 23.63 |
| *10 | 12.0077 | 1.3742 | | |
| *11 | −16.3062 | 2.1908 | 1.53500 | 55.73 |
| *12 | −17.0568 | 0.1000 | | |
| *13 | 19.617 | 4.2733 | 1.77288 | 49.52 |
| *14 | −30.135 | DD[14] | | |

TABLE 41-continued

| Example 11 | | | | |
| --- | --- | --- | --- | --- |
| Sn | R | D | Nd | νd |
| 15 | ∞ | 0.8000 | 1.49023 | 57.5 |
| 16 | ∞ | 17.6000 | | |
| 17 (EP) | ∞ | | | |

TABLE 42

| Example 11 | | | |
| --- | --- | --- | --- |
| Diopter | −1.0 dpt | −5.5 dpt | +3.5 dpt |
| f | 18.70 | 18.70 | 18.70 |
| Apparent Field of View (°) | 46.86 | 44.42 | 48.87 |
| H | 8.20 | | |

TABLE 43

| Example 11 | | | |
| --- | --- | --- | --- |
| Diopter | −1.0 dpt | −5.5 dpt | +3.5 dpt |
| DD[4] | 3.85 | 2.12 | 5.38 |
| DD[14] | 1.85 | 3.58 | 0.32 |

TABLE 44

| Example 11 | | | | |
| --- | --- | --- | --- | --- |
| Sn | 5 | 6 | 9 | 10 |
| KA | 1.0959572E+00 | −1.8481554E+00 | 5.5702349E−01 | 1.0667382E+00 |
| A4 | −2.6913151E−04 | −2.0514487E−04 | −7.7878558E−04 | −1.3172874E−03 |
| A6 | 2.6169031E−05 | 1.1623741E−05 | 3.6572900E−05 | 2.3418640E−05 |
| A8 | −1.6370506E−06 | −6.9020413E−07 | −1.3065356E−06 | −4.1730116E−07 |
| A10 | 7.0258435E−08 | 3.0008202E−08 | 3.6684553E−08 | 9.8863507E−09 |
| A12 | −2.0750692E−09 | −9.1312676E−10 | −6.4574976E−10 | −2.5229433E−10 |
| A14 | 4.2795025E−11 | 1.9319492E−11 | 3.8873909E−12 | 5.0165088E−12 |
| A16 | −6.1388395E−13 | −2.8151426E−13 | 9.7899467E−14 | −7.1023566E−14 |
| A18 | 6.0136346E−15 | 2.7816996E−15 | −2.7638604E−15 | 6.9297426E−16 |
| A20 | −3.8464582E−17 | −1.7870295E−17 | 3.2762261E−17 | −4.4555412E−18 |
| A22 | 1.4323248E−19 | 6.6553176E−20 | −2.1161285E−19 | 1.6991312E−20 |
| A24 | −1.9461934E−22 | −8.8914065E−23 | 6.9529252E−22 | −2.6406745E−23 |
| A26 | −4.7701006E−25 | −2.3144586E−25 | −6.7505572E−25 | −3.9621821E−26 |
| A28 | 1.5516273E−27 | 7.4123034E−28 | −1.14683E−27 | 1.5735394E−28 |

| Sn | 11 | 12 | 13 | 14 |
| --- | --- | --- | --- | --- |
| KA | 1.6299897E+00 | 1.3168019E+00 | 1.2414053E+00 | −8.8935809E−01 |
| A4 | 8.8270567E−04 | 6.4906126E−04 | −9.3197202E−05 | −2.7752570E−05 |
| A6 | −3.4726501E−05 | −8.9095962E−06 | 2.1261527E−06 | 5.9198632E−06 |
| A8 | 1.5129031E−06 | 1.1230136E−07 | −3.4449897E−07 | −3.7354069E−07 |
| A10 | −4.9901263E−08 | −1.2036081E−09 | 1.5342257E−08 | 1.3443839E−08 |
| A12 | 1.2109489E−09 | 2.1579142E−11 | −3.9760364E−10 | −3.2741252E−10 |
| A14 | −2.1717480E−11 | −4.4023212E−13 | 7.2235248E−12 | 5.8385259E−12 |
| A16 | 2.9573143E−13 | 6.5750307E−15 | −9.9001353E−14 | −7.9270258E−14 |
| A18 | −3.1548311E−15 | −7.2743795E−17 | 1.0643488E−15 | 8.4426712E−16 |
| A20 | 2.6682864E−17 | 6.1719653E−19 | −9.0895757E−18 | −7.1372188E−18 |
| A22 | −1.7348069E−19 | −3.8727274E−21 | 5.9695672E−20 | 4.6426279E−20 |
| A24 | 7.9958591E−22 | 1.7044389E−23 | −2.7731423E−22 | −2.1400804E−22 |
| A26 | −2.2698429E−24 | −4.5791828E−26 | 7.9232226E−25 | 6.0760924E−25 |
| A28 | 2.9318345E−27 | 5.0992696E−29 | −1.0347039E−27 | −7.8789087E−28 |

Example 12

Figure 35:
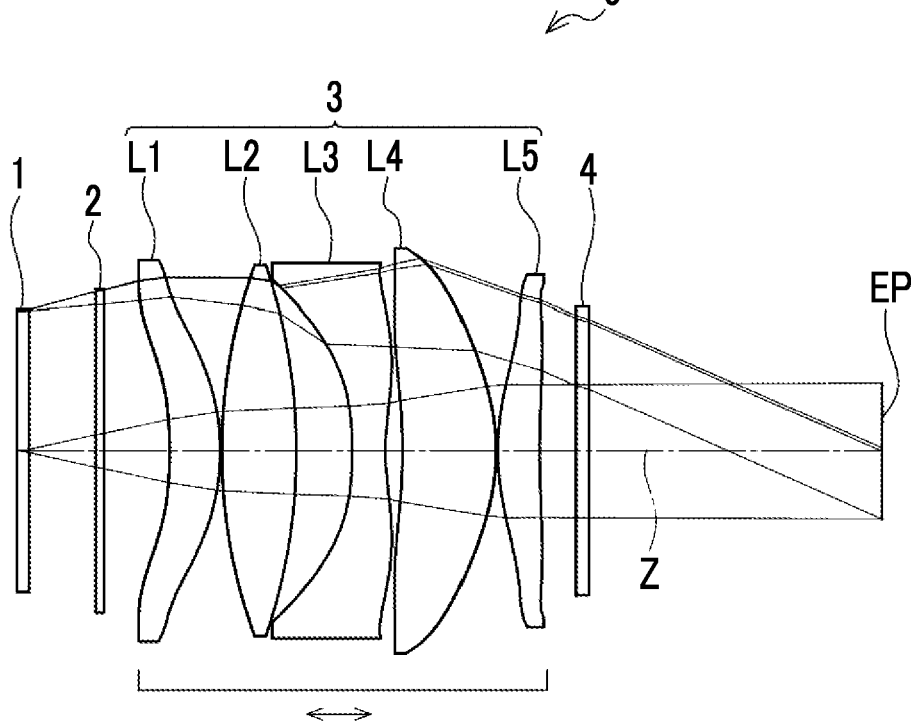
FIG. 35 is a cross-sectional view illustrating a configuration and luminous flux of an observation optical system of Example 12.

FIG. 35 illustrates a configuration and luminous flux of the observation optical system 5 of Example 12. The observation optical system 5 of Example 12 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a meniscus shape of which a convex surface faces toward the display element side in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 36:
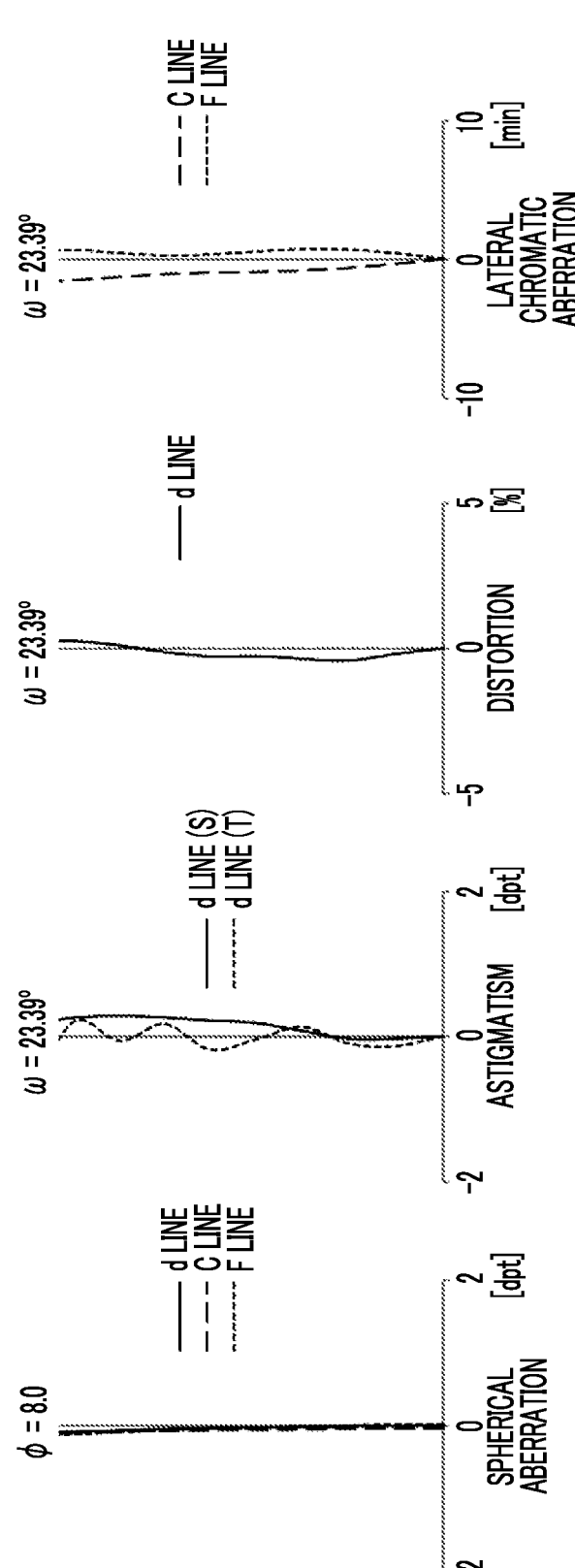
FIG. 36 is a spherical aberration diagram, an astigmatism diagram, a distortion diagram, and a lateral chromatic aberration diagram of the observation optical system of Example 12.
Figure 37:
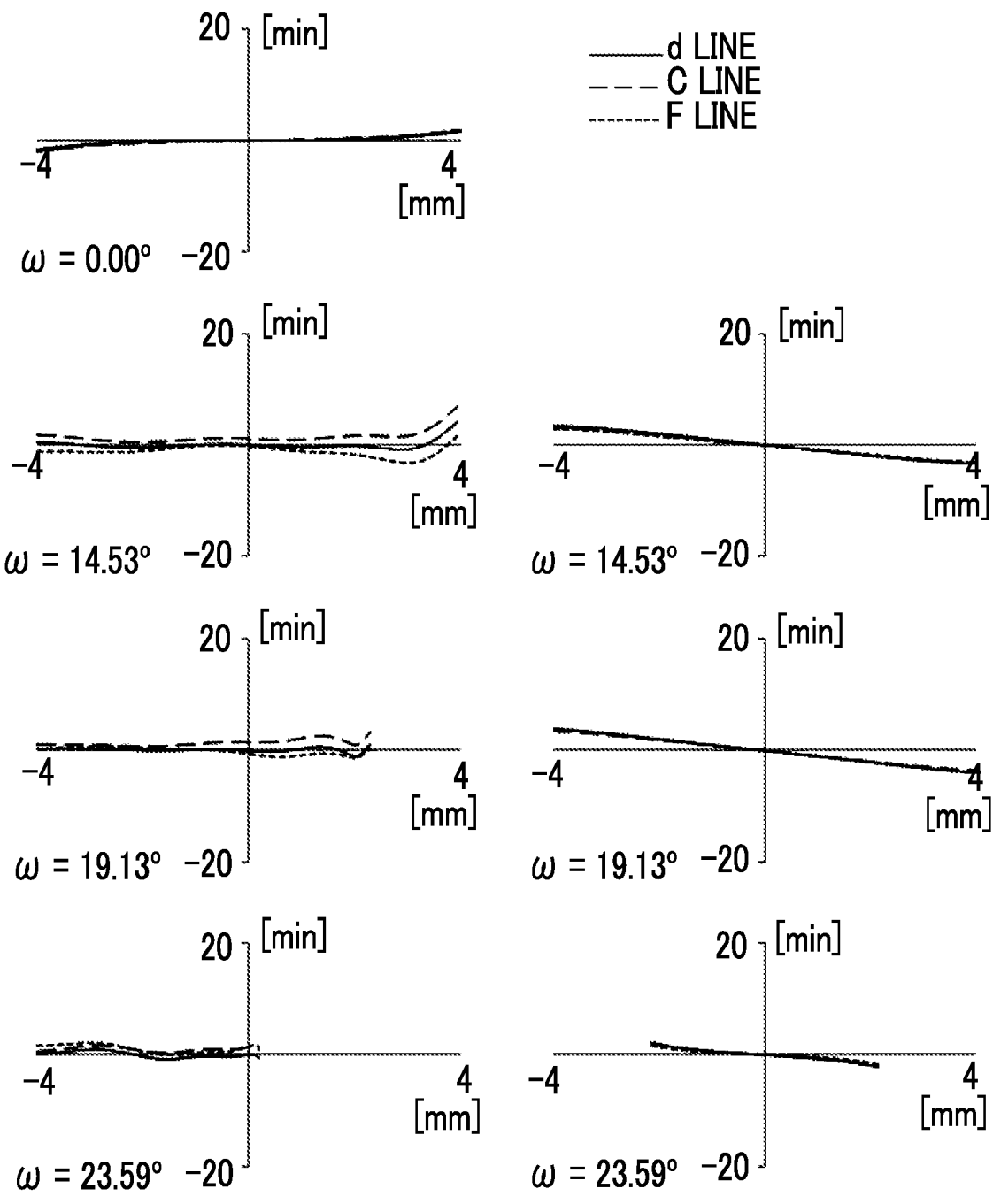
FIG. 37 is a lateral aberration diagram of the observation optical system of Example 12.

For the observation optical system 5 of Example 12, basic lens data is shown in Table 45, specifications are shown in Table 46, variable surface spacing is shown in Table 47, aspherical coefficients are shown in Table 48, and various aberration diagrams in a state where the diopter is −1.00 diopter are illustrated in FIG. 36 and FIG. 37.

TABLE 45

| | Example 12 | | | |
|---|---|---|---|---|
| Sn | R | D | Nd | νd |
| 1 | ∞ | 0.7000 | 1.51900 | 64.90 |
| 2 | ∞ | 4.0000 | | |

TABLE 45-continued

| | Example 12 | | | |
|---|---|---|---|---|
| Sn | R | D | Nd | νd |
| 3 | ∞ | 0.5000 | 1.51900 | 64.90 |
| 4 | ∞ | DD[4] | | |
| *5 | −23.6691 | 3.0000 | 1.85260 | 40.53 |
| *6 | −14.3655 | 0.1000 | | |
| 7 | 31.4029 | 4.4446 | 1.75500 | 52.33 |
| 8 | −33.7055 | 3.3254 | | |
| *9 | −26.0571 | 2.0000 | 1.63351 | 23.63 |
| *10 | 13.4311 | 1.0248 | | |
| *11 | −29.2897 | 5.5339 | 1.53500 | 55.73 |
| *12 | −12.3100 | 0.1000 | | |
| *13 | 15.8009 | 2.4937 | 1.535 | 55.73 |
| *14 | 61.7462 | DD[14] | | |
| 15 | ∞ | 0.8000 | 1.49023 | 57.5 |
| 16 | ∞ | 17.5000 | | |
| 17 (EP) | ∞ | | | |

TABLE 46

| | Example 12 | | |
|---|---|---|---|
| Diopter | −1.0 dpt | −5.5 dpt | +3.5 dpt |
| f | 18.72 | 18.72 | 18.72 |
| Apparent Field of View (°) | 46.78 | 44.37 | 48.79 |
| H | 8.20 | | |

TABLE 47

| | Example 12 | | |
|---|---|---|---|
| Diopter | −1.0 dpt | −5.5 dpt | +3.5 dpt |
| DD[4] | 3.92 | 2.19 | 5.46 |
| DD[14] | 2.14 | 3.87 | 0.60 |

TABLE 48

| | Example 12 | | | |
|---|---|---|---|---|
| Sn | 5 | 6 | 9 | 10 |
| KA | 1.0000000E+00 | 1.0000000E+00 | 5.5702349E−01 | 1.0667382E+00 |
| A4 | −3.4072466E−04 | −1.7890564E−04 | −1.1174013E−03 | −1.3457514E−03 |
| A6 | 5.0240987E−06 | 3.5826148E−06 | 3.7437671E−05 | 2.2956110E−05 |
| A8 | −7.1630639E−09 | −2.6489981E−08 | −1.3037605E−06 | −4.1307269E−07 |
| A10 | −5.5659119E−11 | 2.7683144E−10 | 3.6699412E−08 | 9.9112406E−09 |
| A12 | 1.0983346E−12 | −1.6055800E−13 | −6.4578588E−10 | −2.5218071E−10 |
| A14 | −1.2890010E−14 | −9.9105663E−15 | 3.8837051E−12 | 5.0168061E−12 |
| A16 | −1.2571798E−16 | −4.8153550E−18 | 9.7920917E−14 | −7.1024813E−14 |
| A18 | 2.3164639E−18 | 7.5977514E−20 | −2.7635278E−15 | 6.9300619E−16 |
| A20 | −8.5611747E−21 | 5.9767635E−22 | 3.2763556E−17 | −4.4554914E−18 |
| A22 | 0.0000000E+00 | 0.0000000E+00 | −2.1164233E−19 | 1.6994024E−20 |
| A24 | 0.0000000E+00 | 0.0000000E+00 | 6.9498161E−22 | −2.63847E−23 |
| A26 | 0.0000000E+00 | 0.0000000E+00 | −6.7606122E−25 | −3.9598113E−26 |
| A28 | 0.0000000E+00 | 0.0000000E+00 | −1.1175052E−27 | 1.5480341E−28 |

| | | | | |
|---|---|---|---|---|
| Sn | 11 | 12 | 13 | 14 |
| KA | 1.0000000E+00 | 1.0000000E+00 | 1.2414053E+00 | −8.8935809E−01 |
| A4 | 1.5523626E−04 | 2.1404171E−04 | −8.5641362E−05 | −1.3804681E−04 |
| A6 | 2.8743288E−07 | −2.8631703E−07 | 2.2464710E−07 | 5.4869729E−06 |
| A8 | −2.9041769E−09 | 5.1245370E−10 | −3.4386849E−07 | −3.6872841E−07 |
| A10 | −3.0769389E−11 | −8.7788126E−12 | 1.5338197E−08 | t.3434090E−08 |
| A12 | −8.1459370E−14 | 2.0931493E−14 | −3.9707577E−10 | −3.2697883E−10 |
| A14 | 2.2389153E−16 | −3.2197690E−16 | 7.2295125E−12 | 5.8363348E−12 |
| A16 | 9.4498345E−18 | 1.7779348E−18 | −9.8995570E−14 | −7.9263676E−14 |
| A18 | 3.3545340E−20 | −1.5712390E−20 | 1.0640277E−15 | 8.4427436E−16 |

TABLE 48-continued

| | Example 12 | | | |
|---|---|---|---|---|
| A20 | 2.5998752E−22 | 3.0573486E−22 | −9.0865841E−18 | −7.1461623E−18 |
| A22 | −1.0537940E−24 | 1.2868499E−24 | 5.9619039E−20 | 4.6616422E−20 |
| A24 | −1.7897795E−26 | 4.9054854E−26 | −2.7736471E−22 | −2.1387466E−22 |
| A26 | −1.0700045E−28 | −8.3763113E−28 | 8.0250806E−25 | 5.9020926E−25 |
| A28 | 6.8274628E−31 | 2.9806851E−30 | −1.0857775E−27 | −7.0535576E−28 |

Example 13

Figure 38:
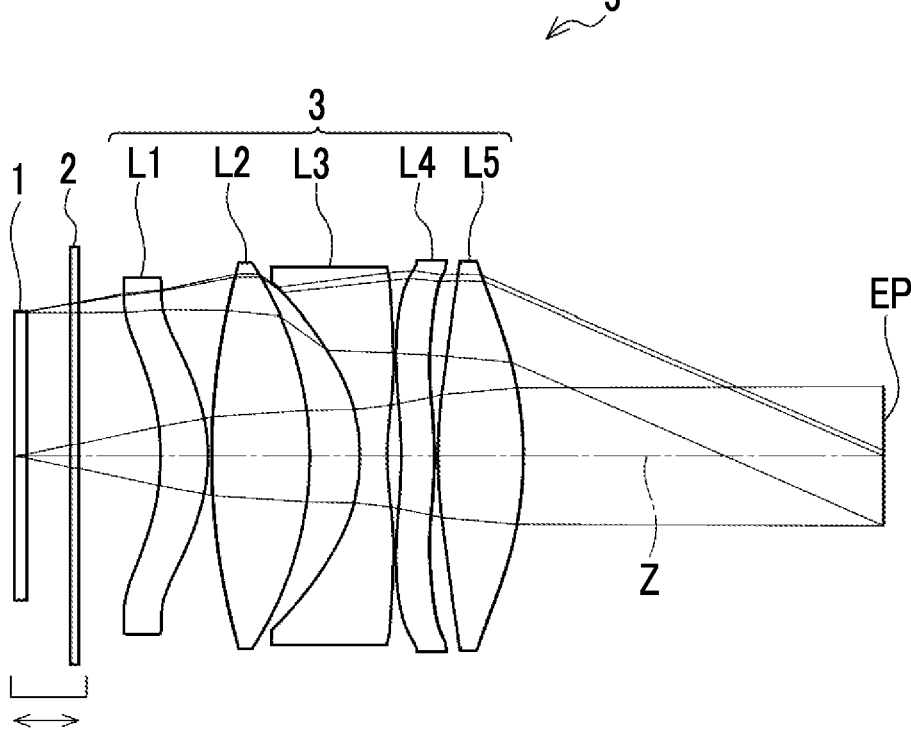
FIG. 38 is a cross-sectional view illustrating a configuration and luminous flux of an observation optical system of Example 13.

FIG. 38 illustrates a configuration and luminous flux of the observation optical system 5 of Example 13. The observation optical system 5 of Example 13 comprises the display element 1, the optical member 2, and the eyepiece lens 3 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the display element 1 and the optical member 2 move as a single body along the optical axis Z, and the five lenses of the lens L1 to the lens L5 are fixed.

Figure 39:
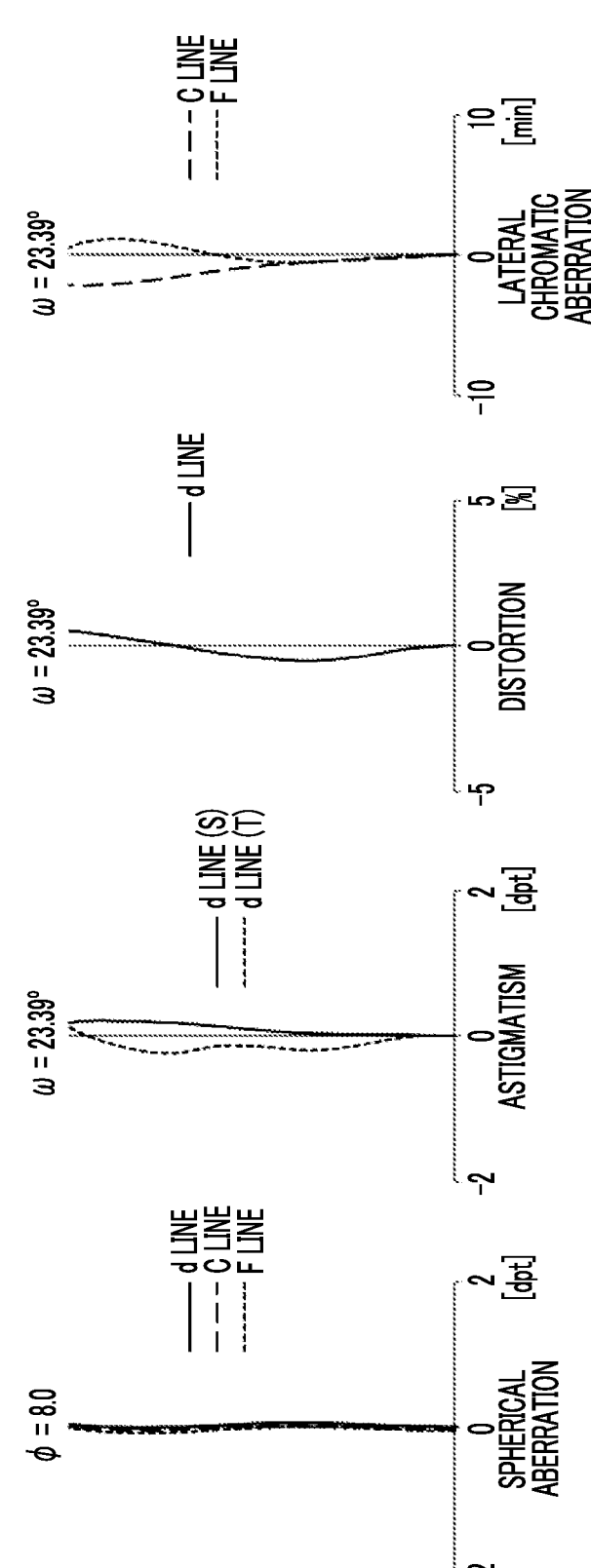
FIG. 39 is a spherical aberration diagram, an astigmatism diagram, a distortion diagram, and a lateral chromatic aberration diagram of the observation optical system of Example 13.
Figure 40:
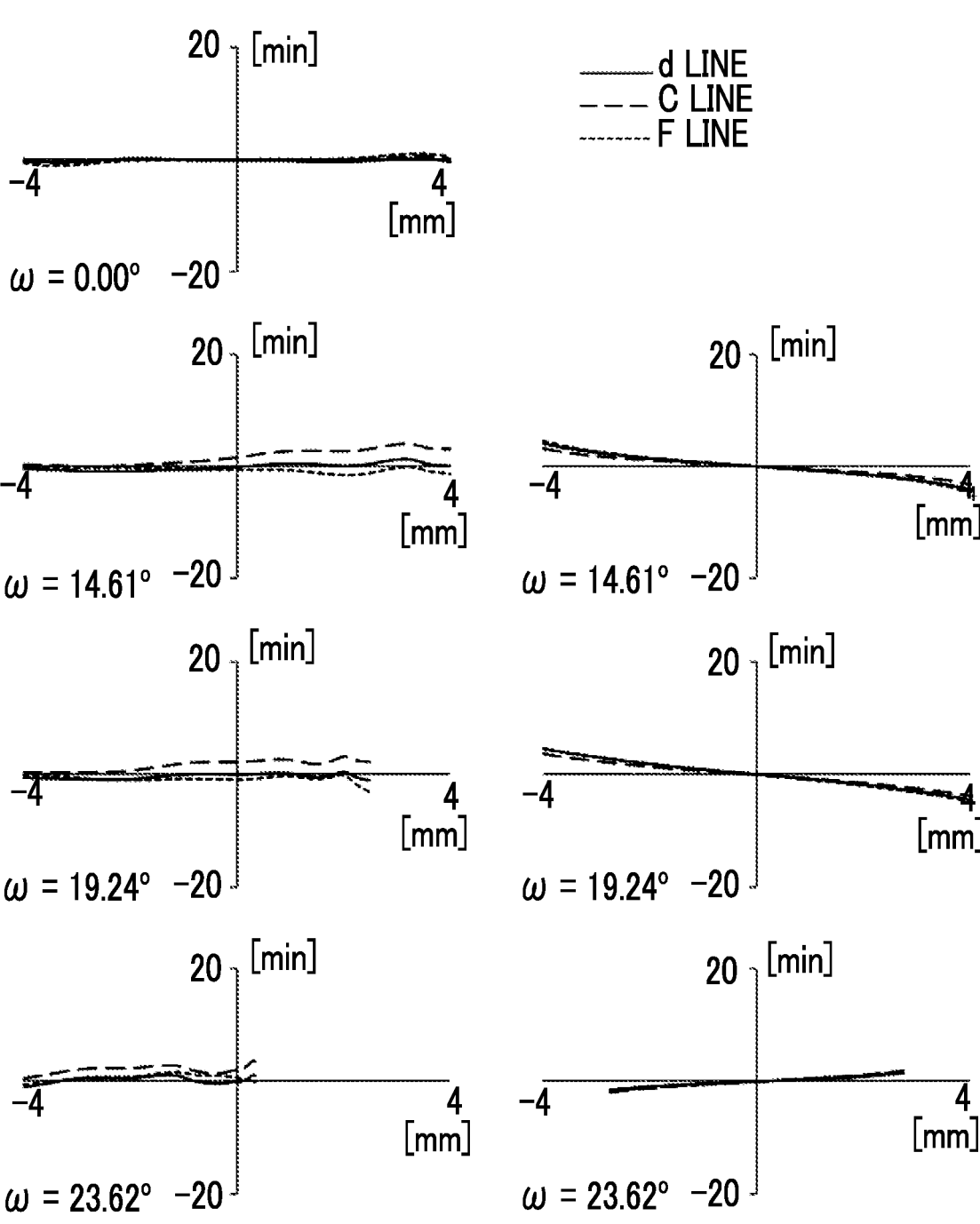
FIG. 40 is a lateral aberration diagram of the observation optical system of Example 13.

For the observation optical system 5 of Example 13, basic lens data is shown in Table 49, specifications are shown in Table 50, variable surface spacing is shown in Table 51, aspherical coefficients are shown in Table 52, and various aberration diagrams in a state where the diopter is −1.00 diopter are illustrated in FIG. 39 and FIG. 40.

TABLE 49

| | Example 13 | | | |
|---|---|---|---|---|
| Sn | R | D | Nd | vd |
| 1 | ∞ | 0.7000 | 1.51900 | 64.90 |
| 2 | ∞ | 2.5000 | | |

TABLE 49-continued

| | Example 13 | | | |
|---|---|---|---|---|
| Sn | R | D | Nd | vd |
| 3 | ∞ | 0.5000 | 1.51900 | 64.90 |
| 4 | ∞ | DD[4] | | |
| *5 | −15.1907 | 2.7391 | 1.53409 | 55.87 |
| *6 | −10.5263 | 0.2000 | | |
| 7 | 40.2704 | 5.6032 | 1.77250 | 49.62 |
| 8 | −20.3020 | 2.8608 | | |
| *9 | −12.2538 | 1.5765 | 1.63351 | 23.63 |
| *10 | 15.1453 | 0.8000 | | |
| *11 | −21.1122 | 1.9000 | 1.53409 | 55.87 |
| *12 | −20.0953 | 0.2000 | | |
| *13 | 27.9473 | 4.8428 | 1.80225 | 45.45 |
| *14 | −20.3834 | 20.6000 | | |
| 15 (EP) | ∞ | | | |

TABLE 50

| | Example 13 | | |
|---|---|---|---|
| Diopter | −1.0 dpt | −5.5 dpt | +2.5 dpt |
| f | 18.70 | 18.70 | 18.70 |
| Apparent Field of View (°) | 47.24 | 46.20 | 48.25 |
| H | 8.20 | | |

TABLE 51

| | Example 13 | | |
|---|---|---|---|
| Diopter | −1.0 dpt | −5.5 dpt | +2.5 dpt |
| DD[4] | 4.66 | 3.01 | 5.87 |

TABLE 52

| | Example 13 | | | |
|---|---|---|---|---|
| Sn | 5 | 6 | 9 | 10 |
| KA | 1.0000000E+00 | −1.0000000E+00 | 1.0000000E+00 | 1.0000000E+00 |
| A4 | −4.2573290E−04 | −2.1375242E−04 | −7.2524322E−04 | −1.2301184E−03 |
| A6 | 3.3449752E−05 | 1.4738895E−05 | 3.5721381E−05 | 2.3582875E−05 |
| A8 | −1.7201936E−06 | −7.1962465E−07 | −1.2939642E−06 | −4.1878896E−07 |
| A10 | 7.0234900E−08 | 3.0067292E−08 | 3.6651422E−08 | 9.9443048E−09 |
| A12 | −2.0682274E−09 | −9.1201861E−10 | −6.4554947E−10 | −2.5248792E−10 |
| A14 | 4.2797607E−11 | 1.9338234E−11 | 3.8915413E−12 | 5.0157147E−12 |
| A16 | −6.1384936E−13 | −2.8165550E−13 | 9.7800623E−14 | −7.1041872E−14 |
| A18 | 6.0103539E−15 | 2.7795553E−15 | −2.7642329E−15 | 6.9327805E−16 |
| A20 | −3.8534938E−17 | −1.7873685E−17 | 3.2769138E−17 | −4.4547747E−18 |
| A22 | 1.4337661E−19 | 6.6731398E−20 | −2.1158847E−19 | 1.6999745E−20 |
| A24 | −1.8812362E−22 | −8.7854872E−23 | 6.9531749E−22 | −2.6552298E−23 |
| A26 | −4.1806970E−25 | −2.3526639E−25 | −6.7514835E−25 | −3.9934672E−26 |
| A28 | 8.3723822E−28 | 6.6380427E−28 | −1.1649529E−27 | 1.5954789E−28 |

TABLE 52-continued

| | Example 13 | | | |
|---|---|---|---|---|
| Sn | 11 | 12 | 13 | 14 |
| KA | 1.0000000E+00 | 1.0000000E+00 | 1.0000000E+00 | −1.0000000E+00 |
| A4 | 9.1168942E−04 | 7.6707855E−04 | −8.9157657E−05 | −7.1406895E−05 |
| A6 | −3.5321453E−05 | −1.0257358E−05 | 3.1633648E−06 | 6.8827411E−06 |
| A8 | 1.5063283E−06 | 1.0228123E−07 | −3.4783000E−07 | −3.8041609E−07 |
| A10 | −4.9899927E−08 | −1.1324251E−09 | 1.5259332E−08 | 1.3419025E−08 |
| A12 | 1.2110822E−09 | 2.2162788E−11 | −3.9766540E−10 | −3.2735487E−10 |
| A14 | −2.1715256E−11 | −4.4306497E−13 | 7.2277028E−12 | 5.8403946E−12 |
| A16 | 2.9573606E−13 | 6.5648130E−15 | −9.8968005E−14 | −7.9253512E−14 |
| A18 | −3.1548531E−15 | −7.2904389E−17 | 1.0645201E−15 | 8.4426961E−16 |
| A20 | 2.6682837E−17 | 6.1604097E−19 | −9.0911009E−18 | −7.1364640E−18 |
| A22 | −1.7348367E−19 | −3.8570759E−21 | 5.9671932E−20 | 4.6423724E−20 |
| A24 | 7.9961612E−22 | 1.7269049E−23 | −2.7737837E−22 | −2.1427427E−22 |
| A26 | −2.2701752E−24 | −4.6988607E−26 | 7.9197702E−25 | 6.0764403E−25 |
| A28 | 2.9302829E−27 | 4.3250451E−29 | −1.0230771E−27 | −7.7689030E−28 |

Example 14

Figure 41:
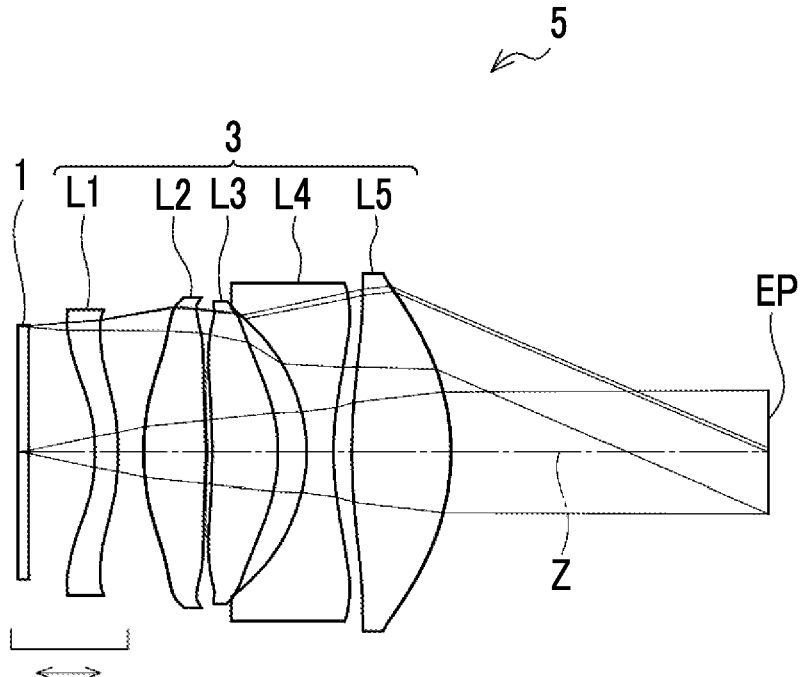
FIG. 41 is a cross-sectional view illustrating a configuration and luminous flux of an observation optical system of Example 14.

FIG. 41 illustrates a configuration and luminous flux of the observation optical system 5 of Example 14. The observation optical system 5 of Example 14 comprises the display element 1 and the eyepiece lens 3 in order from the display element side to the eyepoint side.

The eyepiece lens 3 consists of five lenses of the lens L1 to the lens L5 in order from the display element side to the eyepoint side. The lens L1 is a negative lens having a meniscus shape of which a concave surface faces toward the display element side in a paraxial region. The lens L2 is a positive lens having a biconvex shape in a paraxial region. The lens L3 is a positive lens having a meniscus shape of which a concave surface faces toward the display element side in a paraxial region. The lens L4 is a negative lens having a biconcave shape in a paraxial region. The lens L5 is a positive lens having a biconvex shape in a paraxial region. All of the lens L1 to the lens L5 are aspherical lenses. All of the lens L1 to the lens L5 are single lenses. In the diopter adjustment, the display element 1 and the lens L1 move as a single body along the optical axis Z, and the four lenses of the lens L2 to the lens L5 are fixed.

Figure 42:
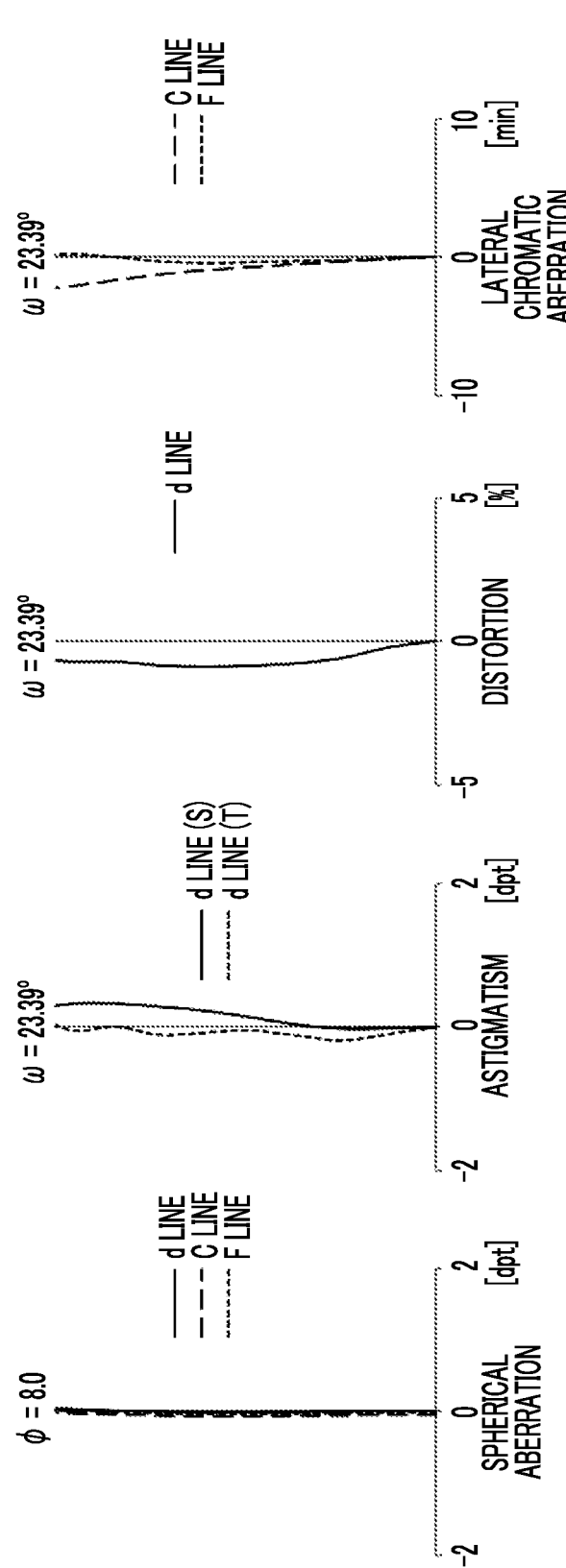
FIG. 42 is a spherical aberration diagram, an astigmatism diagram, a distortion diagram, and a lateral chromatic aberration diagram of the observation optical system of Example 14.
Figure 43:
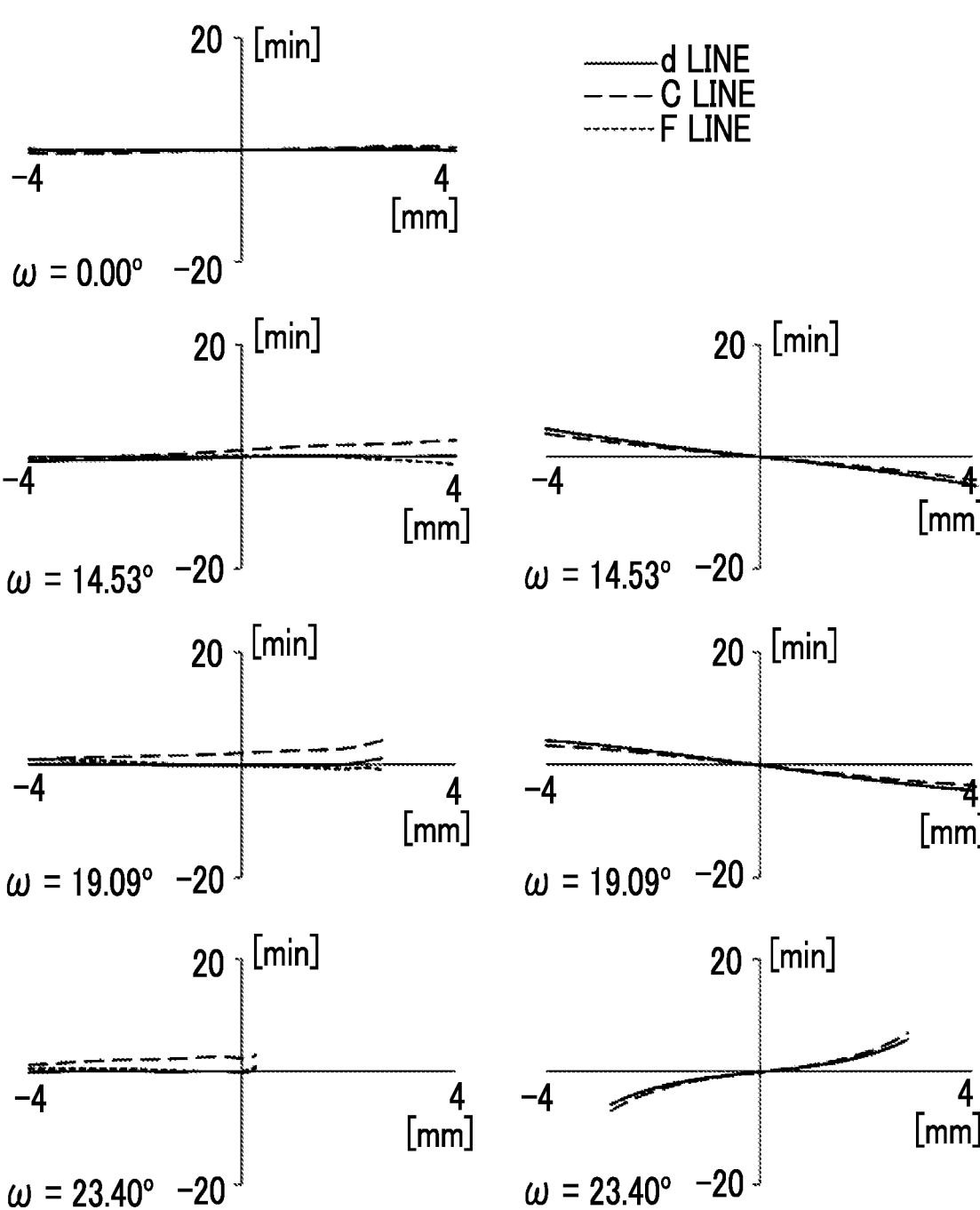
FIG. 43 is a lateral aberration diagram of the observation optical system of Example 14.

For the observation optical system 5 of Example 14, basic lens data is shown in Table 53, specifications are shown in Table 54, variable surface spacing is shown in Table 55, aspherical coefficients are shown in Table 56, and various aberration diagrams in a state where the diopter is −1.00 diopter are illustrated in FIG. 42 and FIG. 43.

TABLE 53

| | Example 14 | | | |
|---|---|---|---|---|
| Sn | R | D | Nd | vd |
| 1 | ∞ | 0.7000 | 1.51900 | 64.90 |
| 2 | ∞ | 4.3052 | | |

TABLE 53-continued

| | Example 14 | | | |
|---|---|---|---|---|
| Sn | R | D | Nd | vd |
| *3 | −15.1678 | 1.5000 | 1.63351 | 23.63 |
| *4 | −20.3315 | DD[4] | | |
| *5 | 18.3957 | 4.0000 | 1.53409 | 55.87 |
| *6 | −33.8979 | 0.3499 | | |
| *7 | −56.3353 | 4.2849 | 1.53409 | 55.87 |
| *8 | −10.9804 | 1.8507 | | |
| *9 | −10.1336 | 1.7302 | 1.63351 | 23.63 |
| *10 | 19.8451 | 1.2000 | | |
| *11 | 42.4395 | 6.4169 | 1.85260 | 40.53 |
| *12 | −15.2977 | 20.5000 | | |
| 13 (EP) | ∞ | | | |

TABLE 54

| | Example 14 | | |
|---|---|---|---|
| Diopter | −1.0 dpt | −5.5 dpt | +3.5 dpt |
| f | 18.68 | 18.97 | 18.42 |
| Apparent Field of View (°) | 46.81 | 45.74 | 48.05 |
| H | 8.20 | | |

TABLE 55

| | Example 14 | | |
|---|---|---|---|
| Diopter | −1.0 dpt | −5.5 dpt | +3.5 dpt |
| DD[4] | 1.66 | 0.07 | 3.14 |

TABLE 56

| | Example 14 | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −1.4960407E−03 | −1.0129181E−03 | 3.0360836E−04 | 5.7071720E−04 |
| A6 | 6.9730391E−05 | 4.5110627E−05 | −7.0126134E−06 | −8.2141982E−06 |
| A8 | −1.0133519E−06 | −5.7709908E−07 | 4.8629289E−09 | 1.1588656E−08 |
| A10 | 2.4818293E−09 | 4.0205725E−11 | 3.6872972E−11 | 1.4912236E−11 |
| A12 | 4.2433858E−11 | 5.0112383E−11 | 3.0769330E−12 | 4.2511654E−12 |

TABLE 56-continued

| | | Example 14 | | |
|---|---|---|---|---|
| A14 | 3.3408549E−13 | −2.2708418E−14 | 3.2946374E−14 | −1.2270096E−14 |
| A16 | −2.3569396E−15 | −3.8290298E−15 | −4.2297944E−16 | −2.7277844E−16 |
| A18 | −1.1927778E−16 | −1.9966442E−18 | −1.4139151E−18 | 1.5089909E−18 |
| A20 | 9.5188844E−19 | 1.7911092E−19 | 1.9041859E−20 | 5.3370071E−21 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −9.0808499E−05 | 1.2460449E−04 | 2.1287260E−04 | −1.6148920E−04 |
| A6 | 4.5007462E−06 | 2.5824892E−06 | −1.2002093E−06 | −3.8283517E−08 |
| A8 | 3.7531207E−09 | 1.6845969E−08 | −1.1950357E−08 | −1.1116606E−09 |
| A10 | −3.2362359E−10 | −2.7971988E−10 | 1.7943108E−10 | 4.9940297E−12 |
| A12 | −1.7808198E−12 | 1.1703546E−12 | 1.2423216E−12 | 1.5167960E−13 |
| A14 | −2.3908163E−15 | 2.6303899E−15 | −5.8192058E−15 | −2.8133437E−15 |
| A16 | 7.2841143E−16 | −2.8866974E−16 | −6.2759263E−17 | 4.5062077E−18 |
| A18 | −4.0461670E−18 | 2.9947338E−20 | −5.8667655E−19 | 1.0780053E−19 |
| A20 | −1.3034482E−20 | 1.7012021E−20 | 1.5778863E−20 | −4.0543587E−22 |

| Sn | 11 | 12 |
|---|---|---|
| KA | 1.0000000E+00 | 1.0000000E+00 |
| A4 | −2.0616956E−05 | 2.8307486E−05 |
| A6 | −4.2370852E−07 | −1.2070765E−07 |
| A8 | 1.0682514E−09 | 2.0727226E−09 |
| A10 | 1.0075663E−11 | −2.2985210E−12 |
| A12 | 1.9114282E−14 | 1.3416898E−14 |
| A14 | −2.1313037E−15 | 3.1704907E−16 |
| A16 | 5.2044026E−18 | −6.7660596E−18 |
| A18 | 1.0329661E−19 | 2.3975413E−20 |
| A20 | −3.7149565E−22 | 1.0683390E−22 |

Figure 44:
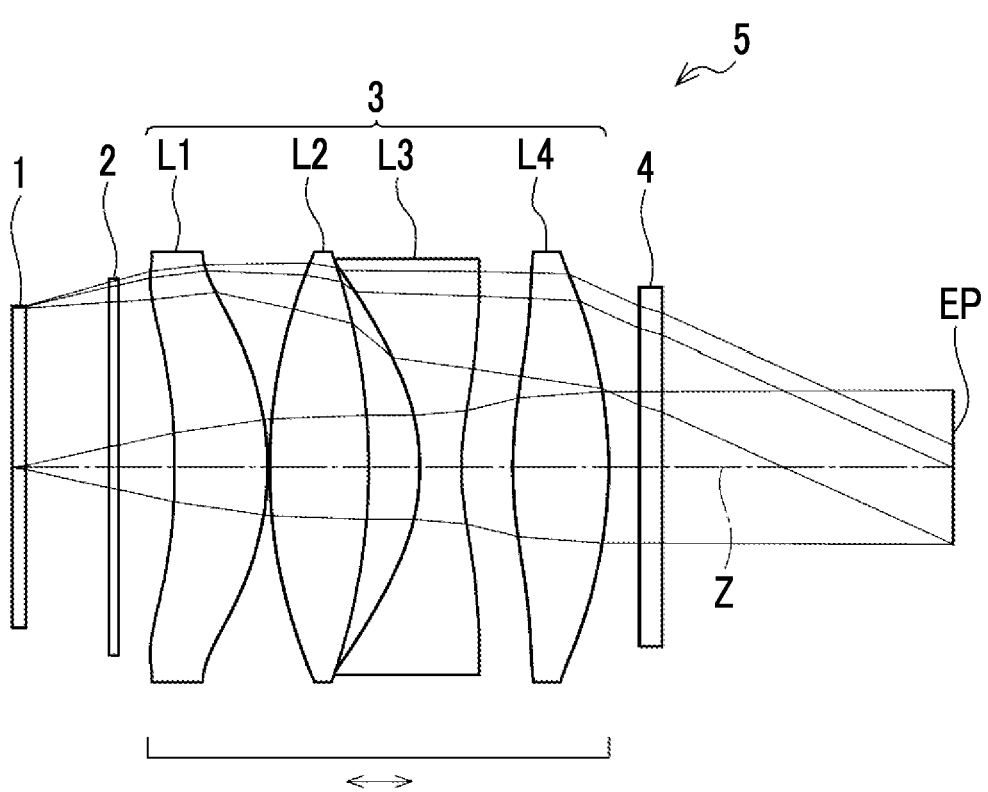
FIG. 44 is a cross-sectional view illustrating a configuration and luminous flux of an observation optical system of Example 15.

FIG. 44 illustrates a configuration and luminous flux of the observation optical system 5 of Example 15. The observation optical system 5 of Example 15 comprises the display element 1, the optical member 2, the eyepiece lens 3, and the optical member 4 in order from the display element side to the eyepoint side.

The eyepiece lens 3 consists of four lenses of the lens L1 to the lens L4 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a biconvex shape in a paraxial region. The lens L2 is a spherical lens, and the lens L1, the lens L3, and the lens L4 are aspherical lenses. All of the lens L1 to the lens L4 are single lenses. In the diopter adjustment, the four lenses of the lens L1 to the lens L4 move as a single body along the optical axis Z, and the display element 1, the optical member 2, and the optical member 4 are fixed.

Figure 45:
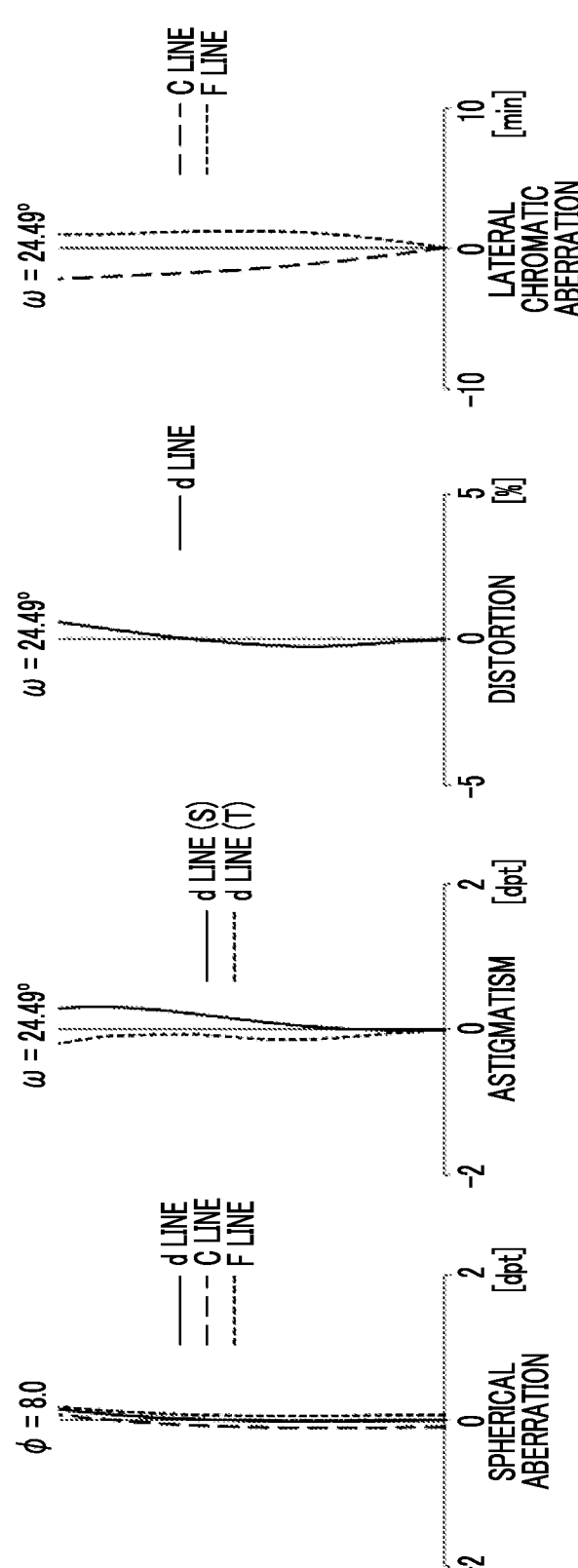
FIG. 45 is a spherical aberration diagram, an astigmatism diagram, a distortion diagram, and a lateral chromatic aberration diagram of the observation optical system of Example 15.
Figure 46:
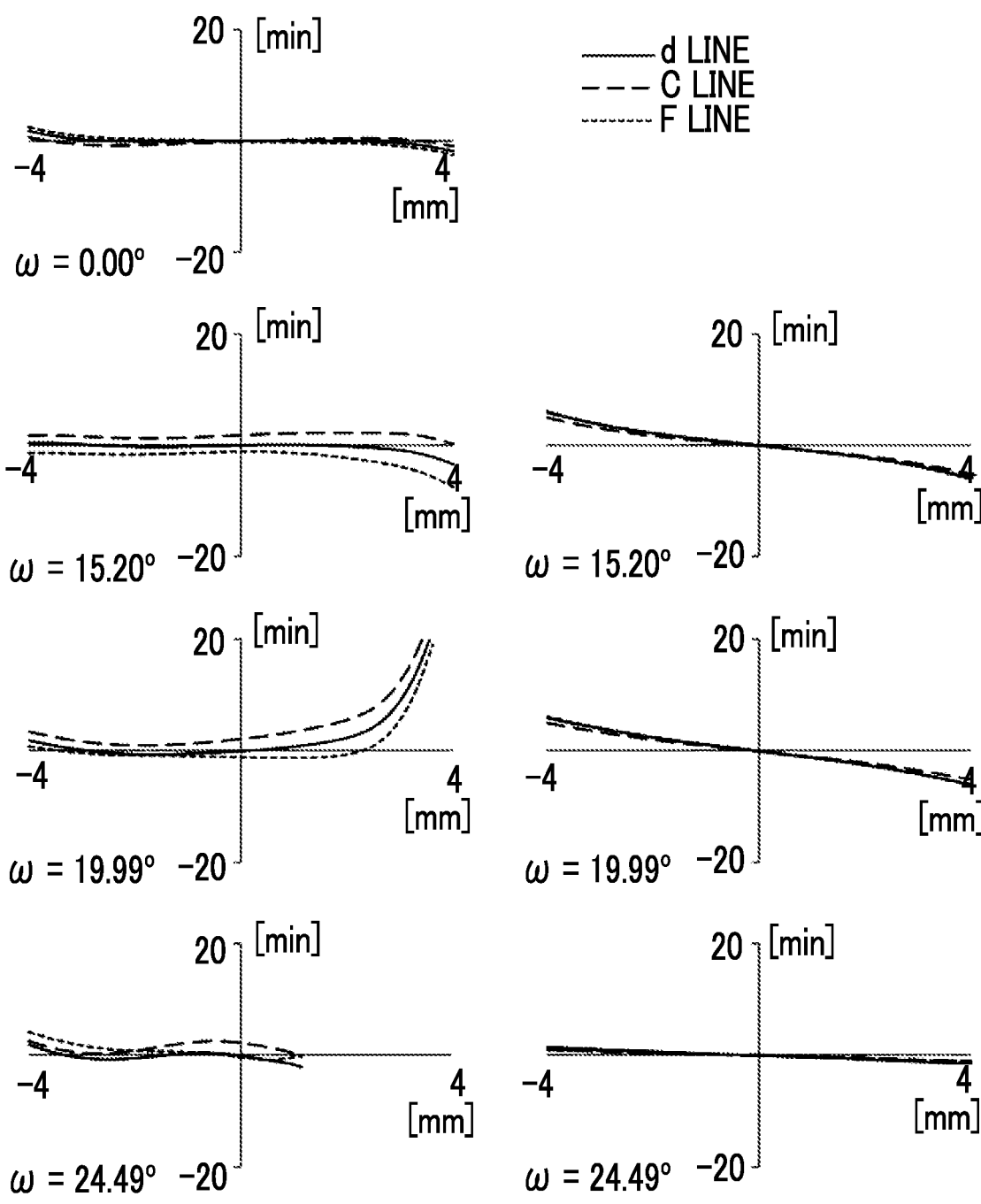
FIG. 46 is a lateral aberration diagram of the observation optical system of Example 15.

For the observation optical system 5 of Example 15, basic lens data is shown in Table 57, specifications are shown in Table 58, variable surface spacing is shown in Table 59, aspherical coefficients are shown in Table 60, and various aberration diagrams in a state where the diopter is −1.00 diopter are illustrated in FIG. 45 and FIG. 46.

TABLE 57

| | | Example 15 | | |
|---|---|---|---|---|
| Sn | R | D | Nd | νd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |

TABLE 57-continued

| | | Example 15 | | |
|---|---|---|---|---|
| Sn | R | D | Nd | νd |
| *5 | −35.7912 | 4.8067 | 1.80625 | 40.91 |
| *6 | −15.0355 | 0.1000 | | |
| 7 | 27.9646 | 5.1000 | 1.75500 | 52.32 |
| 8 | −33.4635 | 2.6343 | | |
| *9 | −12.9881 | 2.1464 | 1.63351 | 23.63 |
| *10 | 13.1500 | 2.6025 | | |
| *11 | 23.9072 | 4.9532 | 1.80625 | 40.91 |
| *12 | −21.8285 | DD[12] | | |
| 13 | ∞ | 1.2000 | 1.49023 | 57.5 |
| 14 | ∞ | 15.0000 | | |
| 15 (EP) | ∞ | | | |

TABLE 58

| | Example 15 | | |
|---|---|---|---|
| Diopter | −1.0 dpt | −4.5 dpt | +2.5 dpt |
| f | 17.96 | 17.96 | 17.96 |
| Apparent Field of View (°) | 48.97 | 47.35 | 50.23 |
| H | 8.20 | | |

TABLE 59

| | Example 15 | | |
|---|---|---|---|
| Diopter | −1.0 dpt | −4.5 dpt | +2.5 dpt |
| DD[4] | 2.88 | 1.67 | 3.99 |
| DD[12] | 1.57 | 2.77 | 0.45 |

TABLE 60

| | Example 15 | | | |
| --- | --- | --- | --- | --- |
| Sn | 5 | 6 | 9 | 10 |
| KA | 5.2803955E−01 | −3.0000000E+00 | 5.0339865E−01 | 5.3608167E−01 |
| A3 | 0.0000000E+00 | 0.0000000E+00 | 0.0000000E+00 | 0.0000000E+00 |
| A4 | −1.6811480E−04 | −2.0514246E−04 | −7.4912713E−04 | −8.0433817E−04 |
| A5 | 2.1369808E−05 | 2.8289505E−05 | 1.4351676E−04 | −3.6379366E−05 |
| A6 | 5.9543681E−06 | −1.9385423E−06 | −3.9474328E−06 | 2.2165753E−05 |
| A7 | −2.0614039E−06 | −1.0966448E−07 | −2.3896808E−07 | −1.2318010E−06 |
| A8 | 1.3816922E−07 | 1.6859699E−08 | −2.3594767E−08 | 5.1096548E−09 |
| A9 | 1.2658636E−08 | −1.9858275E−10 | −1.5196285E−09 | −2.2728912E−08 |
| A10 | −1.7637992E−09 | 9.2470587E−11 | 4.5070255E−10 | 3.8412771E−09 |
| A11 | 9.5042131E−11 | −3.5831570E−12 | 1.9077953E−11 | −2.2272364E−10 |
| A12 | −8.1111052E−12 | −1.5736356E−12 | −4.1915725E−12 | 6.2380386E−12 |
| A13 | 4.1557390E−13 | 2.9040583E−13 | 1.3422079E−13 | −4.2454615E−13 |
| A14 | 1.4799155E−14 | −2.5382359E−14 | 1.4694878E−15 | 4.5487230E−14 |
| A15 | −1.9989493E−15 | 1.1160583E−15 | −1.4693441E−16 | −2.3457772E−15 |
| A16 | 4.9020179E−17 | −1.9652214E−17 | 2.8153947E−18 | 4.7065269E−17 |

| Sn | 11 | 12 |
| --- | --- | --- |
| KA | 1.6494371E+00 | −1.3364925E+00 |
| A3 | 0.0000000E+00 | 0.0000000E+00 |
| A4 | 1.8136071E−04 | 1.6498201E−04 |
| A5 | −7.0096986E−05 | −2.6064461E−05 |
| A6 | 8.3148004E−08 | 1.8037957E−06 |
| A7 | 9.1927413E−07 | −2.6023687E−07 |
| A8 | −3.7028333E−08 | 1.8325921E−08 |
| A9 | −7.5583843E−09 | −1.5819127E−10 |
| A10 | 8.4537102E−10 | 1.9796308E−10 |
| A11 | −2.5201022E−11 | −3.3645796E−11 |
| A12 | −6.2251250E−13 | 2.6455221E−12 |
| A13 | 1.9685431E−13 | −2.2591661E−13 |
| A14 | −2.5732258E−14 | 1.8331396E−14 |
| A15 | 1.4656907E−15 | −8.3519138E−16 |
| A16 | −2.9772214E−17 | 1.5181844E−17 |

Example 16

Figure 47:
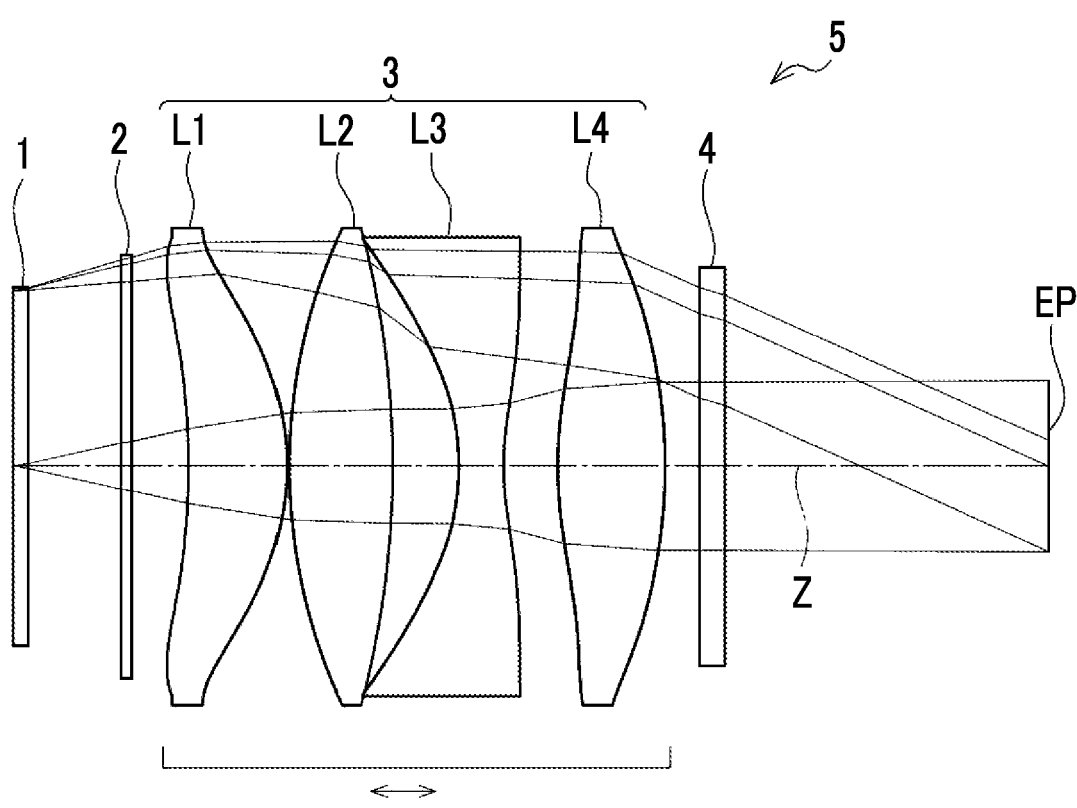
FIG. 47 is a cross-sectional view illustrating a configuration and luminous flux of an observation optical system of Example 16.

FIG. 47 illustrates a configuration and luminous flux of the observation optical system 5 of Example 16. The observation optical system 5 of Example 16 comprises the display element 1, the optical member 2, the eyepiece lens 3, and the optical member 4 in order from the display element side to the eyepoint side.

The eyepiece lens 3 consists of four lenses of the lens L1 to the lens L4 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a biconvex shape in a paraxial region. The lens L2 is a spherical lens, and the lens L1, the lens L3, and the lens L4 are aspherical lenses. All of the lens L1 to the lens L4 are single lenses. In the diopter adjustment, the four lenses of the lens L1 to the lens L4 move as a single body along the optical axis Z, and the display element 1, the optical member 2, and the optical member 4 are fixed.

Figure 48:
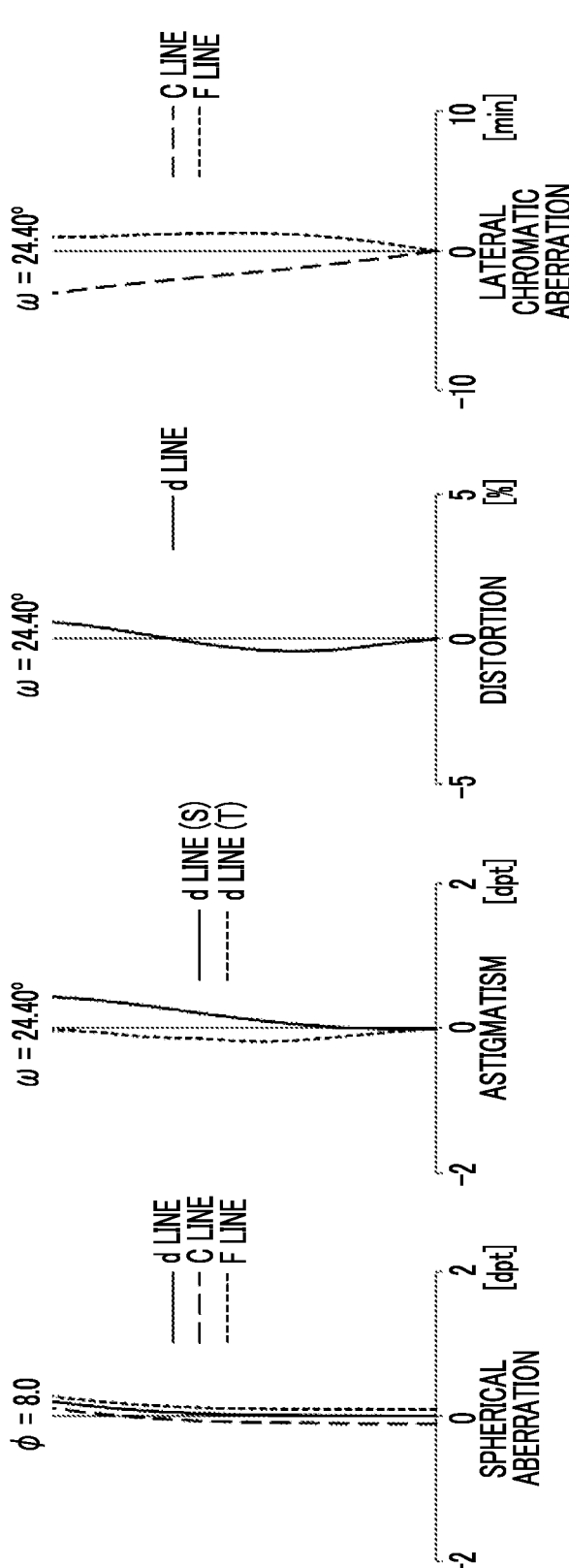
FIG. 48 is a spherical aberration diagram, an astigmatism diagram, a distortion diagram, and a lateral chromatic aberration diagram of the observation optical system of Example 16.
Figure 49:
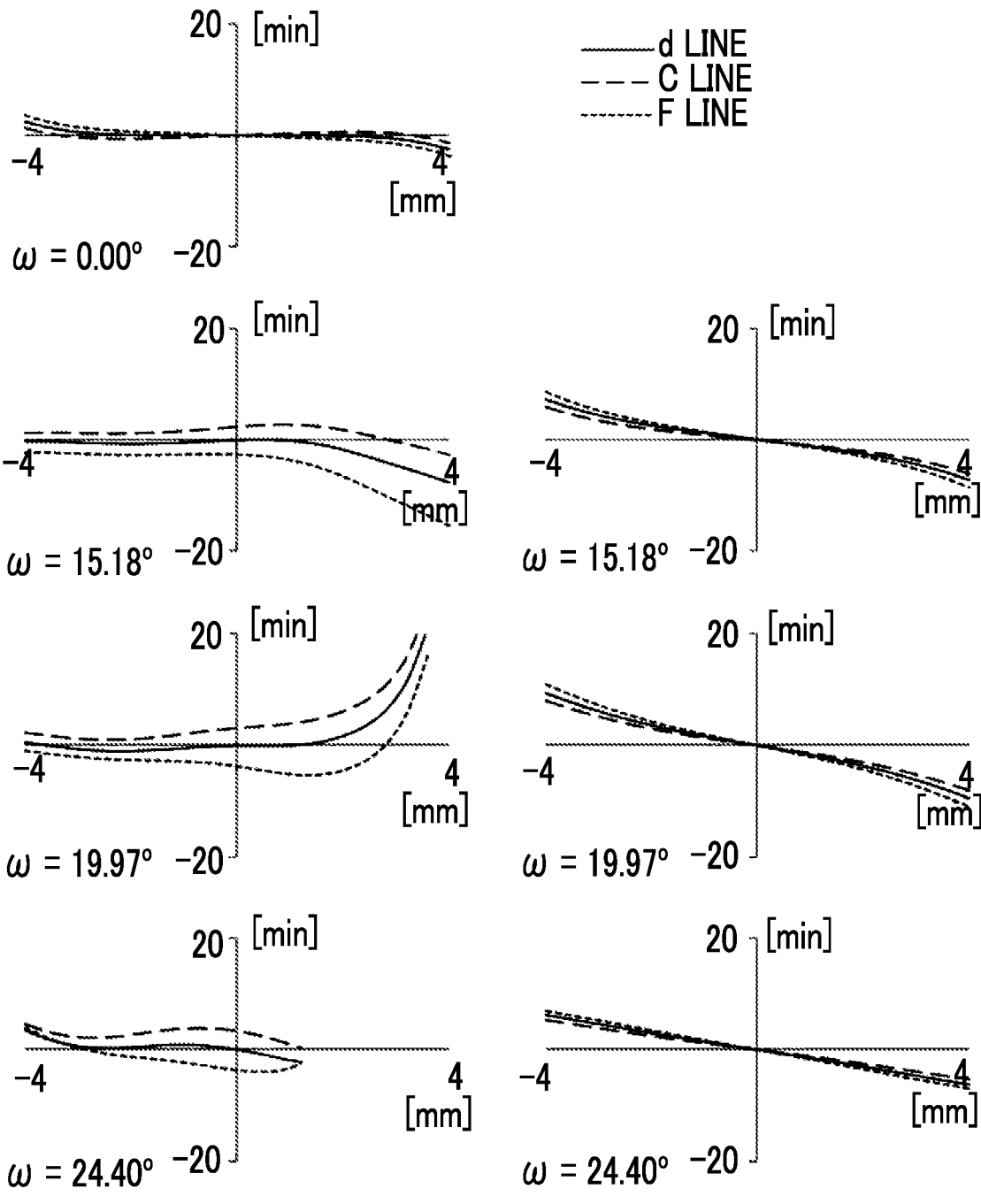
FIG. 49 is a lateral aberration diagram of the observation optical system of Example 16.

For the observation optical system 5 of Example 16, basic lens data is shown in Table 61, specifications are shown in Table 62, variable surface spacing is shown in Table 63, aspherical coefficients are shown in Table 64, and various aberration diagrams in a state where the diopter is −1.00 diopter are illustrated in FIG. 48 and FIG. 49.

TABLE 61

| | Example 16 | | | |
| --- | --- | --- | --- | --- |
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |
| *5 | −40.5440 | 4.5605 | 1.53409 | 55.87 |
| *6 | −12.7058 | 0.1000 | | |
| 7 | 26.4792 | 4.7928 | 1.83481 | 42.72 |
| 8 | −43.0074 | 3.0842 | | |
| *9 | −12.9444 | 2.0753 | 1.63351 | 23.63 |
| *10 | 13.0745 | 2.5187 | | |
| *11 | 20.8141 | 5.0008 | 1.80625 | 40.91 |
| *12 | −22.7839 | DD[12] | | |
| 13 | ∞ | 1.2000 | 1.49023 | 57.5 |
| 14 | ∞ | 15.0000 | | |
| 15 (EP) | ∞ | | | |

TABLE 62

| | Example 16 | | |
| --- | --- | --- | --- |
| Diopter | −1.0 dpt | −4.5 dpt | +2.5 dpt |
| f | 17.96 | 17.96 | 17.96 |
| Apparent Field of View (°) | 48.80 | 47.07 | 50.13 |
| H | 8.20 | | |

TABLE 63

| Example 16 | | | |
| --- | --- | --- | --- |
| Diopter | −1.0 dpt | −4.5 dpt | +2.5 dpt |
| DD[4] | 2.63 | 1.43 | 3.75 |
| DD[12] | 1.57 | 2.78 | 0.46 |

TABLE 64

| Example 16 | | | | |
| --- | --- | --- | --- | --- |
| Sn | 5 | 6 | 9 | 10 |
| KA | 3.0000029E+00 | −2.9762781E+00 | 4.5059583E−01 | 4.9342224E−01 |
| A3 | 0.0000000E+00 | 0.0000000E+00 | 0.0000000E+00 | 0.0000000E+00 |
| A4 | −2.4833404E−04 | −2.8030475E−04 | −7.9673702E−04 | −9.8384390E−04 |
| A5 | 4.6842467E−05 | 2.5311464E−05 | 1.3988524E−04 | −8.7351424E−06 |
| A6 | −3.2733837E−06 | −1.0242319E−06 | −1.9377382E−06 | 2.0964177E−05 |
| A7 | 1.8984182E−06 | 1.9308320E−07 | −2.1176437E−07 | −1.0511901E−06 |
| A8 | −7.5661440E−07 | −2.6485207E−08 | −6.3352450E−08 | −1.0943483E−07 |
| A9 | 1.1659744E−07 | −4.1334241E−09 | 4.3161885E−10 | 4.0563998E−09 |
| A10 | −5.8858755E−09 | 1.3543602E−09 | 6.8765628E−10 | 6.1668757E−10 |
| A11 | −3.7026784E−10 | −1.9384975E−10 | −7.3960232E−12 | 6.7295113E−12 |
| A12 | 4.9777213E−11 | 2.6356539E−11 | −4.4309510E−12 | −3.3102399E−12 |
| A13 | 1.0815752E−12 | −2.5931323E−12 | 4.5711385E−13 | −2.7232292E−13 |
| A14 | −4.5309501E−13 | 1.4685446E−13 | −3.63719E−14 | 5.0023012E−14 |
| A15 | 2.7950050E−14 | −4.3938823E−15 | 1.80099E−15 | −2.5283359E−15 |
| A16 | −5.8448771E−16 | 5.5831765E−17 | −3.5399287E−17 | 4.7008530E−17 |

| Sn | 11 | 12 |
| --- | --- | --- |
| KA | 1.4492310E+00 | −2.7273804E+00 |
| A3 | 0.0000000E+00 | 0.0000000E+00 |
| A4 | 1.0856555E−04 | 1.4192798E−04 |
| A5 | −6.1816191E−05 | −1.9482950E−05 |
| A6 | 4.8726611E−07 | 1.0789070E−06 |
| A7 | 6.1910153E−07 | −3.3234396E−07 |
| A8 | −1.6198678E−08 | 3.3065680E−08 |
| A9 | −3.5969818E−09 | −5.9318860E−10 |
| A10 | −1.7880218E−10 | 4.2548448E−11 |
| A11 | 7.8462271E−11 | 4.4872032E−12 |
| A12 | −1.2754190E−12 | −1.9158382E−12 |
| A13 | −8.4091090E−13 | 7.8791146E−14 |
| A14 | 8.7725113E−14 | 7.9128689E−15 |
| A15 | −3.7661343E−15 | −7.2205808E−16 |
| A16 | 6.4008394E−17 | 1.6626081E−17 |

Example 17

Figure 50:
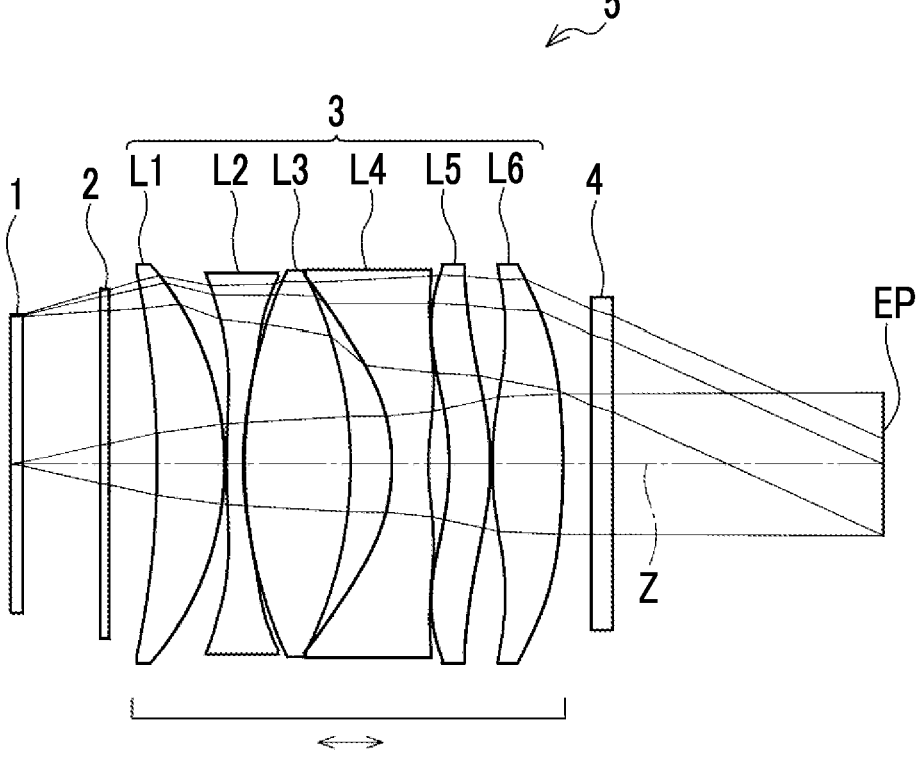
FIG. 50 is a cross-sectional view illustrating a configuration and luminous flux of an observation optical system of Example 17.

FIG. 50 illustrates a configuration and luminous flux of the observation optical system 5 of Example 17. The observation optical system 5 of Example 17 comprises the display element 1, the optical member 2, the eyepiece lens 3, and the optical member 4 in order from the display element side to the eyepoint side.

The eyepiece lens 3 consists of six lenses of the lens L1 to a lens L6 in order from the display element side to the eyepoint side. The lens L1 is a positive lens having a meniscus shape of which a concave surface faces toward the display element side. The lens L2 is a negative lens having a meniscus shape of which a convex surface faces toward the display element side in a paraxial region. The lens L3 is a positive lens having a biconvex shape. The lens L4 is a negative lens having a biconcave shape in a paraxial region. The lens L5 is a positive lens having a meniscus shape of which a concave surface faces toward the display element side in a paraxial region. The lens L6 is a positive lens having a biconvex shape in a paraxial region. The lens L1 and the lens L3 are spherical lenses, and the lens L2 and the lens L4 to the lens L6 are aspherical lenses. All of the lens L1 to the lens L6 are single lenses. In the diopter adjustment, the six lenses of the lens L1 to the lens L6 move as a single body along the optical axis Z, and the display element 1, the optical member 2, and the optical member 4 are fixed.

Figure 51:
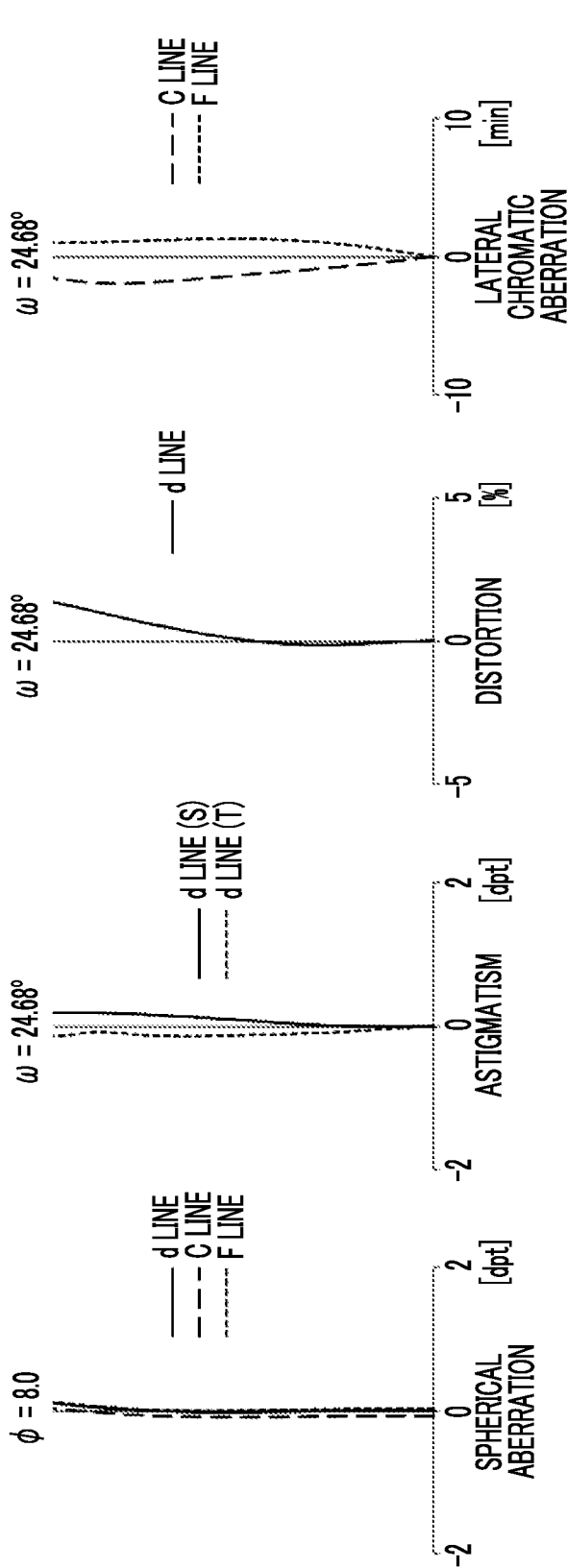
FIG. 51 is a spherical aberration diagram, an astigmatism diagram, a distortion diagram, and a lateral chromatic aberration diagram of the observation optical system of Example 17.
Figure 52:
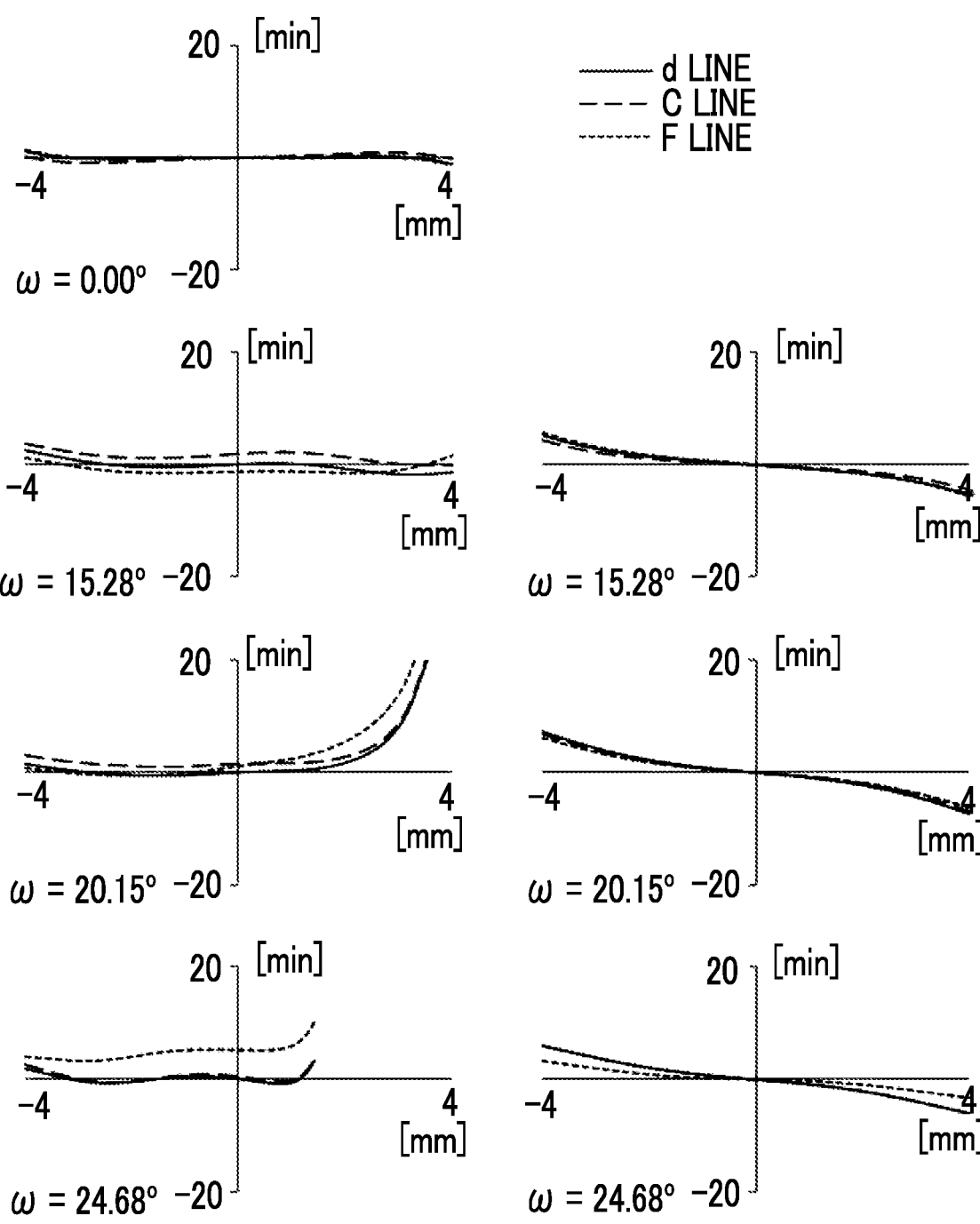
FIG. 52 is a lateral aberration diagram of the observation optical system of Example 17.

For the observation optical system 5 of Example 17, basic lens data is shown in Table 65, specifications are shown in Table 66, variable surface spacing is shown in Table 67, aspherical coefficients are shown in Table 68, and various aberration diagrams in a state where the diopter is −1.00 diopter are illustrated in FIG. 51 and FIG. 52.

TABLE 65

| Example 17 | | | | |
| --- | --- | --- | --- | --- |
| Sn | R | D | Nd | vd |
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | DD[4] | | |
| 5 | −51.4617 | 3.7680 | 1.88168 | 39.83 |
| 6 | −17.0750 | 0.1000 | | |
| *7 | 40.2110 | 0.8699 | 1.63351 | 23.63 |
| *8 | 18.7006 | 0.1000 | | |
| 9 | 26.0500 | 5.8844 | 1.85086 | 42.91 |
| 10 | −23.3832 | 2.3087 | | |

TABLE 65-continued

| | | Example 17 | | |
|---|---|---|---|---|
| Sn | R | D | Nd | vd |
| *11 | −12.7818 | 2.0255 | 1.63351 | 23.63 |
| *12 | 13.2291 | 1.1745 | | |
| *13 | −15.5855 | 2.2761 | 1.53409 | 55.87 |
| *14 | −15.5718 | 0.1000 | | |
| *15 | 18.7226 | 3.9613 | 1.80625 | 40.91 |
| *16 | −35.5487 | DD[16] | | |
| 17 | ∞ | 1.2000 | 1.49023 | 57.5 |
| 18 | ∞ | 15.0000 | | |
| 19 (EP) | ∞ | | | |

TABLE 66

| | Example 17 | | |
|---|---|---|---|
| Diopter | −1.0 dpt | −4.5 dpt | +2.5 dpt |
| f | 17.95 | 17.95 | 17.95 |
| Apparent Field of View (°) | 49.37 | 47.76 | 50.66 |
| H | 8.20 | | |

TABLE 67

| | Example 17 | | |
|---|---|---|---|
| Diopter | −1.0 dpt | −4.5 dpt | +2.5 dpt |
| DD[4] | 2.67 | 1.48 | 3.79 |
| DD[16] | 1.57 | 2.76 | 0.45 |

TABLE 68

Example 17

| Sn | 7 | 8 | 11 | 12 |
|---|---|---|---|---|
| KA | −3.0000001E+00 | 1.6402912E+00 | 3.2910759E−01 | 4.3513692E−01 |
| A3 | 0.0000000E+00 | 0.0000000E+00 | 0.0000000E+00 | 0.0000000E+00 |
| A4 | −2.3916214E−04 | −1.3573638E−04 | −1.0093283E−03 | −1.7940913E−03 |
| A5 | −1.6521271E−05 | 5.1747588E−06 | 1.4678674E−04 | 4.5278521E−05 |
| A6 | 2.9243991E−06 | −6.6469605E−06 | −1.4215415E−06 | 3.1580035E−05 |
| A7 | −1.1746751E−06 | 7.4739572E−08 | −2.9255663E−07 | −2.7219328E−06 |
| A8 | 1.8922324E−07 | 1.1486845E−07 | 2.2681865E−08 | 1.3644314E−07 |
| A9 | −4.3549744E−09 | 3.1623398E−09 | −1.1108191E−08 | −2.7479995E−08 |
| A10 | −5.9330795E−10 | −1.6201312E−09 | 1.0992183E−09 | 2.7324589E−09 |
| A11 | 5.2380351E−11 | 4.8856310E−11 | 4.3373574E−11 | −5.4580194E−11 |
| A12 | −9.7720291E−12 | 6.8803193E−12 | −1.9474535E−11 | 2.6115673E−12 |
| A13 | 9.9542641E−13 | −9.3479366E−13 | 2.2718817E−12 | −2.1328764E−12 |
| A14 | −3.1787146E−14 | 7.0097527E−14 | −1.4653010E−13 | 2.7095943E−13 |
| A15 | −4.1607171E−16 | −3.0055011E−15 | 5.1206941E−15 | −1.4005436E−14 |
| A16 | 2.9507192E−17 | 5.3355481E−17 | −7.5304186E−17 | 2.7283121E−16 |

| Sn | 13 | 14 | 15 | 16 |
|---|---|---|---|---|
| KA | 9.6631202E−01 | 8.5457210E−01 | 1.2418975E+00 | −2.2438173E+00 |
| A3 | 0.0000000E+00 | 0.0000000E+00 | 0.0000000E+00 | 0.0000000E+00 |
| A4 | 3.4958155E−05 | 2.2406176E−04 | 5.7802079E−06 | 1.2247968E−04 |
| A5 | 2.0824493E−05 | −8.7215072E−06 | −5.2611158E−05 | −1.5071557E−05 |
| A6 | 5.1008404E−06 | 4.7236645E−06 | 5.2879900E−06 | +.0255120E−06 |
| A7 | −1.3660051E−08 | −1.4171850E−07 | −3.6478246E−06 | −4.0863379E−07 |
| A8 | −1.1595498E−07 | −4.1348830E−08 | 1.1531789E−06 | 6.0583929E−08 |
| A9 | 1.1902883E−08 | −4.9782815E−09 | −1.8698210E−07 | 1.9317079E−09 |
| A10 | −1.1129329E−09 | 9.3304825E−10 | 1.8802419E−08 | −4.6324328E−10 |
| A11 | 4.1159582E−11 | −1.3589803E−11 | −1.1512205E−09 | 2.2921864E−11 |
| A12 | 1.8213280E−11 | 5.8970537E−13 | 4.2537560E−11 | −1.8699455E−12 |
| A13 | −3.3279344E−12 | −5.8285922E−13 | −2.4643627E−12 | 6.2910851E−14 |
| A14 | 2.5602166E−13 | 6.0170277E−14 | 2.7694673E−13 | 1.1135825E−14 |
| A15 | −9.9044181E−15 | −2.6058171E−15 | −1.65to565E−14 | −9.7115577E−16 |
| A16 | 1.5889660E−16 | 4.5112280E−17 | 3.6100042E−16 | 2.2239349E−17 |

Example 18

Figure 53:
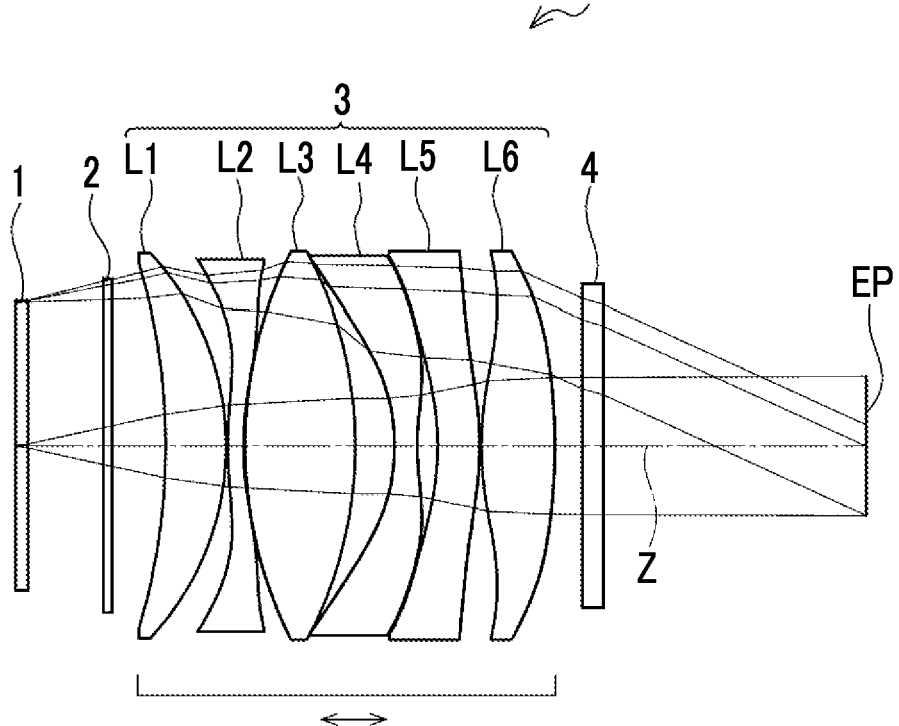
FIG. 53 is a cross-sectional view illustrating a configuration and luminous flux of an observation optical system of Example 18.

FIG. 53 illustrates a configuration and luminous flux of the observation optical system 5 of Example 18. The observation optical system 5 of Example 18 comprises the display element 1, the optical member 2, the eyepiece lens 3, and the optical member 4 in order from the display element side to the eyepoint side.

The eyepiece lens 3 consists of six lenses of the lens L1 to the lens L6 in order from the display element side to the eyepoint side. The lens L1 is a positive lens having a meniscus shape of which a concave surface faces toward the display element side. The lens L2 is a negative lens having a meniscus shape of which a convex surface faces toward the display element side in a paraxial region. The lens L3 is a positive lens having a biconvex shape. The lens L4 is a negative lens having a biconcave shape in a paraxial region. The lens L5 is a negative lens having a meniscus shape of which a concave surface faces toward the display element side in a paraxial region. The lens L6 is a positive lens having a biconvex shape in a paraxial region. The lens L1 and the lens L3 are spherical lenses, and the lens L2 and the lens L4 to the lens L6 are aspherical lenses. All of the lens L1 to the lens L6 are single lenses. In the diopter adjustment, the six lenses of the lens L1 to the lens L6 move as a single body along the optical axis Z, and the display element 1, the optical member 2, and the optical member 4 are fixed.

Figure 54:
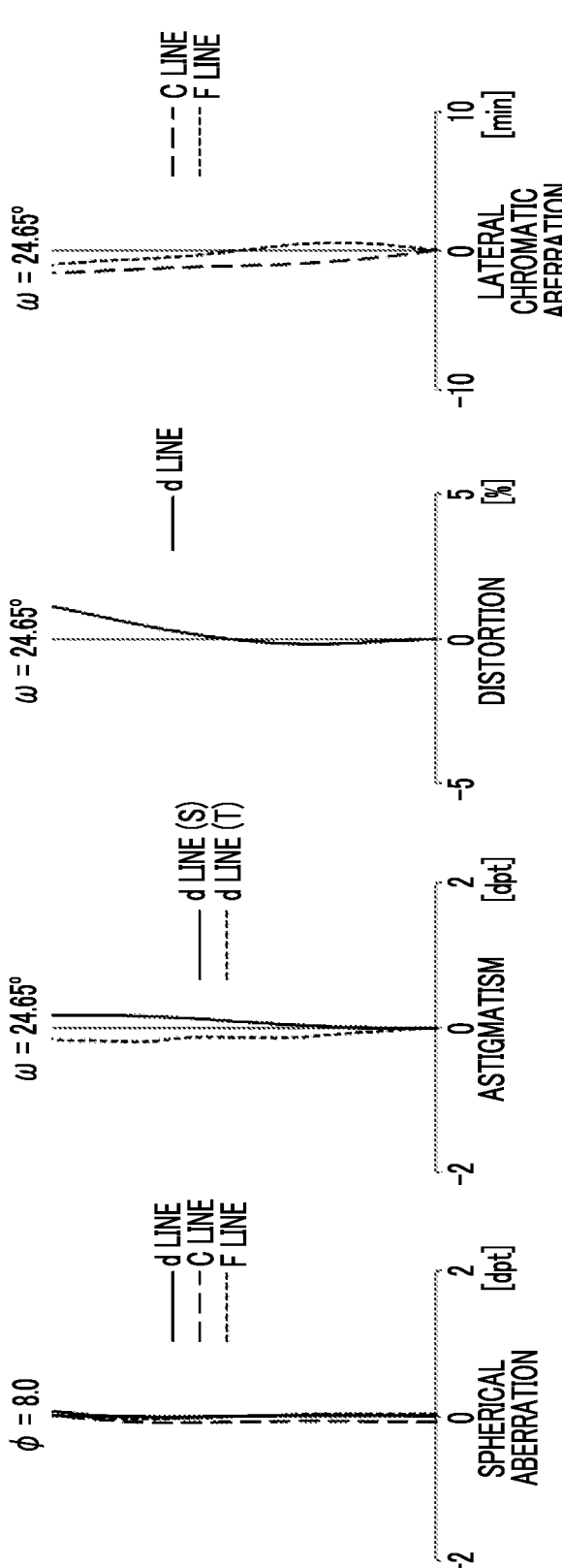
FIG. 54 is a spherical aberration diagram, an astigmatism diagram, a distortion diagram, and a lateral chromatic aberration diagram of the observation optical system of Example 18.
Figure 55:
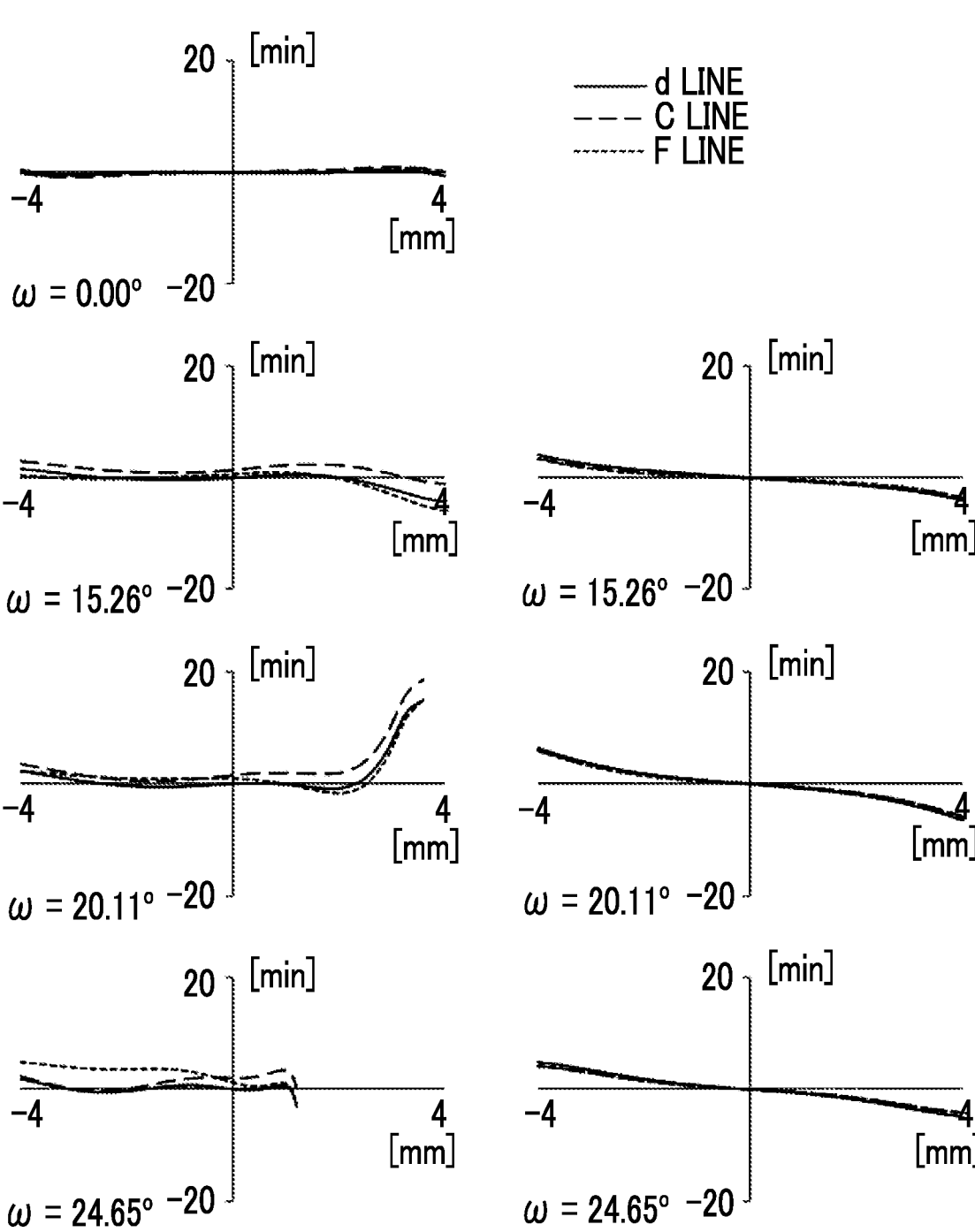
FIG. 55 is a lateral aberration diagram of the observation optical system of Example 18.

For the observation optical system 5 of Example 18, basic lens data is shown in Table 69, specifications are shown in Table 70, variable surface spacing is shown in Table 71, aspherical coefficients are shown in Table 72, and various aberration diagrams in a state where the diopter is −1.00 diopter are illustrated in FIG. 54 and FIG. 55.

TABLE 69

| | | Example 18 | | |
| Sn | R | D | Nd | vd |
|---|---|---|---|---|
| 1 | ∞ | 0.7000 | 1.51680 | 64.20 |
| 2 | ∞ | 4.3000 | | |

TABLE 69-continued

| | | Example 18 | | |
| Sn | R | D | Nd | vd |
|---|---|---|---|---|
| 3 | ∞ | 0.5000 | 1.49023 | 57.49 |
| 4 | ∞ | DD[4] | | |
| 5 | −36.7999 | 3.4511 | 1.88650 | 39.35 |
| 6 | −16.3110 | 0.1000 | | |
| *7 | 24.6629 | 0.8763 | 1.63351 | 23.63 |
| *8 | 16.1140 | 0.1000 | | |
| 9 | 24.8064 | 6.3100 | 1.82500 | 45.50 |
| 10 | −23.9239 | 2.2346 | | |
| *11 | −13.2003 | 1.3004 | 1.63351 | 23.63 |
| *12 | 13.3011 | 1.1736 | | |
| *13 | −15.5262 | 2.3295 | 1.63351 | 23.63 |
| *14 | −18.8223 | 0.1000 | | |
| *15 | 18.1661 | 4.1994 | 1.80625 | 40.91 |
| *16 | −31.7149 | DD[16] | | |
| 17 | ∞ | 1.2000 | 1.49023 | 57.5 |
| 18 | ∞ | 15.0000 | | |
| 19 (EP) | ∞ | | | |

TABLE 70

| | Example 18 | | |
|---|---|---|---|
| Diopter | −1.0 dpt | −4.5 dpt | +2.5 dpt |
| f | 17.96 | 17.96 | 17.96 |
| Apparent Field of View (°) | 49.29 | 47.87 | 50.40 |
| H | 8.20 | | |

TABLE 71

| | Example 18 | | |
|---|---|---|---|
| Diopter | −1.0 dpt | −4.5 dpt | +2.5 dpt |
| DD[4] | 3.06 | 1.86 | 4.17 |
| DD[16] | 1.57 | 2.77 | 0.46 |

TABLE 72

| | | Example 18 | | |
| Sn | 7 | 8 | 11 | 12 |
|---|---|---|---|---|
| KA | 2.9444146E+00 | 1.7963131E+00 | 3.1280231E−01 | 4.2103525E−01 |
| A3 | 0.0000000E+00 | 0.0000000E+00 | 0.0000000E+00 | 0.0000000E+00 |
| A4 | −3.7918586E−04 | −2.8029648E−04 | −1.1583392E−03 | −1.8138608E−03 |
| A5 | −3.2763367E−05 | −1.1757758E−05 | 1.9485183E−04 | 3.1463723E−05 |
| A6 | 4.2114641E−06 | −4.0710387E−06 | −5.3825460E−06 | 2.8203028E−05 |
| A7 | −8.4230603E−07 | 6.0103535E−08 | −4.1732547E−07 | −1.2303889E−06 |
| A8 | 1.1074096E−07 | 1.2636671E−07 | 4.4127739E−09 | −1.5688624E−07 |
| A9 | 2.1430637E−09 | −4.8244763E−09 | −1.8520931E−09 | 6.3585197E−10 |
| A10 | −3.5776179E−10 | −6.5877282E−10 | 7.4397164E−10 | 2.6844948E−09 |
| A11 | −9.3754992E−11 | 2.2585892E−11 | −5.4182160E−11 | −2.7570273E−10 |
| A12 | 1.1870489E−11 | 2.4619619E−12 | −6.0546413E−12 | 3.8127243E−12 |
| A13 | −6.7878222E−13 | −3.0838277E−13 | 1.6282374E−12 | 1.8623250E−12 |
| A14 | 3.2853766E−14 | 2.9097843E−14 | −1.4804544E−13 | −2.0623163E−13 |
| A15 | −1.2280641E−15 | −1.5839101E−15 | 6.4417386E−15 | 9.5585095E−15 |
| A16 | 2.0285330E−17 | 3.2854540E−17 | −1.1257992E−16 | −1.7260637E−16 |

| Sn | 13 | 14 | 15 | 16 |
|---|---|---|---|---|
| KA | 9.6383856E−01 | 8.5701815E−01 | 1.2859137E+00 | −2.0826428E+00 |
| A3 | 0.0000000E+00 | 0.0000000E+00 | 0.0000000E+00 | 0.0000000E+00 |
| A4 | 5.1980485E−05 | 2.5302205E−04 | 5.8217653E−05 | 1.0567242E−04 |
| A5 | 9.2953965E−06 | −1.6128963E−05 | −4.6484713E−05 | −2.3421762E−06 |
| A6 | 3.1997897E−06 | 7.4703196E−06 | −4.2789775E−06 | −1.5607541E−06 |
| A7 | 9.0572724E−09 | −1.5533216E−06 | 8.9042726E−07 | −2.7130900E−07 |
| A8 | −7.1270965E−08 | 2.9410082E−07 | −2.1086385E−08 | −6.6757026E−09 |

TABLE 72-continued

| | Example 18 | | | |
|---|---|---|---|---|
| A9 | 9.9094714E−10 | −4.7661517E−08 | −2.5504881E−09 | 1.0940983E−08 |
| A10 | 4.3569240E−10 | 2.9996367E−09 | 1.2168425E−09 | −7.7339418E−10 |
| A11 | −1.0421853E−12 | 1.6715810E−10 | −2.9298247E−10 | −1.8200222E−11 |
| A12 | −4.3857972E−12 | −2.9129417E−11 | 3.4921784E−11 | 1.3855830E−12 |
| A13 | 5.9328061E−13 | 1.2821033E−13 | −2.2482589E−12 | 3.9024379E−13 |
| A14 | −4.8598761E−14 | 1.7671926E−13 | 7.1310154E−14 | −4.7979001E−14 |
| A15 | 2.1611414E−15 | −1.1919403E−14 | −5.1087087E−16 | 2.2794056E−15 |
| A16 | −3.8868066E−17 | 2.5671744E−16 | −1.7203848E−17 | −4.2355162E−17 |

Example 19

Figure 56:
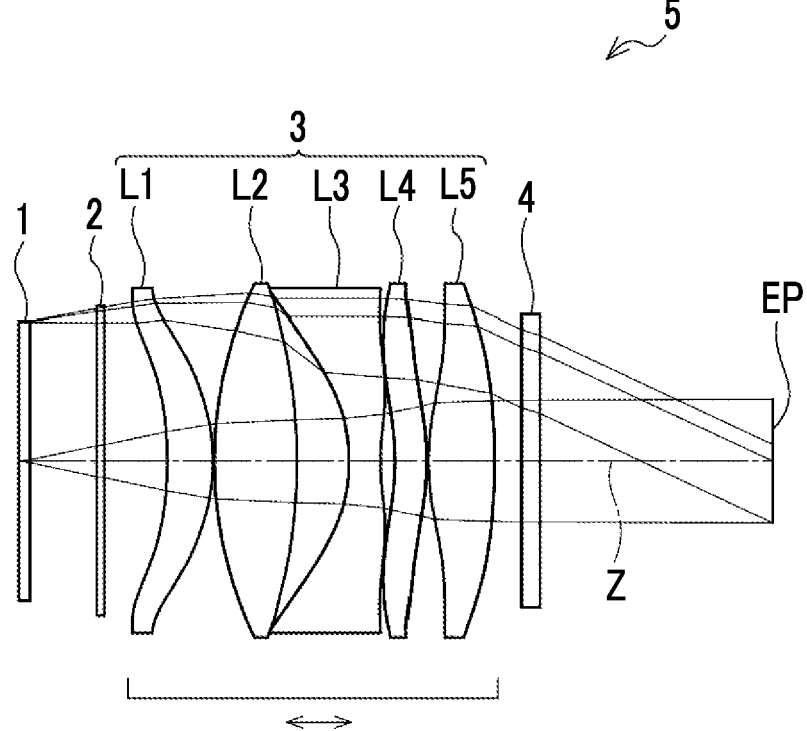
FIG. 56 is a cross-sectional view illustrating a configuration and luminous flux of an observation optical system of Example 19.

FIG. 56 illustrates a configuration and luminous flux of the observation optical system 5 of Example 19. The observation optical system 5 of Example 19 comprises the display element 1, the optical member 2, the eyepiece lens 3, and the optical member 4 in order from the display element side to the eyepoint side.

The eyepiece lens 3 consists of five lenses of the lens L1 to the lens L5 in order from the display element side to the eyepoint side. The lens L1 is a positive lens having a meniscus shape of which a concave surface faces toward the display element side in a paraxial region. The lens L2 is a positive lens having a biconvex shape. The lens L3 is a negative lens having a biconcave shape in a paraxial region. The lens L4 is a positive lens having a meniscus shape of which a concave surface faces toward the display element side in a paraxial region. The lens L5 is a positive lens having a biconvex shape in a paraxial region. The lens L2 is a spherical lens, and the lens L1 and the lens L3 to the lens L5 are aspherical lenses. All of the lens L1 to the lens L5 are single lenses. In the diopter adjustment, the five lenses of the lens L1 to the lens L5 move as a single body along the optical axis Z, and the display element 1, the optical member 2, and the optical member 4 are fixed.

Figure 57:
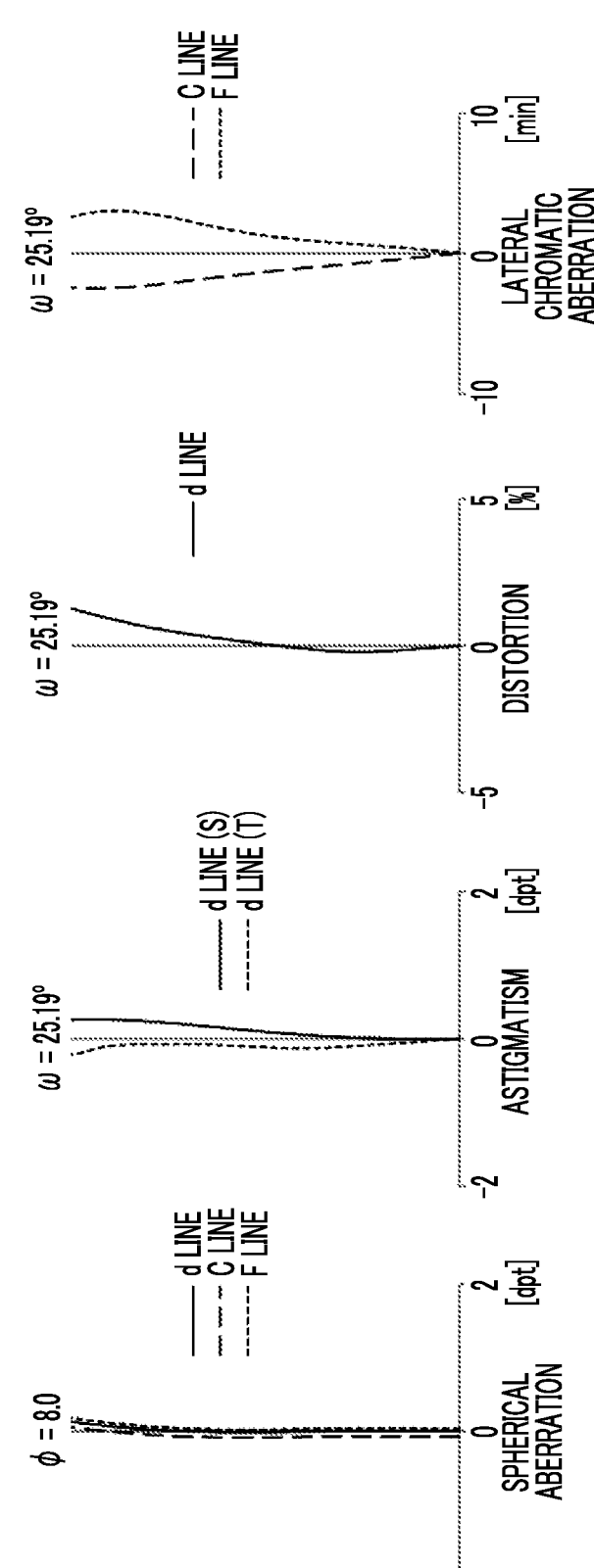
FIG. 57 is a spherical aberration diagram, an astigmatism diagram, a distortion diagram, and a lateral chromatic aberration diagram of the observation optical system of Example 19.
Figure 58:
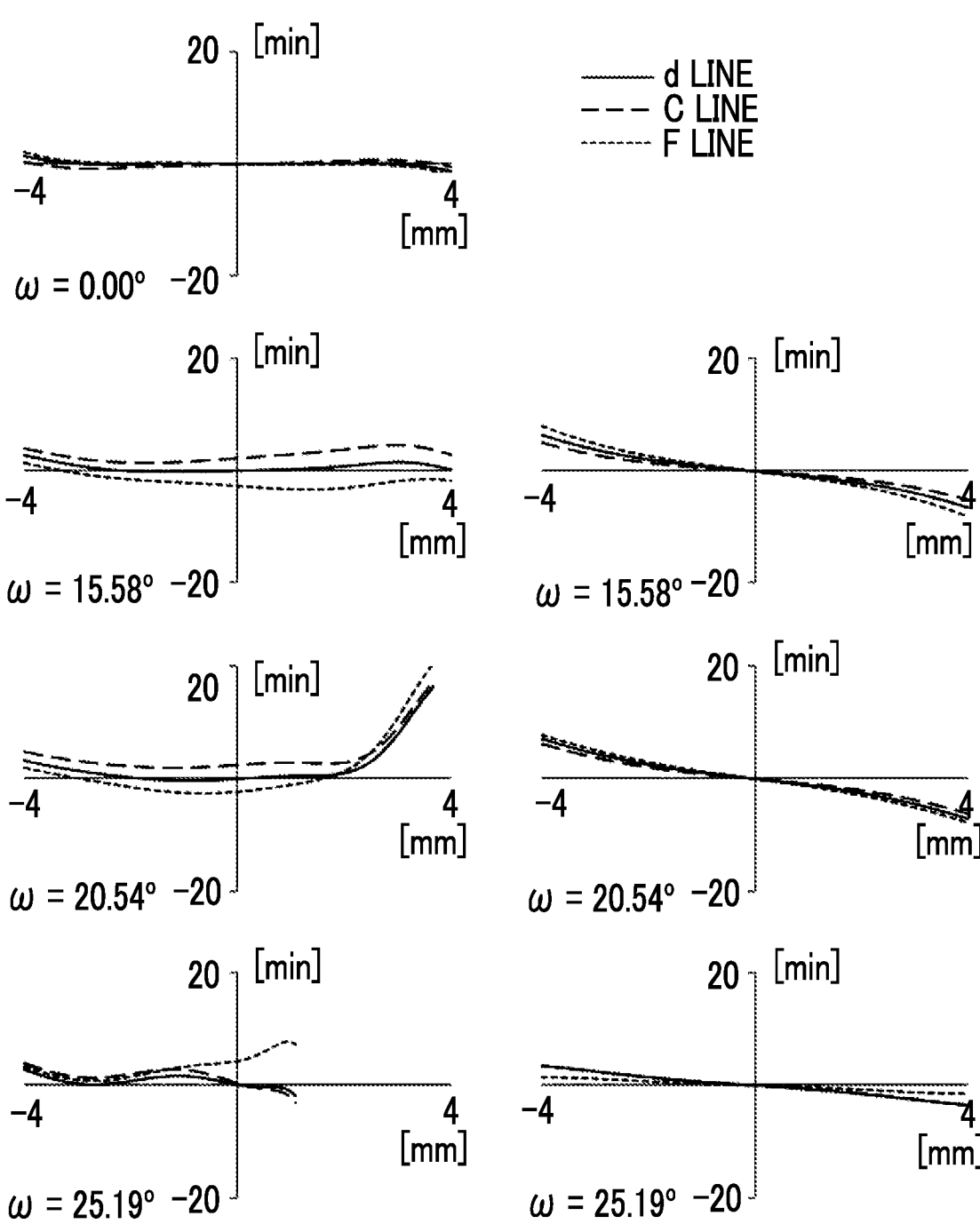
FIG. 58 is a lateral aberration diagram of the observation optical system of Example 19.

For the observation optical system 5 of Example 19, basic lens data is shown in Table 73, specifications are shown in Table 74, variable surface spacing is shown in Table 75, aspherical coefficients are shown in Table 76, and various aberration diagrams in a state where the diopter is −1.00 diopter are illustrated in FIG. 57 and FIG. 58.

TABLE 73

| | Example 19 | | | |
|---|---|---|---|---|
| Sn | R | D | Nd | νd |
| 1 | ∞ | 0.7000 | 1.51680 | 64.20 |
| 2 | ∞ | 4.3000 | | |

TABLE 73-continued

| | Example 19 | | | |
|---|---|---|---|---|
| Sn | R | D | Nd | νd |
| 3 | ∞ | 0.5000 | 1.49023 | 57.49 |
| 4 | ∞ | DD[4] | | |
| *5 | −22.0752 | 2.9236 | 1.53409 | 55.87 |
| *6 | −12.9908 | 0.1000 | | |
| 7 | 26.7227 | 5.3146 | 1.79600 | 48.40 |
| 8 | −36.0778 | 3.3418 | | |
| *9 | −13.3485 | 2.0493 | 1.63351 | 23.63 |
| *10 | 13.5937 | 0.9389 | | |
| *11 | −15.9998 | 1.9838 | 1.53409 | 55.87 |
| *12 | −15.9998 | 0.1000 | | |
| *13 | 16.2535 | 4.2657 | 1.80625 | 40.91 |
| *14 | −37.648 | DD[14] | | |
| 15 | ∞ | 1.2000 | 1.49023 | 57.5 |
| 16 | ∞ | 15.0000 | | |
| 17 (EP) | ∞ | | | |

TABLE 74

| | Example 19 | | |
|---|---|---|---|
| Diopter | −1.0 dpt | −4.5 dpt | +2.5 dpt |
| f | 19.26 | 19.26 | 19.26 |
| Apparent Field of View (°) | 50.38 | 49.22 | 51.12 |
| H | 8.97 | | |

TABLE 75

| | Example 19 | | |
|---|---|---|---|
| Diopter | −1.0 dpt | −4.5 dpt | +2.5 dpt |
| DD[4] | 4.07 | 2.70 | 5.36 |
| DD[14] | 1.72 | 3.09 | 0.44 |

TABLE 76

| | Example 19 | | | |
|---|---|---|---|---|
| Sn | 5 | 6 | 9 | 10 |
| KA | −5.0000037E+00 | 5.3084650E−01 | 3.4760263E−01 | 4.5067062E−01 |
| A3 | 0.0000000E+00 | 0.0000000E+00 | 0.0000000E+00 | 0.0000000E+00 |
| A4 | −3.4579493E−04 | −9.7596688E−05 | −1.1354272E−03 | −1.9044754E−03 |
| A5 | 1.3245829E−04 | 1.7051115E−04 | 1.6540472E−04 | 1.2437725E−04 |
| A6 | −1.5633769E−05 | −8.7990889E−05 | −1.3709823E−06 | 2.1442192E−05 |
| A7 | −1.4167056E−06 | 3.1062368E−05 | −1.5911851E−07 | −3.1576056E−06 |
| A8 | 2.4867797E−07 | −7.4110328E−06 | −7.8902295E−08 | 2.3616204E−07 |
| A9 | 1.3027837E−08 | 1.1146004E−06 | 5.6364150E−09 | −2.9710870E−08 |
| A10 | −2.6291961E−09 | −1.1059886E−07 | −2.6842786E−10 | 3.3485513E−09 |
| A11 | 1.3867372E−10 | 1.0387794E−08 | 6.0202473E−11 | −6.2663764E−11 |
| A12 | −2.3303258E−11 | −1.3984351E−09 | −6.3317598E−12 | −3.1717129E−11 |

TABLE 76-continued

| | Example 19 | | | |
|---|---|---|---|---|
| A13 | 3.4482610E−12 | 1.7331641E−10 | 4.6663225E−13 | 4.0645099E−12 |
| A14 | −2.4522793E−13 | −1.3424417E−11 | −3.3578229E−14 | −2.3193751E−13 |
| A15 | 8.8969366E−15 | 5.6073565E−13 | 1.5628067E−15 | 6.7009486E−15 |
| A16 | −1.3806850E−16 | −9.7430801E−15 | −2.9586017E−17 | −7.9807160E−17 |

| Sn | 11 | 12 | 13 | 14 |
|---|---|---|---|---|
| KA | 9.7895089E−01 | 7.8570175E−01 | 1.2882432E+00 | −1.4667376E+00 |
| A3 | 0.0000000E+00 | 0.0000000E+00 | 0.0000000E+00 | 0.0000000E+00 |
| A4 | 4.4721615E−04 | 5.4151433E−04 | −3.6677102E−05 | 1.1020299E−04 |
| A5 | −5.4538398E−08 | −5.7562364E−05 | −4.6342070E−05 | −1.7341078E−06 |
| A6 | −2.2686581E−06 | 3.9719428E−06 | −3.3674785E−06 | −1.5656683E−06 |
| A7 | 1.6699955E−07 | 9.5767420E−07 | 1.2382380E−06 | −5.1179230E−07 |
| A8 | −9.6888468E−09 | −2.3293516E−07 | −1.2714802E−07 | 6.0874653E−08 |
| A9 | −2.7716780E−09 | 1.4824719E−08 | 1.4521206E−08 | 2.9470231E−09 |
| A10 | 4.7064235E−10 | −7.2797372E−10 | −1.1743481E−09 | −4.0842845E−11 |
| A11 | −2.3928567E−11 | 6.6564805E−11 | −4.9271904E−12 | −7.8288229E−11 |
| A12 | 9.1460262E−13 | 4.7417713E−12 | 7.6809939E−12 | 5.0779901E−12 |
| A13 | −5.3931264E−14 | −1.3487004E−12 | −3.2218039E−13 | 1.3515510E−13 |
| A14 | −2.9889484E−16 | 9.3222645E−14 | −2.3111640E−14 | −2.6307760E−14 |
| A15 | 1.8636070E−16 | −2.8457370E−15 | 2.2708865E−15 | 1.1518094E−15 |
| A16 | −5.1333861E−18 | 3.4456628E−17 | −5.3374759E−17 | −1.9302532E−17 |

Example 20

Figure 59:
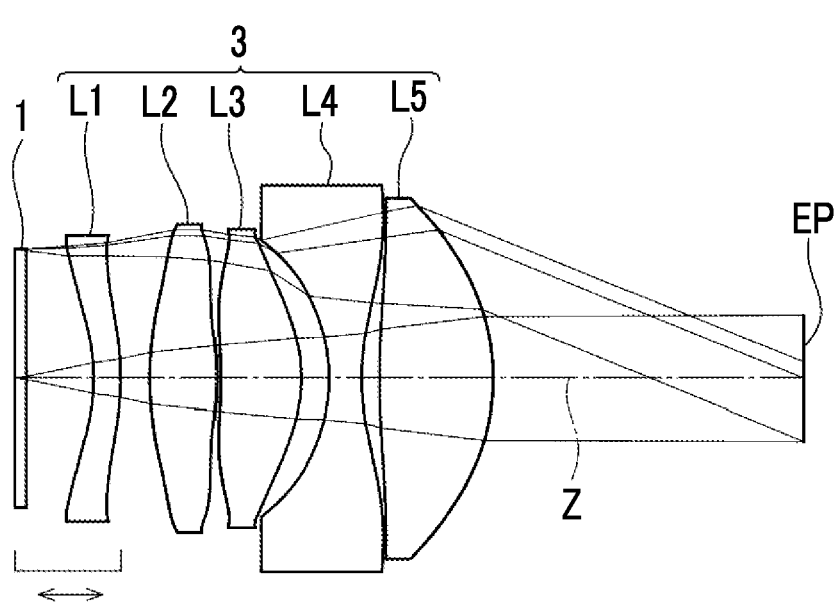
FIG. 59 is a cross-sectional view illustrating a configuration and luminous flux of an observation optical system of Example 20.

FIG. 59 illustrates a configuration and luminous flux of the observation optical system 5 of Example 20. The observation optical system 5 of Example 20 comprises the display element 1 and the eyepiece lens 3 in order from the display element side to the eyepoint side.

The eyepiece lens 3 consists of five lenses of the lens L1 to the lens L5 in order from the display element side to the eyepoint side. The lens L1 is a negative lens having a meniscus shape of which a concave surface faces toward the display element side in a paraxial region. The lens L2 is a positive lens having a biconvex shape in a paraxial region. The lens L3 is a positive lens having a meniscus shape of which a concave surface faces toward the display element side in a paraxial region. The lens L4 is a negative lens having a biconcave shape in a paraxial region. The lens L5 is a positive lens having a biconvex shape in a paraxial region. All of the lens L1 to the lens L5 are aspherical lenses. All of the lens L1 to the lens L5 are single lenses. In the diopter adjustment, the display element 1 and the lens L1 move as a single body along the optical axis Z, and the four lenses of the lens L2 to the lens L5 are fixed.

Figure 60:
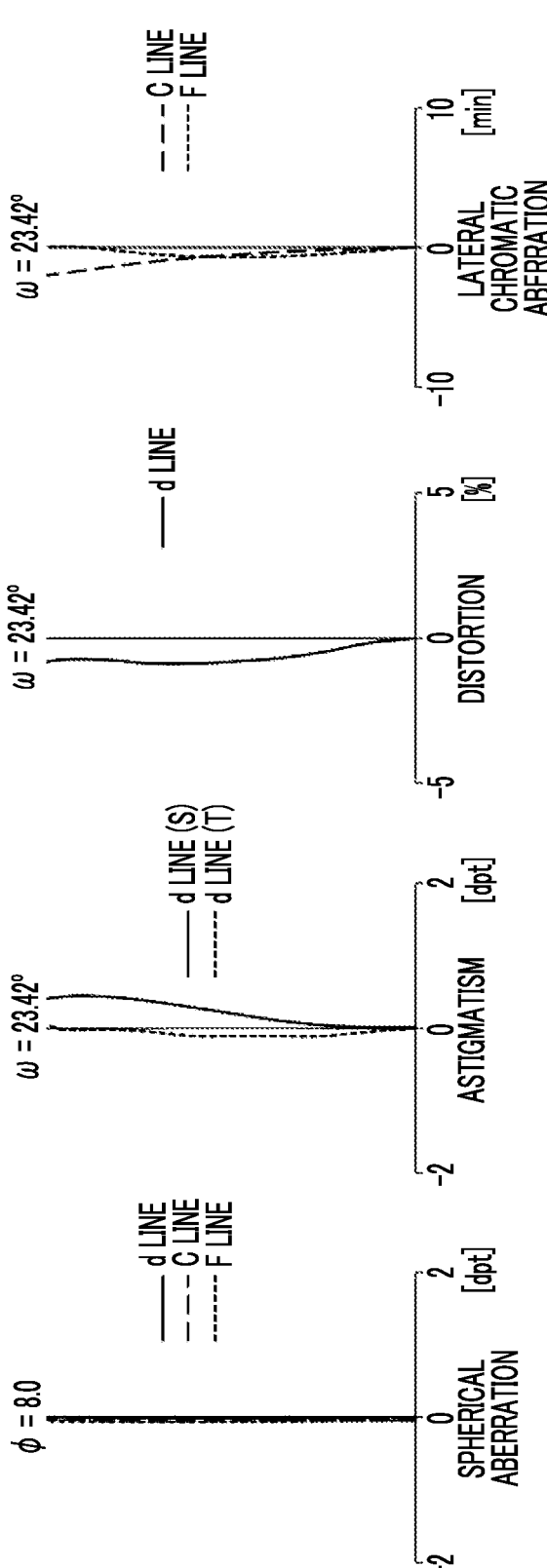
FIG. 60 is a spherical aberration diagram, an astigmatism diagram, a distortion diagram, and a lateral chromatic aberration diagram of the observation optical system of Example 20.
Figure 61:
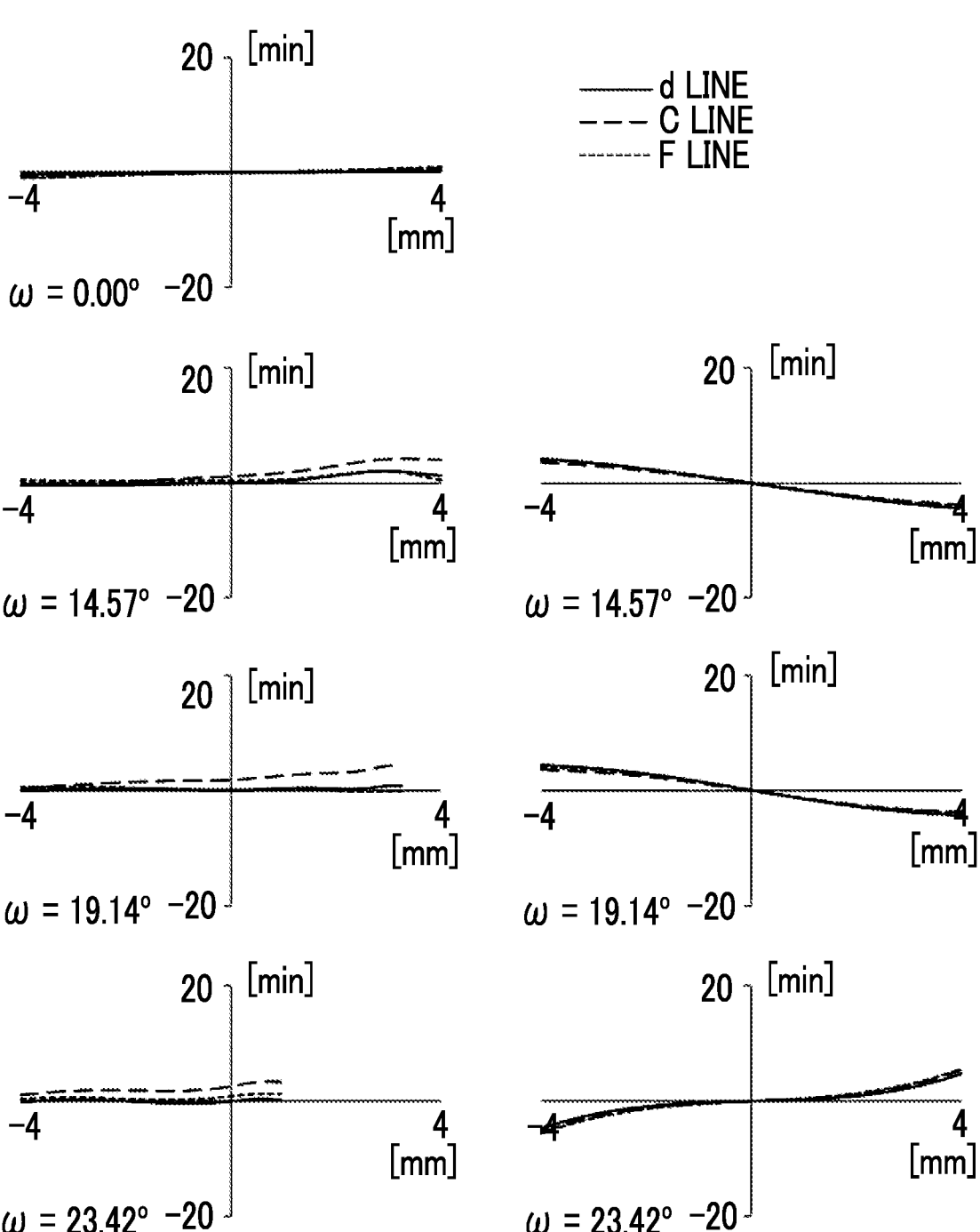
FIG. 61 is a lateral aberration diagram of the observation optical system of Example 20.

For the observation optical system 5 of Example 20, basic lens data is shown in Table 77, specifications are shown in Table 78, variable surface spacing is shown in Table 79, aspherical coefficients are shown in Table 80, and various aberration diagrams in a state where the diopter is −1.00 diopter are illustrated in FIG. 60 and FIG. 61.

TABLE 77

| | Example 20 | | | |
|---|---|---|---|---|
| Sn | R | D | Nd | vd |
| 1 | ∞ | 0.7000 | 1.51900 | 64.90 |
| 2 | ∞ | 4.0229 | | |
| *3 | −13.0344 | 1.6000 | 1.63351 | 23.63 |
| *4 | −20.0018 | DD[4] | | |
| *5 | 17.1899 | 4.0000 | 1.53409 | 55.87 |
| *6 | −40.4132 | 0.2918 | | |

TABLE 77-continued

| | Example 20 | | | |
|---|---|---|---|---|
| Sn | R | D | Nd | vd |
| *7 | −117.9649 | 4.8000 | 1.53409 | 55.87 |
| *8 | −9.9866 | 1.4621 | | |
| *9 | −10.9316 | 1.9782 | 1.63351 | 23.63 |
| *10 | 17.8861 | 1.0000 | | |
| *11 | 60.3042 | 6.9763 | 1.80780 | 40.86 |
| *12 | −14.3350 | 18.5000 | | |
| 13 (EP) | ∞ | | | |

TABLE 78

| | Example 20 | | |
|---|---|---|---|
| Diopter | −1.0 dpt | −5.0 dpt | +2.5 dpt |
| f | 18.68 | 18.35 | 19.10 |
| Apparent Field of View (°) | 46.85 | 47.79 | 45.74 |
| H | 8.20 | | |

TABLE 79

| | Example 20 | | |
|---|---|---|---|
| Diopter | −1.0 dpt | −5.0 dpt | +2.5 dpt |
| DD[4] | 1.72 | 2.82 | 0.35 |

TABLE 80

| | | Example 20 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A4 | −2.1532036E−04 | −1.3143419E−04 | −9.2310420E−05 | 2.6431735E−04 |
| A6 | 1.7088240E−05 | 6.4326487E−06 | 1.9035008E−06 | 6.9077663E−07 |
| A8 | −8.2896737E−08 | 2.5144288E−07 | −7.8010336E−08 | −7.8364785E−08 |
| A10 | −1.9809755E−09 | −9.0087353E−09 | 3.5880460E−10 | 2.3486476E−10 |
| A12 | −2.0124382E−11 | 7.8354556E−11 | 1.4430581E−12 | 1.5628093E−12 |
| A14 | 1.0711112E−12 | 3.0933307E−13 | 3.9347307E−14 | 2.1211106E−14 |
| A16 | −1.2642055E−14 | −6.8598597E−15 | −3.4233390E−16 | 7.1394227E−17 |
| A18 | 8.9995992E−17 | 3.0705353E−18 | −7.5900558E−19 | −1.7568670E−18 |
| A20 | −3.4252626E−19 | 2.0392629E−19 | 5.5841851E−21 | −3.1955424E−21 |

| Sn | 7 | 8 | 9 | 10 |
|---|---|---|---|---|
| KA | 1.0000000E+00 | 1.0000000E+00 | 1.0000000E+00 | 1.0000000E+00 |
| A4 | −1.1988118E−04 | 1.9956821E−04 | 2.1913737E−04 | −2.1513330E−04 |
| A6 | 5.0861214E−06 | 1.9295926E−06 | −2.5990407E−06 | 7.6023450E−08 |
| A8 | −4.7290859E−08 | −1.6692755E−08 | −1.3101954E−09 | 2.4586399E−09 |
| A10 | 1.9455506E−10 | 2.4226709E−10 | 1.1320802E−10 | 1.8320911E−11 |
| A12 | −6.8386886E−14 | 2.5554968E−12 | 2.6245431E−13 | 3.8271985E−14 |
| A14 | −4.5567875E−14 | 2.9725014E−17 | −1.0693712E−14 | −4.3796180E−15 |
| A16 | 7.7306169E−16 | −6.0001784E−16 | 2.9447031E−16 | 9.9170454E−18 |
| A18 | −2.1949217E−18 | −2.5076692E−19 | −3.2226869E−18 | 1.6489679E−19 |
| A20 | −1.6649675E−20 | 4.1289108E−20 | 1.2584963E−20 | −5.9722750E−22 |

| Sn | 11 | 12 |
|---|---|---|
| KA | 1.0000000E+00 | 1.0000000E+00 |
| A4 | −5.4832295E−05 | 1.3296768E−05 |
| A6 | −1.4739892E−08 | −9.9388396E−08 |
| A8 | 2.4218125E−09 | 2.5069010E−09 |
| A10 | 9.9117707E−12 | 5.1380067E−12 |
| A12 | −1.5482828E−13 | −6.6279582E−14 |
| A14 | −2.1841327E−15 | −8.5317579E−17 |
| A16 | 8.3673662E−18 | −3.7116831E−18 |
| A18 | 1.4351919E−19 | 5.2049311E−20 |
| A20 | −6.2133722E−22 | −1.1928417E−22 |

Table 81 to Table 85 show the corresponding values of Conditional Expressions (1) to (25) of the observation optical system 5 of Examples 1 to 20. Values shown in Table 81 to Table 85 are values based on the d line. Preferable ranges of the conditional expressions may be set using the corresponding values of the examples shown in Table 81 to Table 85 as the upper limits or the lower limits of the conditional expressions.

TABLE 81

| Expression Number | | Example 1 | Example 2 | Example 3 | Example 4 |
|---|---|---|---|---|---|
| (1) | H/f | 0.4588 | 0.4411 | 0.4566 | 0.4389 |
| (2) | (Rnr + Rnf)/(Rnr − Rnf) | 0.0139 | 0.0150 | 0.0047 | 0.0204 |
| (3) | (Rnf − Ropr)/(Rnf + Ropr) | 0.0210 | 0.0635 | −0.0495 | 0.0287 |
| (4) | (Ropr + Ropf)/(Ropr − Ropf) | −2.5812 | −2.0927 | −2.9454 | −2.9696 |
| (5) | (Repr + Repf)/(Repr − Repf) | 0.2589 | 0.5511 | 0.3745 | 0.3851 |
| (6) | Nmax | 1.8063 | 1.8176 | 1.8063 | 1.8063 |
| (7) | f/fn | −1.6843 | −1.7683 | −1.7867 | −1.8518 |
| (8) | f/fopn | 0.4398 | 0.3571 | 0.3823 | 0.3181 |
| (9) | f/fr | 1.0792 | 1.1607 | 1.1918 | 1.3177 |
| (10) | fop/fn | −2.4617 | −3.0629 | −3.1146 | −4.0482 |
| (11) | fop/fr | 1.5773 | 2.0105 | 2.0776 | 2.8807 |
| (12) | fn/fr | −0.6407 | −0.6564 | −0.6670 | −0.7116 |
| (13) | (Repf − Rnr)/(Repf + Rnr) | 0.2601 | 0.1077 | 0.1721 | 0.1187 |
| (14) | DL/f | 1.2358 | 1.1871 | 1.2411 | 1.1782 |
| (15) | DLopn/Tn | 0.6339 | 0.6369 | 0.6444 | 0.6370 |
| (16) | Dgnf/fn | −0.1834 | −0.2214 | −0.2343 | −0.3224 |

TABLE 81-continued

| Expression Number | | Example 1 | Example 2 | Example 3 | Example 4 |
|---|---|---|---|---|---|
| (17) | Dgnr/fn | −0.0791 | −0.0872 | −0.1054 | −0.1013 |
| (18) | H/fn | −0.7728 | −0.7800 | −0.8157 | −0.8128 |
| (19) | H/fr | 0.4952 | 0.5120 | 0.5441 | 0.5784 |
| (20) | f/fop | 0.6842 | 0.5773 | 0.5736 | 0.4574 |
| (21) | Dopn/Dn | 3.4177 | 3.4390 | 3.7081 | 3.8890 |
| (22) | Dopn/TTL | 0.2556 | 0.2557 | 0.2674 | 0.2788 |
| (23) | H/fop | 0.3139 | 0.2547 | 0.2619 | 0.2008 |
| (24) | H/Tep | 0.2702 | 0.2709 | 0.2702 | 0.2710 |
| (25) | Doop/f | 0.4625 | 0.4410 | 0.4484 | 0.4414 |

TABLE 82

| Expression Number | | Example 5 | Example 6 | Example 7 | Example 8 |
|---|---|---|---|---|---|
| (1) | H/f | 0.4565 | 0.4554 | 0.4554 | 0.4385 |
| (2) | (Rnr + Rnf)/ (Rnr − Rnf) | 0.0175 | 0.2590 | 0.2982 | −0.0103 |
| (3) | (Rnf − Ropr)/ (Rnf + Ropr) | −2.8829 | −0.0376 | −0.0429 | 0.0268 |
| (4) | (Ropr + Ropf)/ (Ropr − Ropf) | 2.6224 | −0.1958 | −0.2172 | −0.0887 |
| (5) | (Repr + Repf)/ (Repr − Repf) | 0.7496 | −1.8216 | −2.0626 | −0.2866 |
| (6) | Nmax | 1.8256 | 1.8100 | 1.8034 | 1.8526 |
| (7) | f/fn | −1.7960 | −1.5310 | −1.4744 | −2.1360 |
| (8) | f/fopn | 0.7112 | 0.7012 | 0.7115 | 0.1610 |
| (9) | f/fr | 1.4873 | 0.9156 | 0.9083 | 1.4067 |
| (10) | fop/fn | −3.8311 | −0.9268 | −0.9179 | −1.4110 |
| (11) | fop/fr | 3.1725 | 0.5543 | 0.5655 | 0.9293 |
| (12) | fn/fr | −0.8281 | −0.5981 | −0.6161 | −0.6586 |
| (13) | (Repf − Rnr)/ (Repf + Rnr) | 0.0652 | 2.4012 | 3.2176 | 0.4485 |
| (14) | DL/f | 1.2769 | 1.5488 | 1.5257 | 0.9906 |
| (15) | DLopn/Tn | 0.6897 | 0.6062 | 0.5920 | 0.5128 |
| (16) | Dgnf/fn | −0.4368 | −0.1331 | −0.1701 | −0.2039 |
| (17) | Dgnr/fn | −0.0458 | −0.0689 | −0.0965 | −0.1710 |
| (18) | H/fn | −0.8199 | −0.6973 | −0.6715 | −0.9365 |
| (19) | H/fr | 0.6790 | 0.4170 | 0.4137 | 0.6168 |
| (20) | f/fop | 0.4688 | 1.6519 | 1.6062 | 1.5137 |
| (21) | Dopn/Dn | 5.7899 | 0.6046 | 0.8065 | 1.1153 |
| (22) | Dopn/TTL | 0.3953 | 0.0437 | 0.0580 | 0.0632 |
| (23) | H/fop | 0.2140 | 0.7523 | 0.7315 | 0.6637 |
| (24) | H/Tep | 0.2724 | 0.2482 | 0.2462 | 0.2902 |
| (25) | Doop/f | 0.3993 | 0.4385 | 0.4634 | 0.5205 |

TABLE 83

| Expression Number | | Example 9 | Example 10 | Example 11 | Example 12 |
|---|---|---|---|---|---|
| (1) | H/f | 0.4390 | 0.4386 | 0.4385 | 0.4379 |
| (2) | (Rnr + Rnf)/ (Rnr − Rnf) | −0.0516 | −0.1815 | −0.1076 | −0.3197 |
| (3) | (Rnf − Ropr)/ (Rnf + Ropr) | −0.1245 | −0.0723 | 0.0973 | 0.2892 |
| (4) | (Ropr + Ropf)/ (Ropr − Ropf) | −7.7434 | −12.0087 | −2.5498 | −4.0882 |
| (5) | (Repr + Repf)/ (Repr − Repf) | −0.5023 | −0.7857 | 0.2114 | 1.6878 |
| (6) | Nmax | 1.8522 | 1.8526 | 1.8485 | 1.8526 |
| (7) | f/fn | −2.0281 | −1.7710 | −1.8328 | −1.3645 |
| (8) | f/fopn | 0.1087 | 0.3838 | 0.4479 | 0.5133 |
| (9) | f/fr | 1.3135 | 1.1181 | 1.2259 | 1.0436 |
| (10) | fop/fn | −12.3325 | −18.1126 | −3.6680 | −2.7205 |
| (11) | fop/fr | 7.9869 | 11.4354 | 2.4533 | 2.0806 |
| (12) | fn/fr | −0.6476 | −0.6314 | −0.6689 | −0.7648 |

TABLE 83-continued

| Expression Number | | Example 9 | Example 10 | Example 11 | Example 12 |
|---|---|---|---|---|---|
| (13) | (Repf − Rnr)/ (Repf + Rnr) | 0.6039 | 0.8372 | 0.2406 | 0.0811 |
| (14) | DL/f | 1.0698 | 1.0647 | 1.1867 | 1.1763 |
| (15) | DLopn/Tn | 0.5899 | 0.5895 | 0.6226 | 0.5963 |
| (16) | Dgnf/fn | −0.2097 | −0.1166 | −0.3110 | −0.2424 |
| (17) | Dgnr/fn | −0.1411 | −0.1673 | −0.1347 | −0.0747 |
| (18) | H/fn | −0.8903 | −0.7767 | −0.8036 | −0.5975 |
| (19) | H/fr | 0.5766 | 0.4904 | 0.5375 | 0.4570 |
| (20) | f/fop | 0.1645 | 0.0978 | 0.4997 | 0.5016 |
| (21) | Dopn/Dn | 5.0384 | 5.1231 | 4.1295 | 3.9350 |
| (22) | Dopn/TTL | 0.2711 | 0.2893 | 0.2691 | 0.2561 |
| (23) | H/fop | 0.0722 | 0.0429 | 0.2191 | 0.2196 |
| (24) | H/Tep | 0.2941 | 0.2893 | 0.2659 | 0.2667 |
| (25) | Doop/f | 0.4228 | 0.4511 | 0.4621 | 0.4654 |

TABLE 84

| Expression Number | | Example 13 | Example 14 | Example 15 | Example 16 |
|---|---|---|---|---|---|
| (1) | H/f | 0.4385 | 0.4389 | 0.4564 | 0.4563 |
| (2) | (Rnr + Rnf)/ (Rnr − Rnf) | 0.1055 | 0.3239 | 0.0062 | 0.0050 |
| (3) | (Rnf − Ropr)/ (Rnf + Ropr) | 0.0758 | −0.5397 | −0.0731 | 0.0093 |
| (4) | (Ropr + Ropf)/ (Ropr − Ropf) | −5.5135 | 0.2964 | −2.4488 | −1.9128 |
| (5) | (Repr + Repf)/ (Repr − Repf) | −0.1565 | −0.4701 | −0.0454 | 0.0452 |
| (6) | Nmax | 1.8023 | 1.8526 | 1.8063 | 1.8348 |
| (7) | f/fn | −1.7877 | −1.8033 | −1.7968 | −1.8038 |
| (8) | f/fopn | 0.1621 | 0.2227 | 0.3971 | 0.4015 |
| (9) | f/fr | 1.2888 | 1.3437 | 1.2078 | 1.2634 |
| (10) | fop/fn | −5.0955 | −2.2147 | −2.9156 | −3.2912 |
| (11) | fop/fr | 3.6733 | 1.6503 | 1.9598 | 2.3052 |
| (12) | fn/fr | −0.7209 | −0.7451 | −0.6722 | −0.7004 |
| (13) | (Repf − Rnr)/ (Repf + Rnr) | 0.2971 | 0.3628 | 0.2903 | 0.2284 |
| (14) | DL/f | 1.1083 | 1.0619 | 1.2440 | 1.2320 |
| (15) | DLopn/Tn | 0.6202 | 0.6063 | 0.6497 | 0.6540 |
| (16) | Dgnf/fn | −0.2735 | −0.1787 | −0.2635 | −0.3097 |
| (17) | Dgnr/fn | −0.0765 | −0.1159 | −0.2603 | −0.2529 |
| (18) | H/fn | −0.7838 | −0.7915 | −0.8201 | −0.8231 |
| (19) | H/fr | 0.5651 | 0.5898 | 0.5513 | 0.5765 |
| (20) | f/fop | 0.3509 | 0.8142 | 0.6163 | 0.5481 |
| (21) | Dopn/Dn | 5.4956 | 3.7483 | 3.6500 | 3.8437 |
| (22) | Dopn/TTL | 0.3022 | 0.2336 | 0.2584 | 0.2671 |
| (23) | H/fop | 0.1538 | 0.3574 | 0.2813 | 0.2501 |
| (24) | H/Tep | 0.2859 | 0.2953 | 0.2704 | 0.2745 |
| (25) | Doop/f | 0.4251 | 0.4246 | 0.4439 | 0.4304 |

TABLE 85

| Expression Number | | Example 17 | Example 18 | Example 19 | Example 20 |
|---|---|---|---|---|---|
| (1) | H/f | 0.4566 | 0.4566 | 0.4656 | 0.4390 |
| (2) | (Rnr + Rnf)/ (Rnr − Rnf) | 0.0172 | 0.0038 | 0.0091 | 0.2413 |
| (3) | (Rnf − Ropr)/ (Rnf + Ropr) | −0.1438 | −0.1054 | 0.0136 | −0.5742 |
| (4) | (Ropr + Ropf)/ (Ropr − Ropf) | −1.9931 | −2.5922 | −3.8600 | 0.4032 |
| (5) | (Repr + Repf)/ (Repr − Repf) | 0.3100 | 0.2716 | 0.3969 | −0.6159 |
| (6) | Nmax | 1.8817 | 1.8865 | 1.8063 | 1.8078 |
| (7) | f/fn | −1.8024 | −1.7496 | −1.8650 | −1.7901 |
| (8) | f/fopn | 0.3841 | 0.3997 | 0.1833 | 0.3870 |

TABLE 85-continued

| Expression Number | | Example 17 | Example 18 | Example 19 | Example 20 |
|---|---|---|---|---|---|
| (9) | f/fr | 1.2300 | 1.1894 | 1.4026 | 1.2481 |
| (10) | fop/fn | −2.7676 | −2.9839 | −5.1470 | −2.2181 |
| (11) | fop/fr | 1.8886 | 2.0286 | 3.8708 | 1.5465 |
| (12) | fn/fr | −0.6824 | −0.6799 | −0.7521 | −0.6972 |
| (13) | (Repf − Rnr)/ (Repf + Rnr) | 0.1719 | 0.1546 | 0.0891 | 0.5425 |
| (14) | DL/f | 1.2571 | 1.2350 | 1.0913 | 1.0982 |
| (15) | DLopn/Tn | 0.6597 | 0.6380 | 0.5997 | 0.6163 |
| (16) | Dgnf/fn | −0.2318 | −0.2177 | −0.3236 | −0.1402 |
| (17) | Dgnr/fn | −0.1179 | −0.1144 | −0.0909 | −0.0959 |
| (18) | H/fn | −0.8230 | −0.7988 | −0.8683 | −0.7858 |
| (19) | H/fr | 0.5616 | 0.5431 | 0.6530 | 0.5479 |
| (20) | f/fop | 0.6512 | 0.5863 | 0.3623 | 0.8071 |
| (21) | Dopn/Dn | 4.5732 | 7.3983 | 4.2728 | 3.3131 |
| (22) | Dopn/TTL | 0.3053 | 0.3172 | 0.2901 | 0.2315 |
| (23) | H/fop | 0.2974 | 0.2677 | 0.1687 | 0.3543 |
| (24) | H/Tep | 0.2702 | 0.2703 | 0.2971 | 0.2896 |
| (25) | Doop/f | 0.4327 | 0.4542 | 0.4759 | 0.4177 |

The observation optical system 5 of Examples 1 to 20 has an apparent field of view of 43 degrees or more at the full angle of view in a state where the diopter is −1 diopter, and has a wide apparent field of view. In addition, the observation optical system 5 of Examples 1 to 20 implements high optical performance by favorably correcting various aberrations while being configured in a small size.

Figure 62:
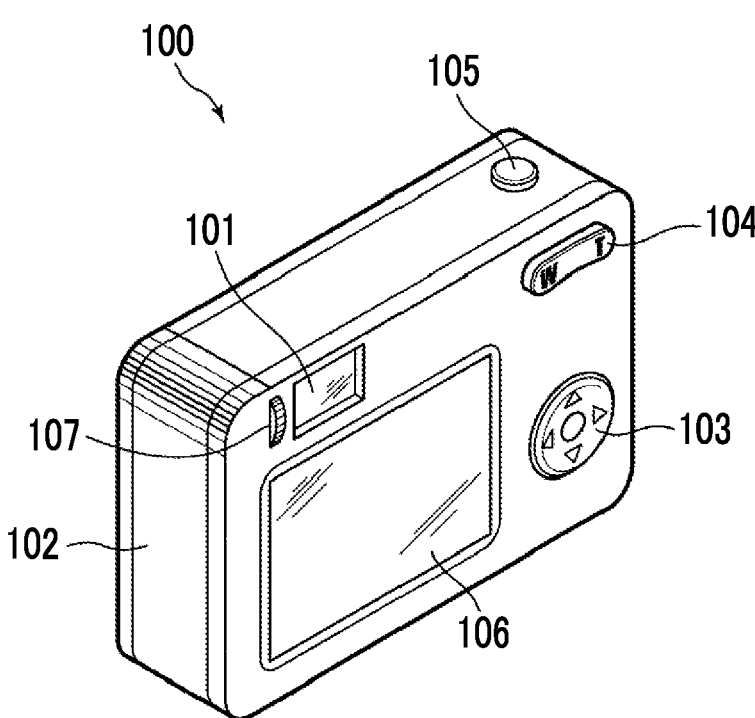
FIG. 62 is a perspective view of a rear surface side of an optical apparatus according to one embodiment.

Next, an optical apparatus comprising the observation optical system according to the embodiment of the present disclosure will be described. FIG. 62 is a perspective view illustrating a schematic configuration of a rear surface side of a camera 100 that is an optical apparatus according to one embodiment of the present disclosure. As an example, the camera 100 is a digital camera. The camera 100 comprises a finder 101 and a diopter adjustment dial 107 for performing the diopter adjustment in an upper portion of a camera body 102. The finder 101 is an example of an observation optical apparatus and comprises the observation optical system according to one embodiment of the present disclosure.

The camera 100 comprises an operation button 103 for performing various types of settings, a zoom lever 104 for changing magnification, and a monitor 106 for displaying images and various setting screens on a rear surface of the camera body 102, and comprises a shutter button 105 on an upper surface of the camera body 102. In addition, the camera 100 comprises an imaging lens (not illustrated) on a front surface of the camera body 102 and comprises an imaging element (not illustrated) capturing a subject image formed by the imaging lens inside the camera body 102. A user observes the subject image through the finder 101 from the rear surface side.

While the disclosed technology is illustratively described above using the embodiment and the examples, the disclosed technology is not limited to the embodiment and the examples and can be subjected to various modifications. For example, the curvature radius, the surface spacing, the refractive index, the Abbe number, and the aspherical coefficient of each lens are not limited to the values illustrated in each of the above numerical value examples and may have other values. In addition, the optical apparatus according to the embodiment of the present disclosure is not limited to the above example. The present disclosure can also be applied to a film camera, a video camera, a head-mounted display, and the like.

What is claimed is:

1. An observation optical system comprising:

a display element; and an eyepiece lens arranged on an eyepoint side of the display element, wherein the eyepiece lens includes at least one negative lens, and in a case where a half value of a longest diameter of a display region in the display element is denoted by H, and a focal length of the eyepiece lens in a state where diopter is −1 diopter is denoted by f, Conditional Expression (1) is satisfied, which is represented by $$0.35 < H/f < 0.6 \tag{1},$$

wherein the eyepiece lens includes at least one positive lens on a display element side of the at least one negative lens, and in a case where a positive lens closest to the display element side among positive lenses included in the eyepiece lens is referred to as a display side positive lens, and a distance on an optical axis from a surface of the display side positive lens on the display element side to a lens surface of the eyepiece lens closest to the eyepoint side in a state where the diopter is-1 diopter is denoted by DL, Conditional Expression (14) is satisfied, which is represented by $$0.75 < DL/f < 2.2 \tag{14}, and$$

wherein in a case where a negative lens having strongest optical power among negative lenses included in the eyepiece lens is referred to as a first negative lens, an air interval on an optical axis between the first negative lens and a lens adjacent to the eyepoint side of the first negative lens is denoted by Dgnr, and a focal length of the first negative lens is denoted by fn, Conditional Expression (17) is satisfied, which is represented by $$-0.7 < Dgnr/fn < -0.01 \tag{17}.$$

2. The observation optical system according to claim 1, wherein the eyepiece lens includes at least one positive lens on the eyepoint side of the at least one negative lens.

3. The observation optical system according to claim 1, wherein the eyepiece lens includes at least three lenses, and in diopter adjustment, the at least three lenses in the eyepiece lens move along an optical axis.

4. The observation optical system according to claim 1, wherein the number of lenses included in the eyepiece lens is five.

5. The observation optical system according to claim 1, wherein the eyepiece lens includes at least two lenses on a display element side of the at least one negative lens.

6. The observation optical system according to claim 1, wherein the eyepiece lens includes at least two positive lenses on a display element side of the at least one negative lens.

7. The observation optical system according to claim 1, wherein in a case where a negative lens having strongest optical power among negative lenses included in the eyepiece lens is referred to as a first negative lens, a paraxial curvature radius of a surface of the first negative lens on a display element side is denoted by Rnf, and a paraxial curvature radius of a surface of the first negative lens on the eyepoint side is denoted by Rnr, Conditional Expression (2) is satisfied, which is represented by $$0 < (Rnr + Rnf)/(Rnr - Rnf) < 0.5 \tag{2}.$$

8. The observation optical system according to claim 1, wherein in a case where a negative lens having strongest optical power among negative lenses included in the eyepiece lens is referred to as a first negative lens, the eyepiece lens includes at least one positive lens on a display element side of the first negative lens, and in a case where a positive lens closest to the display element side among positive lenses included in the eyepiece lens is referred to as a display side positive lens, a paraxial curvature radius of a surface of the first negative lens on the display element side is denoted by Rnf, and a paraxial curvature radius of a surface of the display side positive lens on the eyepoint side is denoted by Ropr, Conditional Expression (3) is satisfied, which is represented by $$-3 < (Rnf - Ropr)/(Rnf + Ropr) < 0.2 \tag{3}.$$

9. The observation optical system according to claim 1, wherein the eyepiece lens includes at least one positive lens on the eyepoint side of the at least one negative lens, and in a case where a positive lens closest to the eyepoint side among positive lenses included in the eyepiece lens is referred to as an EP side positive lens, a paraxial curvature radius of a surface of the EP side positive lens on a display element side is denoted by Repf, and a paraxial curvature radius of a surface of the EP side positive lens on the eyepoint side is denoted by Repr, Conditional Expression (5) is satisfied, which is represented by $$-2.2 < (Repr + Repf)/(Repr - Repf) < 1.1 \tag{5}.$$

10. The observation optical system according to claim 1, wherein in a case where a maximum value of d line refractive indexes of all lenses included in the eyepiece lens is denoted by Nmax, Conditional Expression (6) is satisfied, which is represented by $$1.7 < Nmax < 2.1 \tag{6}.$$

11. The observation optical system according to claim 1, wherein in a case where a negative lens having strongest optical power among negative lenses included in the eyepiece lens is referred to as a first negative lens, the eyepiece lens includes at least one positive lens on a display element side of the first negative lens, and in a case where a positive lens closest to the display element side among positive lenses included in the eyepiece lens is referred to as a display side positive lens, and a combined focal length from a surface of the display side positive lens on the display element side to a surface of the first negative lens on the eyepoint side in a state where the diopter is −1 diopter is denoted by fopn, Conditional Expression (8) is satisfied, which is represented by $$0.1 < f/fopn < 1 \tag{8}.$$

12. The observation optical system according to claim 1, wherein in a case where a negative lens having strongest optical power among negative lenses included in the eyepiece lens is referred to as a first negative lens, and a combined focal length of all lenses arranged on the eyepoint side of the first negative lens in the eyepiece lens in a state where the diopter is −1 diopter is denoted by fr, Conditional Expression (9) is satisfied, which is represented by $$0.6 < f/fr < 2.2 \tag{9}.$$

13. The observation optical system according to claim 1, wherein in a case where a positive lens closest to the display element side among positive lenses included in the eyepiece lens is referred to as a display side positive lens, and a focal length of the display side positive lens is denoted by fop Conditional Expression (10) is satisfied, which is represented by $$-4.5 < fop/fn < -0.5 \tag{10}.$$

14. The observation optical system according to claim 1, wherein in a case where a positive lens closest to the display element side among positive lenses included in the eyepiece lens is referred to as a display side positive lens, a negative lens having strongest optical power among negative lenses included in the eyepiece lens is referred to as a first negative lens, a focal length of the display side positive lens is denoted by fop, and a combined focal length of all lenses arranged on the eyepoint side of the first negative lens in the eyepiece lens in a state where the diopter is-1 diopter is denoted by fr, Conditional Expression (11) is satisfied, which is represented by $$0.1 < fop/fr < 5.5 \tag{11}.$$

15. The observation optical system according to claim 1, wherein in a case where a combined focal length of all lenses arranged on the eyepoint side of the first negative lens in the eyepiece lens in a state where the diopter is −1 diopter is denoted by fr, Conditional Expression (12) is satisfied, which is represented by $$-1 < fn/fr < -0.26 \tag{12}.$$

16. The observation optical system according to claim 1, wherein the eyepiece lens includes at least one positive lens on the eyepoint side of the at least one negative lens, and in a case where a positive lens closest to the eyepoint side among positive lenses included in the eyepiece lens is referred to as an EP side positive lens, a negative lens having strongest optical power among negative lenses included in the eyepiece lens is referred to as a first negative lens, a paraxial curvature radius of a surface of the EP side positive lens on a display element side is denoted by Repf, and a paraxial curvature radius of a surface of the first negative lens on the eyepoint side is denoted by Rnr, Conditional Expression (13) is satisfied, which is represented by $$0.01<(Repf-Rnr)/(Repf+Rnr)<3.4 \tag{13}.$$

17. The observation optical system according to claim 1, wherein in a case where a positive lens closest to the display element side among positive lenses included in the eyepiece lens is referred to as a display side positive lens, a negative lens having strongest optical power among negative lenses included in the eyepiece lens is referred to as a first negative lens, a distance on an optical axis from a surface of the display side positive lens on the display element side to a surface of the first negative lens on the eyepoint side in a state where the diopter is −1 diopter is denoted by DLopn, a distance on the optical axis from a display surface of the display element to the surface of the first negative lens on the eyepoint side in a state where the diopter is −1 diopter is denoted by Tn, and in a case where an optical member not having optical power is arranged between the display surface of the display element and the surface of the first negative lens on the eyepoint side, Tn is calculated using an air-equivalent length for the optical member, Conditional Expression (15) is satisfied, which is represented by $$0.4<DLopn/Tn<0.9 \tag{15}.$$

18. The observation optical system according to claim 1, wherein in a case where an air interval on an optical axis between the first negative lens and a lens adjacent to a display element side of the first negative lens is denoted by Dgnf Conditional Expression (16) is satisfied, which is represented by $$-0.9<Dgnf/fn<-0.01 \tag{16}.$$

19. An optical apparatus comprising:
the observation optical system according to claim 1.

20. An observation optical system comprising:
a display element; and
an eyepiece lens arranged on an eyepoint side of the display element,
wherein the eyepiece lens includes at least one negative lens, and
in a case where a half value of a longest diameter of a display region in the display element is denoted by H, and a focal length of the eyepiece lens in a state where diopter is −1 diopter is denoted by f, Conditional Expression (1) is satisfied, which is represented by $$0.35<H/f<0.6 \tag{1},$$

wherein the eyepiece lens includes at least one positive lens on a display element side of the at least one negative lens, and
in a case where a positive lens closest to the display element side among positive lenses included in the eyepiece lens is referred to as a display side positive lens, a paraxial curvature radius of a surface of the display side positive lens on the display element side is denoted by Ropf, and a paraxial curvature radius of a surface of the display side positive lens on the eyepoint side is denoted by Ropr, Conditional Expression (4) is satisfied, which is represented by $$-4.5<(Ropr+Ropf)/(Ropr-Ropf)<2.7 \tag{4, and}$$

wherein in a case where a negative lens having strongest optical power among negative lenses included in the eyepiece lens is referred to as a first negative lens, and a focal length of the first negative lens is denoted by fn, Conditional Expression (7) is satisfied, which is represented by $$-2.8<f/fn<-0.8 \tag{7}.$$

21. An optical apparatus comprising:
the observation optical system according to claim 20.

\* \* \* \* \*